(12) United States Patent
Kawashima et al.

(10) Patent No.: US 7,239,873 B2
(45) Date of Patent: Jul. 3, 2007

(54) SHARED INFORMATION SYSTEM IN NETWORK

(75) Inventors: Shinichi Kawashima, Kawasaki (JP); Norio Murakami, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 84 days.

(21) Appl. No.: 11/159,622

(22) Filed: Jun. 23, 2005

(65) Prior Publication Data

US 2005/0239454 A1    Oct. 27, 2005

(30) Foreign Application Priority Data

Jan. 7, 2005   (JP) .............................. 2005-003045

(51) Int. Cl.
*H04Q 7/20* (2006.01)

(52) U.S. Cl. .............................. 455/435.1; 455/414.1; 455/414.3; 455/406; 455/408; 455/422.1; 455/403; 455/435.2; 705/59; 705/51; 379/114.01; 379/114.03; 379/114.05

(58) Field of Classification Search ............. 455/426.1, 455/426.2, 403, 500, 517, 445, 412.1, 412.2, 455/414.1, 414.3, 414.4, 435.2, 406, 435.1, 455/407, 408, 422.1; 705/59, 51; 379/405, 379/114.01, 114.03, 114.05, 114.13, 114.17, 379/114.28, 115.01, 121.04
See application file for complete search history.

(56) References Cited

U.S. PATENT DOCUMENTS

2005/0044361 A1*   2/2005   Chang et al. ............... 713/167
2005/0149340 A1*   7/2005   Murakami et al. ............. 705/1
2006/0143134 A1*   6/2006   So et al. ....................... 705/59

FOREIGN PATENT DOCUMENTS

| JP | 2001-344526 | 12/2001 |
| JP | 2002-150008 | 5/2002 |
| JP | 2004-164372 | 6/2004 |

* cited by examiner

*Primary Examiner*—Keith Ferguson
(74) *Attorney, Agent, or Firm*—Katten Muchin Rosenman LLP

(57) ABSTRACT

A terminal A which is an owner of contents transmits a request to share contents downloaded from a contents provider with terminals B and C to an Application Service Provider (ASP). The ASP obtains permission that a license can be shared from the contents provider, and notifies the terminal A of the information. The ASP calls the terminals B and C and provides the license for them.

15 Claims, 50 Drawing Sheets

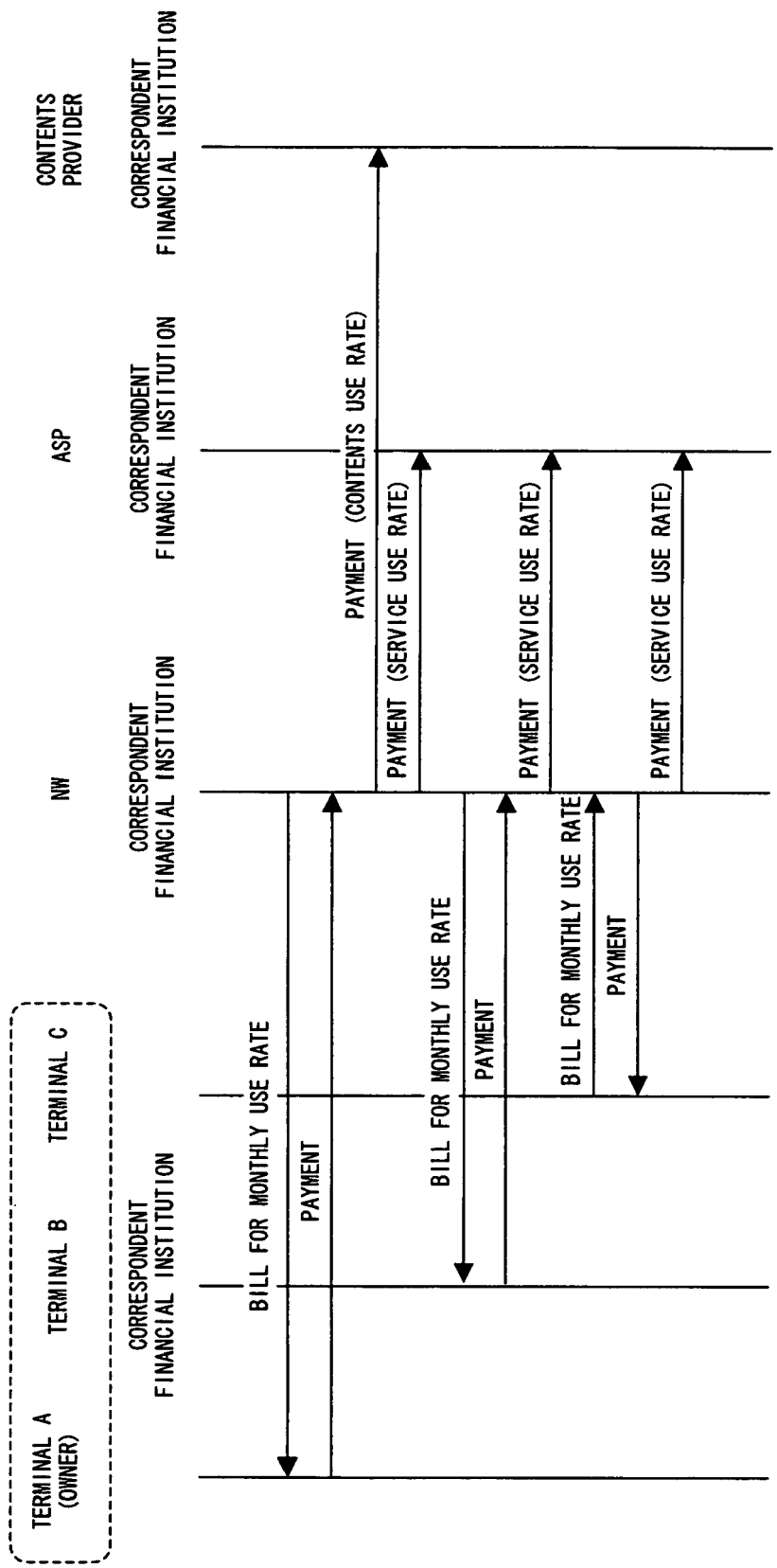
F I G. 5B

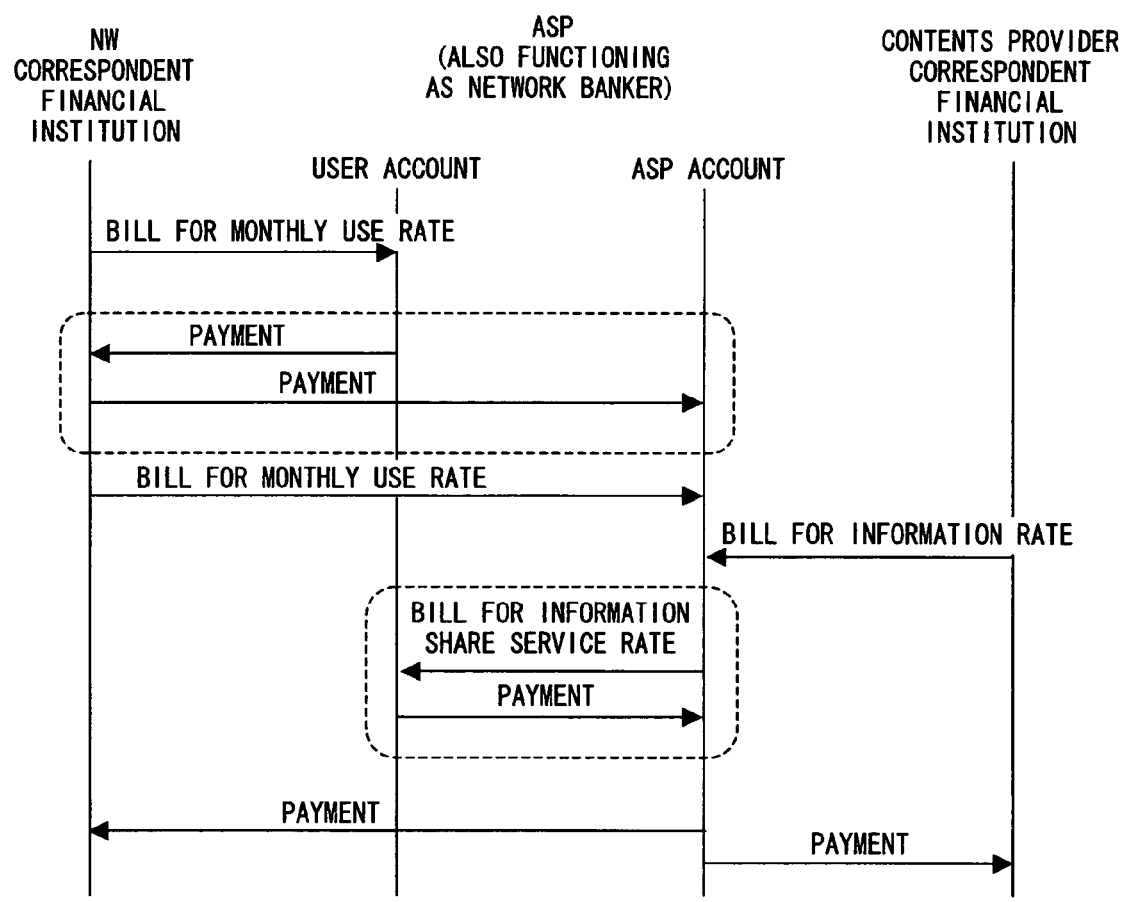
F I G. 6

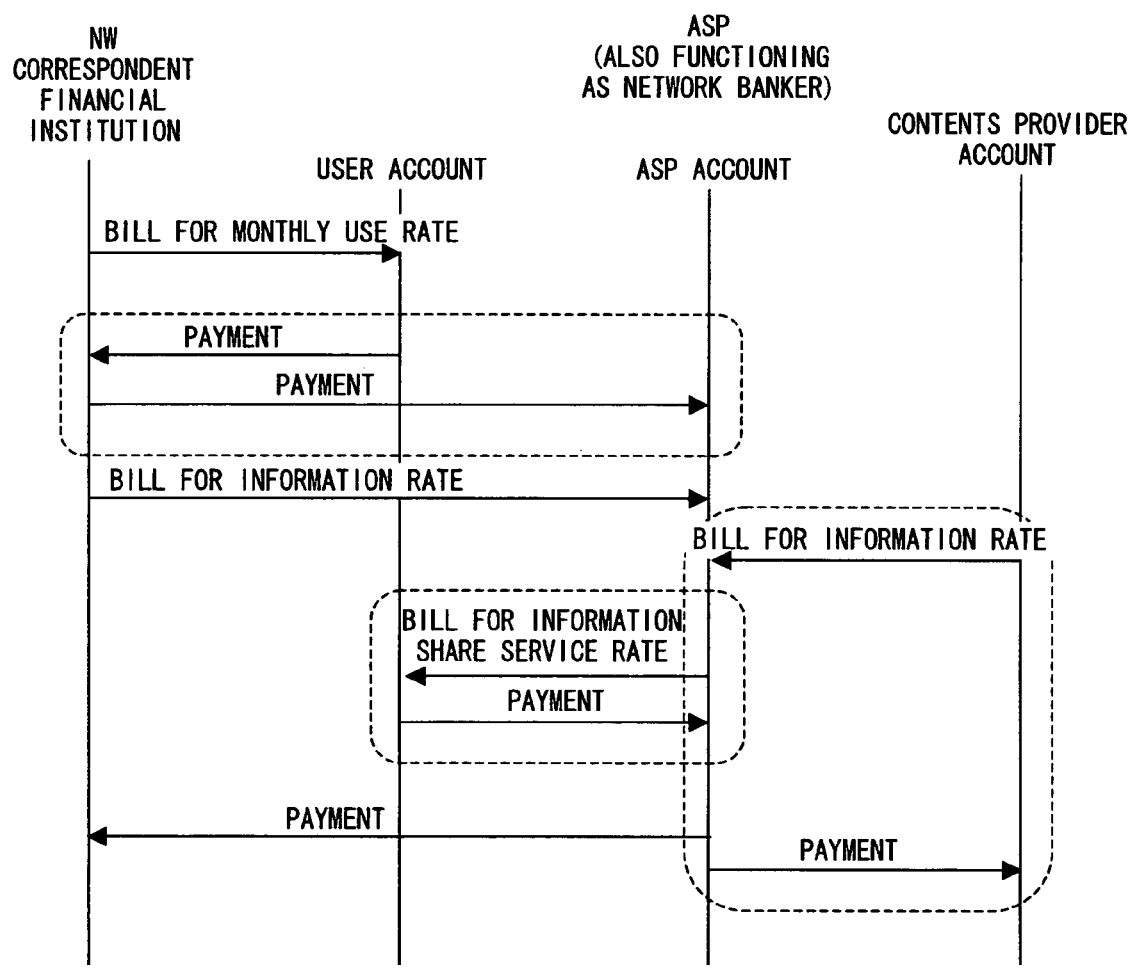
F I G. 7

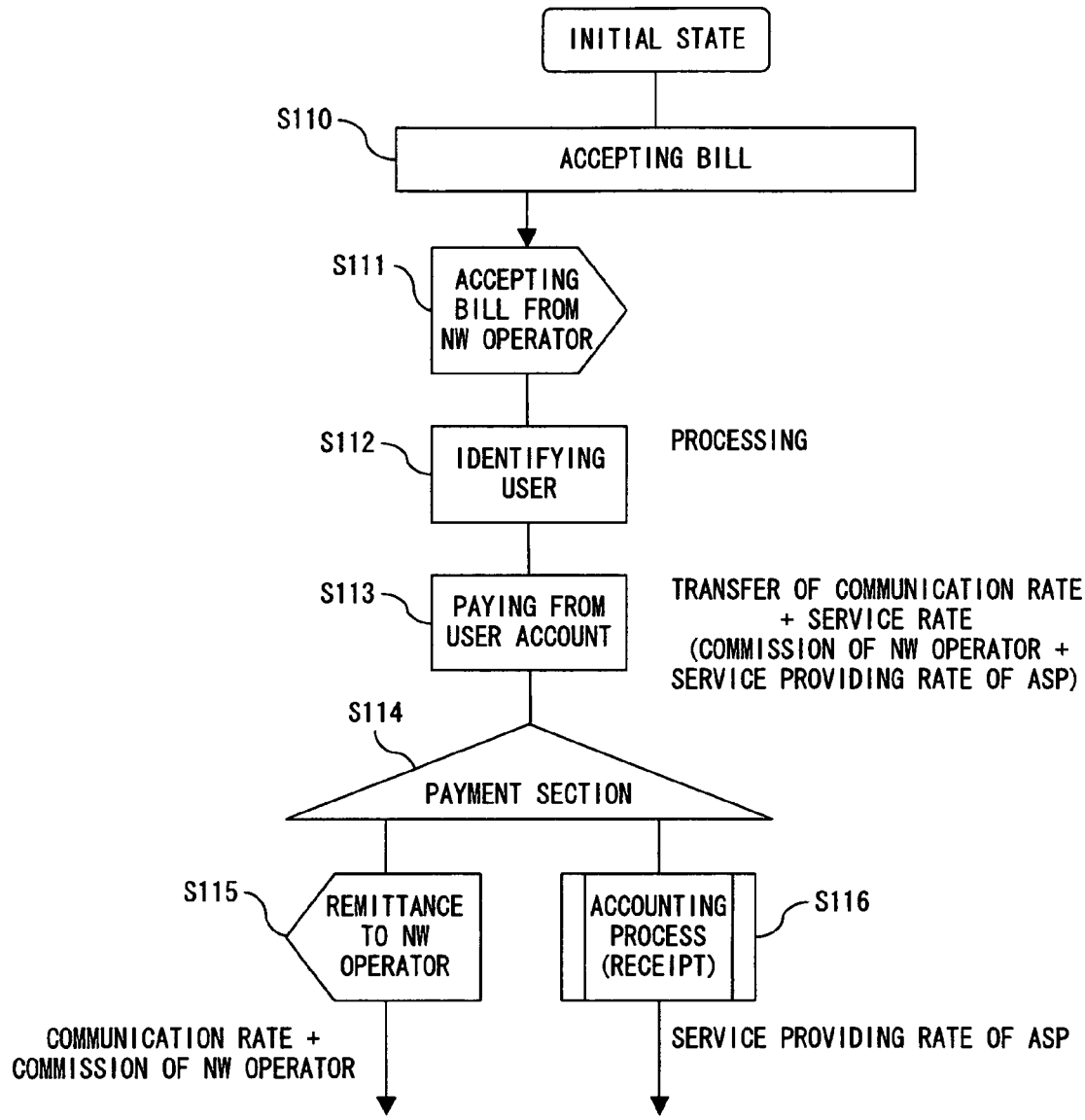
F I G. 1 8

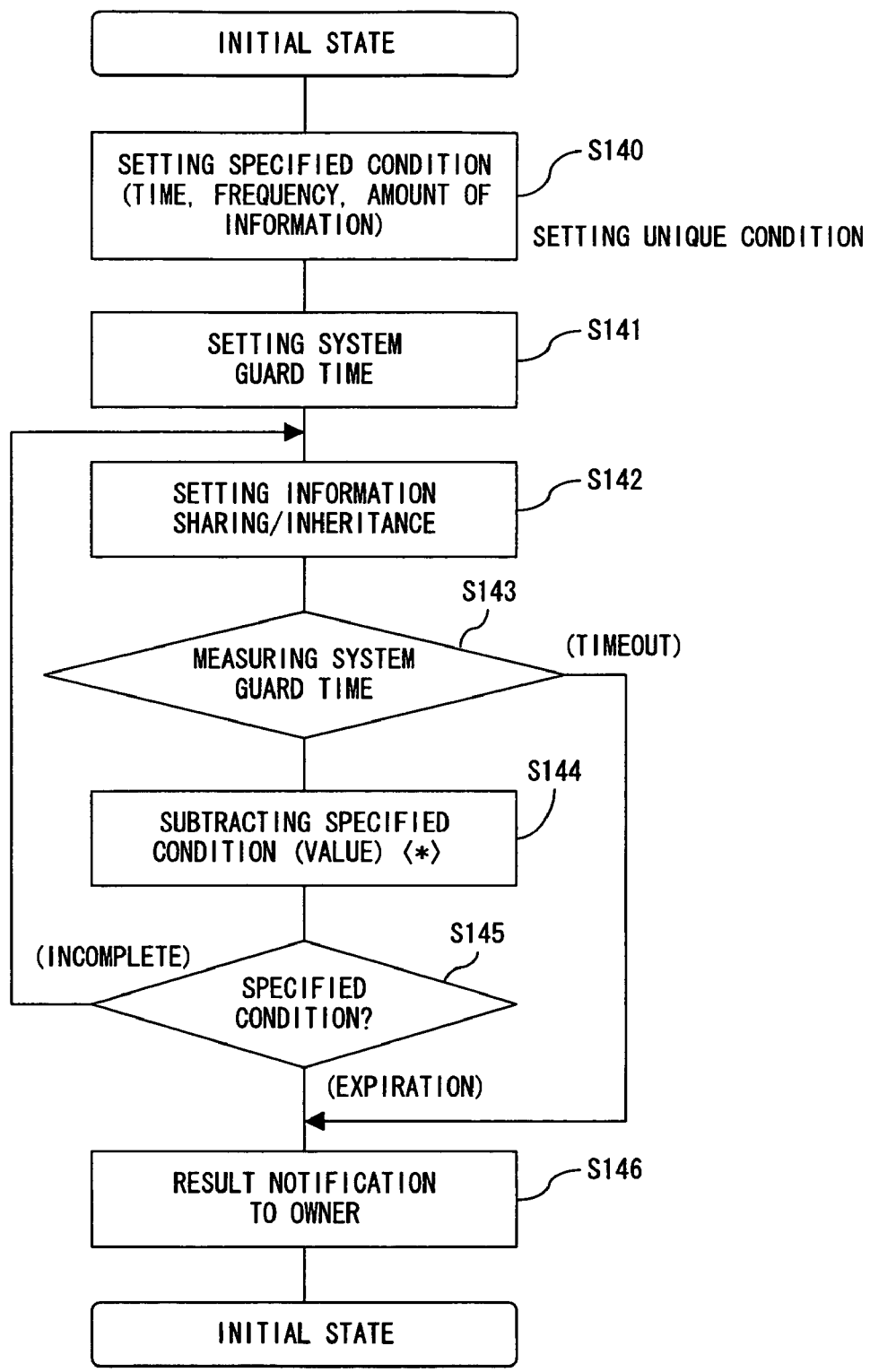
F I G. 3 4 A

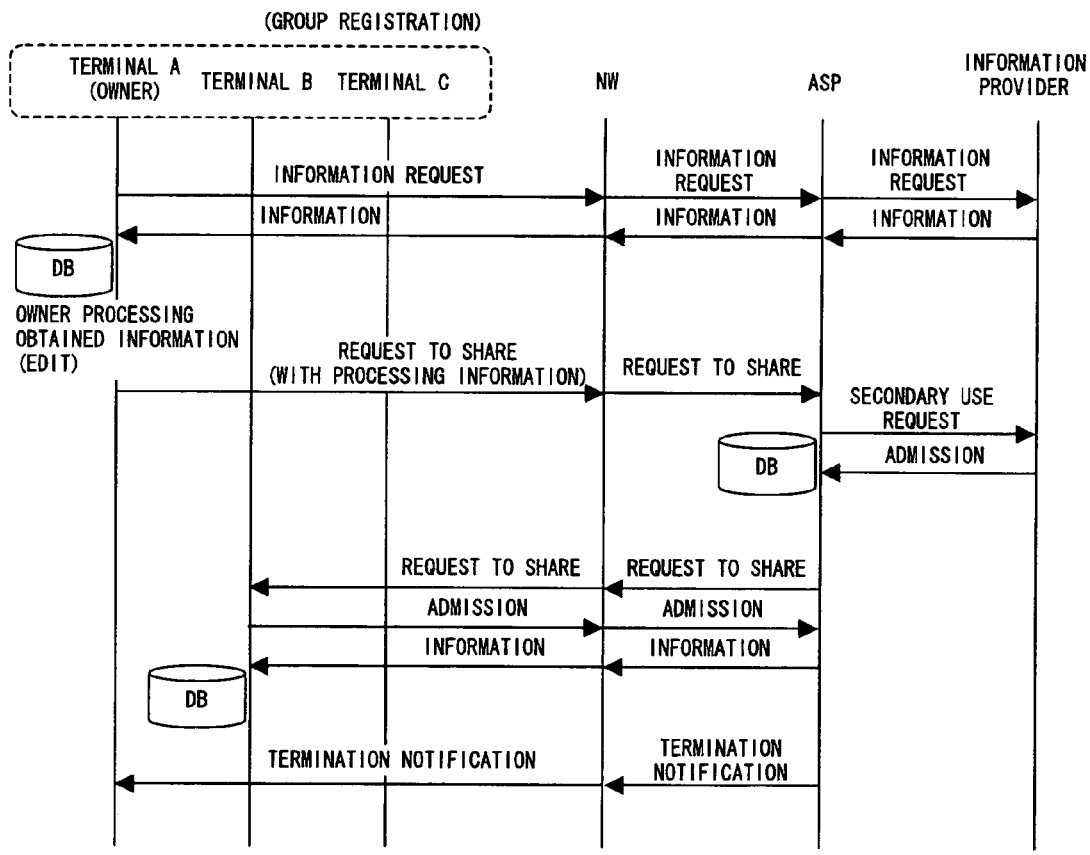
F I G. 39

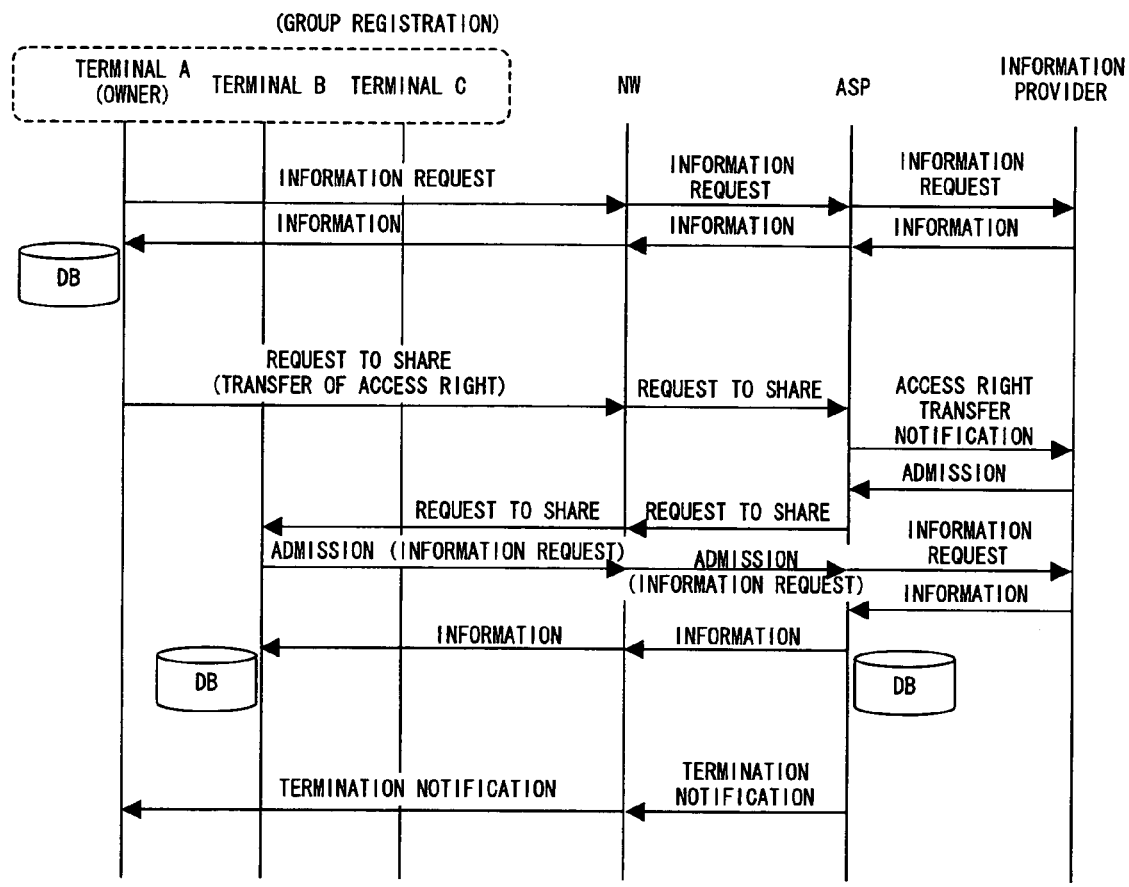
F I G. 4 1

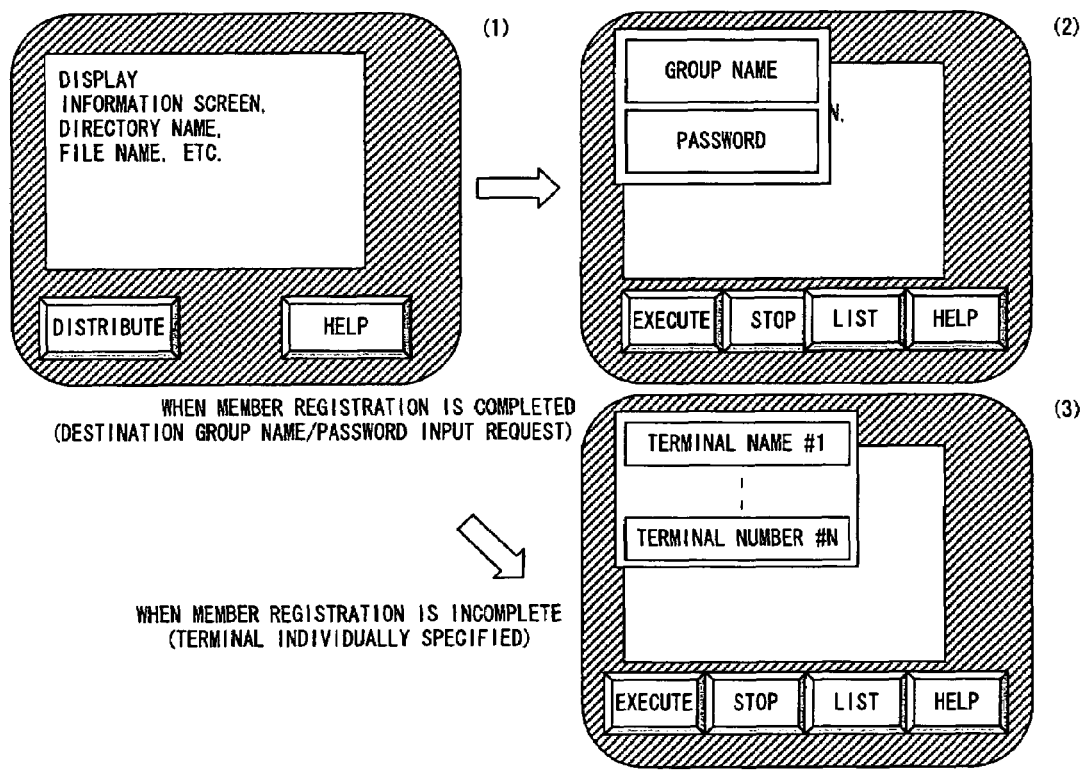
F I G. 4 4

SHARED INFORMATION SYSTEM IN NETWORK

BACKGROUND OF THE INVENTION

1. Field of the Invention

The present invention relates to a shared information system in a network.

2. Description of the Related Art

With the wide spread of the Internet and mobile information terminals such as mobile telephones capable of utilizing Internet services including electronic mail, etc., the expectations on the mobile information terminals for the information distribution have been raised.

However, to activate the information distribution such as sharing the same information among a plurality of mobile information terminals, inheriting the same information among a plurality of different mobile information terminals, etc., increasing the number of mobile information terminals is an essential condition, but one of the factors interfering with the increase of the number of mobile information terminals is the problem of the financial burden in using information.

Additionally, information itself has the problems to be solved such as the limitations of use range by the "use restrictions (membership)" in using the information, the appropriate countermeasures to be taken for the "intellectual property rights (copyright protection)", etc.

FIG. 1 shows the concept of the target information distribution service system.

In the configuration shown in FIG. 1, a portable mobile information terminal 10 and an information terminal 11 used by a service user are connected to a mobile network 12 or an access network 13. The mobile network 12 and the access network 13 are connected to a trunk network 14. A contents provider 15 and an ASP 16 having a private enterprise network 17 are connected to the trunk network 14, and a service is provided for a service user. The private enterprise network 17 is an individual network with which the ASP 16 has made a contract to provide the service.

In the information distribution service, there are a service user, a member that the service user enters for sharing or inheriting information, an ASP (server system) for realizing the service, and a number of information providers. Each information provider provides information browsed or enjoyed by the service user.

(1) The service user and the server system operation company enter a contract on the use of the service.

(2) The server system provides a service such as sharing and inheriting information, etc. for a mobile information terminal entered as a target terminal of the service user based on a specified request condition with the prescribed conditions (intellectual property rights, etc.) of the information taken into account.

(3) The server system makes a payment to protect the target mobile information terminal from the financial burden such as a communication cost, etc. charged for the information distribution such as sharing and inheriting information, etc.

The conventional technology for the system realizing the above mentioned information distribution is disclosed by the patent documents 1 through 3. The patent document 1 discloses the technology of extracting an IP address and a network login ID from an access log, and charging for services. The patent document 2 discloses the technology of adding attribute data to copyright data, and charging for services based on the obtained data. The patent document 3 discloses the technology of accumulating data generated by users, and sharing, retrieving, and distributing the data among the users.

[Patent Document 1] Japanese Published Patent Application No. 2001-344526

[Patent Document 2] Japanese Published Patent Application No. 2002-150008

[Patent Document 3] Japanese Published Patent Application No. 2004-164372

The financial burden such as a communications rate, etc. to a receiver of information is one of the impediments to the activation of the information distribution in a network, and it is necessary to minimize the economic factor, that is, the psychological factor, in receiving information.

The "intellectual property rights" of information itself is important and indispensable for protection against illegal information distribution and for copyright protection. That is, to activate the information distribution, a solving device for the case in which information to be distributed is copyright-protected by "transfer disabled", "copyguarded", etc. is required.

Furthermore, when information which has once been downloaded for use by a service user is downloaded again each time a different mobile information terminal downloads the same information, a time burden and an economic burden newly arise.

That is, although a mobile information terminal being used is changed to another terminal during receiving information, the information being received can be inherited by the other terminal, thereby further improving the convenience.

SUMMARY OF THE INVENTION

The present invention aims at providing a system for sharing protected data between different terminals over a network.

The shared information system according to the present invention enables electronic contents whose license belongs to the owner to be shared with other users, and includes: a request acceptance device for accepting on line a request to issue a shared license for sharing information from an owner; a shared license assignment device for assigning a license for sharing on line information with a terminal of another user based on the obtained shared license; and an electronic contents transmission device for transmitting on line the electronic contents to a terminal of another user.

According to the present invention, a system capable of sharing data between different terminals while protecting the copyright of the data can be provided, and the system can further spread the information distribution service.

BRIEF DESCRIPTION OF THE DRAWINGS

FIGS. 5A and 5B respectively show a control sequence (A) and a payment sequence (B) when downloaded and obtained contents are inherited between different terminals;

FIG. 6 shows a basic payment sequence followed when an ASP configuring a server system also functions as a network banker, and a service user opens an account in the network bank;

FIG. 7 shows a basic payment sequence followed when an ASP configuring a server system also functions as a network banker, and a service user and an information provider open an account in the network bank;

FIG. 18 shows a payment process (1) followed when an ASP configuring a server system also functions as a network banker, and a service user opens an account in the network bank;

FIGS. 34A and 34B show the process for the condition specified by a service user for information distribution such as sharing and inheriting information, etc. according to the present invention;

FIG. 39 shows an example (4) of an application according to an embodiment of the present invention;

FIG. 41 shows an example (6) of an application according to an embodiment of the present invention;

FIG. 44 shows the outline (2) of a terminal display of a service user.

DESCRIPTION OF THE PREFERRED EMBODIMENTS

Figure 1:
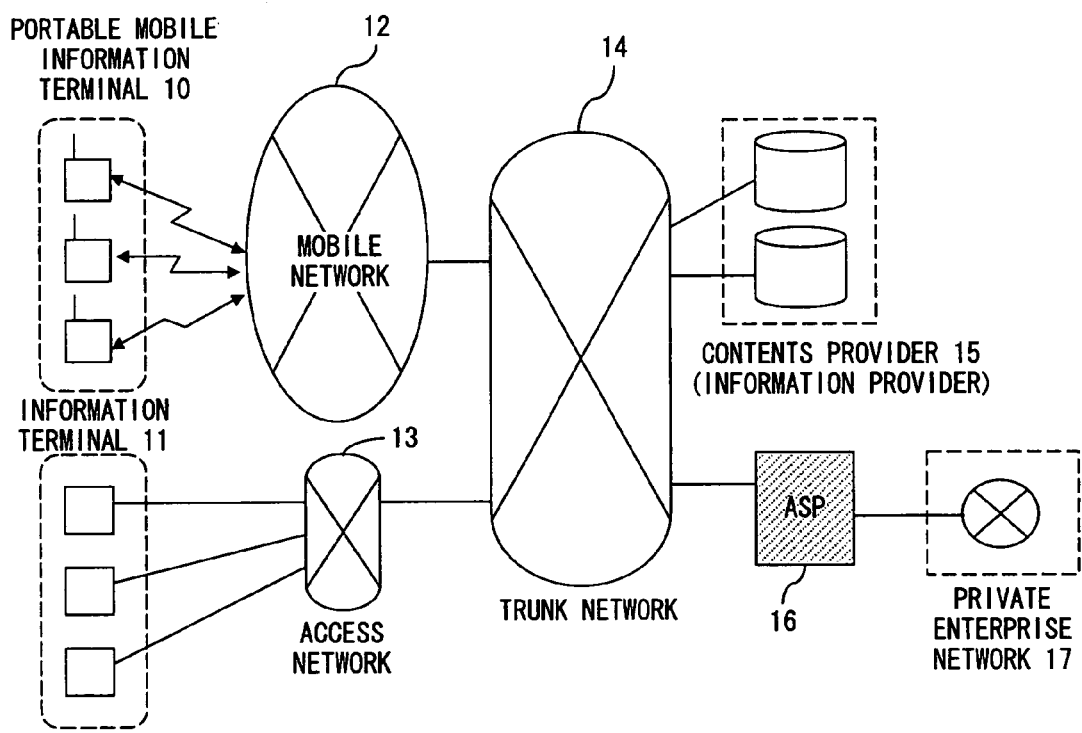
FIG. 1 shows the concept of the target information distribution service system.

According to an embodiment of the present invention, in the information distribution such as sharing and inheriting useful information for a service user with a registered member using a mobile information terminal such as a mobile telephone, etc., the information distribution specified by a service user can be economically controlled without a financial burden to a registered member with the intellectual property rights taken into account.

Especially, according to an embodiment of the present invention, an economical quantitative managing method in the information distribution can be provided. Furthermore, based on the quantitative managing method, the information can be distributed to a mobile information terminal registered in advance by a service user for information distribution to the service user without a financial burden to a user of a registered mobile information terminal.

According to the embodiment of the present invention, in addition to the device for distributing information specified by a service user on a condition specified by the service user for the mobile information terminal registered in advance as a target of information distribution by the service user, the following device can also be provided.

(1) When the information intended by the service user for information distribution is specified with "transfer prohibited", the server system notifies the information provider of the information of a notification of "secondary use (transfer permitted) request", and issues a cost (information use rate, etc.) payment request corresponding to the record of the frequency of transfer to the registered mobile information terminal.

(2) When the information intended by the service user for information distribution is specified with "copy prohibited", the server system notifies the information provider of the information of a notification of "secondary use (copy permitted) request", and issues a cost (information use rate, etc.) payment request corresponding to the record of the frequency of copy to the registered mobile information terminal.

(3) When the information intended by the service user for information distribution is specified with "write prohibited", the server system notifies the information provider of the information of a notification of "secondary use (write permitted=secondary process permitted) request", and issues a cost (modification rate, etc.) payment request corresponding to it to the registered mobile information terminal.

For example, the case in which information with a mark indicating a meeting place on the map is distributed to a registered mobile information terminal, and the case in which the contents including an opinion added to a part of a literary work provided as electronic data are distributed to a registered mobile information terminal correspond to (3).

(4) When the information intended by the service user for information distribution is specified with "exclusive for member" for only a service user admitted as "access license", the server system notifies the information provider of the information of the notification of the "temporary transfer of access license", simultaneously but temporarily transfers the access license for access to the information specified by the service user, and enabled access to be gained from the registered mobile information terminal to the information.

Although there are the following three aspects for the "service" according to the embodiment of the present invention, it is possible to make determination depending on the context. Therefore, no discrimination is required among them.

(1) information distribution service for a person having a mobile information terminal
(2) processing service for the information managed by an information provider
(3) payment service for an information provider and public mobile communication network Described below is the outline of the embodiment of the present invention.

In the embodiment of the present invention, the following opinion is adopted.

That is, to enhance the ARPU (average revenue per user) of a public mobile communication network by activating the information distribution such as sharing and inheriting information in a network so that a solving means for removing the factor of the impediment to the information distribution to expand and stabilize the business profits can be provided, simple quantitative management of distributed information is realized by providing a control device based on the following concept.

In the embodiment of the present invention, the information distribution is performed in the following three stages.

Stage 1) A plurality of conditions are allowed in the information distribution, the extremum (maximum value) obtained from a plurality of conditions is calculated for a processing condition.

Stage 2) An information distribution process by an information attribute is realized.

Stage 3) The financial burden relating to the information access generated in the information distribution step is born by a requester of the service.

A practical example to which the embodiment of the present invention is applied is described below.

When a user requests a person to share the information (contents) browsed or enjoyed by the user, the user notifies the person of the URL (uniform resource locater) of the contents. When the person notified of the URL browses the contents, the person performs a series of contents accessing operations and downloads the contents onto the terminal.

The required communication cost is to be born by the person requested to browse the information, thereby possibly causing psychologically mixed feelings, and failing to completely remove the impediments to the information distribution.

For example, when a manager of mobile workers notifies all his or her members of necessary information, and announces without fail the information specified by the manager at the cost of the manager, thereby reducing the time difference in transmitting the information to all members and largely improving the business efficiency.

Assuming that the protection of the intellectual property rights on the information is extended or intensified, and that the information (contents) to be provided for a partner is protected by the intellectual property rights with "transfer disabled", etc. or restricted, it is necessary for the contents distribution to realize the information distribution with the intellectual property rights highly estimated.

In the case above, the information distribution is realized with the intellectual property rights protected by the server system performing a predetermined process for the information provider having the intellectual property rights on the contents.

Recently, it is natural that a person owns a plurality of information terminals, but when different terminals are to be separately used depending on the place, time, and situation, the contents downloaded onto one terminal cannot be inherited during use (for example, map information being browsed, etc.) by another terminal.

Up to now, the map information about a parking lot in a scenic spot, in a town, etc. downloaded onto the car navigation system cannot be inherited, displayed, or used by a mobile telephone owned by the user when the user get off the vehicle. That is, the same contents have to be accessed over a network for each of the available terminals and downloaded.

According to the present invention, when contents are once downloaded onto a terminal, they can be inherited by another terminal, thereby possibly inheriting the information obtained up to the parking lot through the car navigation system to a mobile phone owned by the same user, continuously using the guide information on the map further from the parking lot to a hiking course, a restaurant, etc., and reducing the financial burden such as the contents use rate.

Described below is each process stage.

Stage 1)

When information distribution such as sharing and inheriting information, etc. is performed, the basic control mechanism used when the specification condition is the only prescribed condition among "time", "number of time (number of terminals=quantity)", "amount of information (volume)", etc. performs a process with the specified condition value defined as the upper limit.

According to the embodiment of the present invention, in the information distribution, the plurality of specification conditions (values) are a bounded closed set, and the extremum (maximum value) in the area is defined as the unique condition.

The Lagrange's method of undetermined multipliers is used as a method for calculating an extremum.

Assume that $(x, y, z)$ satisfies $f(x, y, z)=0$, and the function $g(x, y, z)$ assumes an extremum at the point $(a, b, c)$, the following expressions hold.

$fx(a, b, c) \neq 0$ $fy(a, b, c) \neq 0$ $fz(a, b, c) \neq 0$

Then, there exists $\lambda$ that satisfies the following expressions.

$gx(a, b, c)+\lambda fx(a, b, c)=0$ $gy(a, b, c)+\lambda fy(a, b, c)=0$ $gz(a, b, c)+\lambda fz(a, b, c)=0$ For example, assuming that the limited time (=1 hour) up to sharing information among all registered members and the total (limited) amount of information (=1M packet) are simultaneously specified, the bounded closed set of the conditions is defined as $f(x, y)=x^2+y^2-1=0$.

The extremum (maximum value, minimum value) of the function $g(x, y)=x+y$ satisfying $f(x, y)=x^2+y^2-1=0$ is calculated as follows.

$F(x, y)=x+y-\lambda(x^2+y^2-1)$ $Fx=1-\lambda(2x)=0$ $Fy=1-\lambda(2y)=0$ $y=x$, and $x^2+y^2=1$, therefore $(x, y)=(\pm 1/\sqrt{2}, \pm 1/\sqrt{2})$ maximum value $g(+1/\sqrt{2}, +1/\sqrt{2})=+\sqrt{2}$ minimum value $g(-1/\sqrt{2}, -1/\sqrt{2})=-\sqrt{2}$ Thus, the process can be performed with the obtained maximum value defined as the specified unique condition.

For example, when the time is used as the key of the process, the process is performed with $\sqrt{2}$ hour defined as the upper limit.

Stage 2)

When the information to be distributed in the network is processed, it is indispensable to protect the information itself against illegal copy and to appropriately process the information with the intellectual property rights highly estimated.

For example, if information whose access license is limited is to be shared, and the terminal requested to share information acquires an information access license each time the information is required, then the inconvenience during operation is furthered, and the case in which the access license acquisition qualification condition for the information cannot be satisfied is assumed.

In this case, notifying the information provider that a temporary transfer of the access license of the information has been transferred for the requester for sharing information corresponds to the access request of the information from the terminal which has received a request to share information (terminal with which a requester of the service has specified to share information).

That is, assuming that the requester having an access license has accessed the information, and the corresponding cost is born by the requester, the extension of the information distribution such as the member exclusive information, etc. can be realized. Similarly, when the information to be distributed is protected by intellectual property rights with "transfer inhibited" and "copy inhibited", etc., the information distribution intended by the requester can be realized.

Stage 3)

As it is apparent from the stage 2) above, the factor of the impediments to the information distribution can be removed by allowing the requester of the service to bear the financial burden such as an information rate incidentally occurring on the requested side (terminal) for sharing or inheriting information during information distribution.

Recently, in the mobile communications performed using mobile telephones, the available media is changed and expanded in quality to include audio, moving pictures, etc. with the progress of mobile technology. However, for a user, the system of using information itself has been under development.

According to the embodiments of the present invention, in the information distribution in which information is shared and inherited between a user and a registrant (terminal) registered in advance by the user, the information distribution in a network can be activated by providing a solving device for removing the financial and psychological impediments to the registrant and considering the "intellectual property rights" of the information itself.

The information distribution can also be activated by providing an economical and simple quantitative managing method for solving the complexity in processing information caused by enhancing the reflection of the intention of a user on the condition specified by a user to activate the information distribution of the user.

As described above, according to the present invention, by activating the information distribution over a network, the effect of improving (increasing the business profits) the ARPU (average revenue per user) with an increasing amount of data traffic in the mobile communication carrier can be expected.

That is, a user is provided with a service environment for activation of information distribution, and a mobile communication carrier is provided with increased business profits.

A practical example of the scenario (business area, model) of a business model for providing the present invention is listed below.

(1) Mobile Workers Business Area

A method for realizing economical efficiency management in sharing information during information transmission to a mobile worker.

The present invention can be applied when information is announced from a head office, a division in charge, etc. (parent, center, indoor) to a mobile worker/agent, various equipment maintenance/service worker, construction field worker, etc. (child, terminal, outdoor,).

Furthermore, the present invention can be applied to information announcement in a large site such as an event field, a zoo, a botanical garden, etc.

(2) Other Business Areas

A method for realizing economical efficiency management in inheriting and sharing information in a remote medical care and an educational field.

The present invention can be applied when parent data are to be inherited by a plurality of medical stuffs in remote medical care.

In an educational field (including remote education) such as a school, after-hours cram school, etc., the present invention can be applied to sharing text in addition to the announcement of learning schedules, etc.

A method for realizing economical efficiency management in sharing information in the service field dealing direct mail and marketing.

In direct mail and marketing service, the present invention can be applied to the management when accessing (sharing information) a destination of the contents specified by a plurality of users.

By applying the present invention, the awareness of consumers can be enhanced and the number of users can be increased by managing the service itself with the period and the number of users limited.

(3) Public Corporation and Self-Governing Body Area

A method for realizing economical efficiency management in an information notification service.

By applying the present invention to various notices (information) from self-governing body to inhabitants, the current paper-based distribution and information can be removed, various costs can be reduced, and the appropriate and effective timing of a notification can be realized.

By applying the present invention, the information required by the inhabitants who are receivers of information (information limited to a residential area and an interesting field) can be selected, and the efficiency of administration can be enhanced.

(4) General Consumer Area

A method for realizing economical efficiency management in sharing information in various communities and groups and inheriting information among personally owned terminals.

When information is shared and inherited in various circles, groups, and homes, the present invention realizes the process without the receivers' psychological and financial burden, and can be applied outside a business area.

When one user owns a plurality of information terminals, the present invention realizes smooth information sharing and inheriting among the plurality of terminals, and indicating a method for realizing an increasing number of information equipment units used by the consumers in the future.

The embodiments of the present invention are described below by referring to the attached drawings.

Figure 2A:
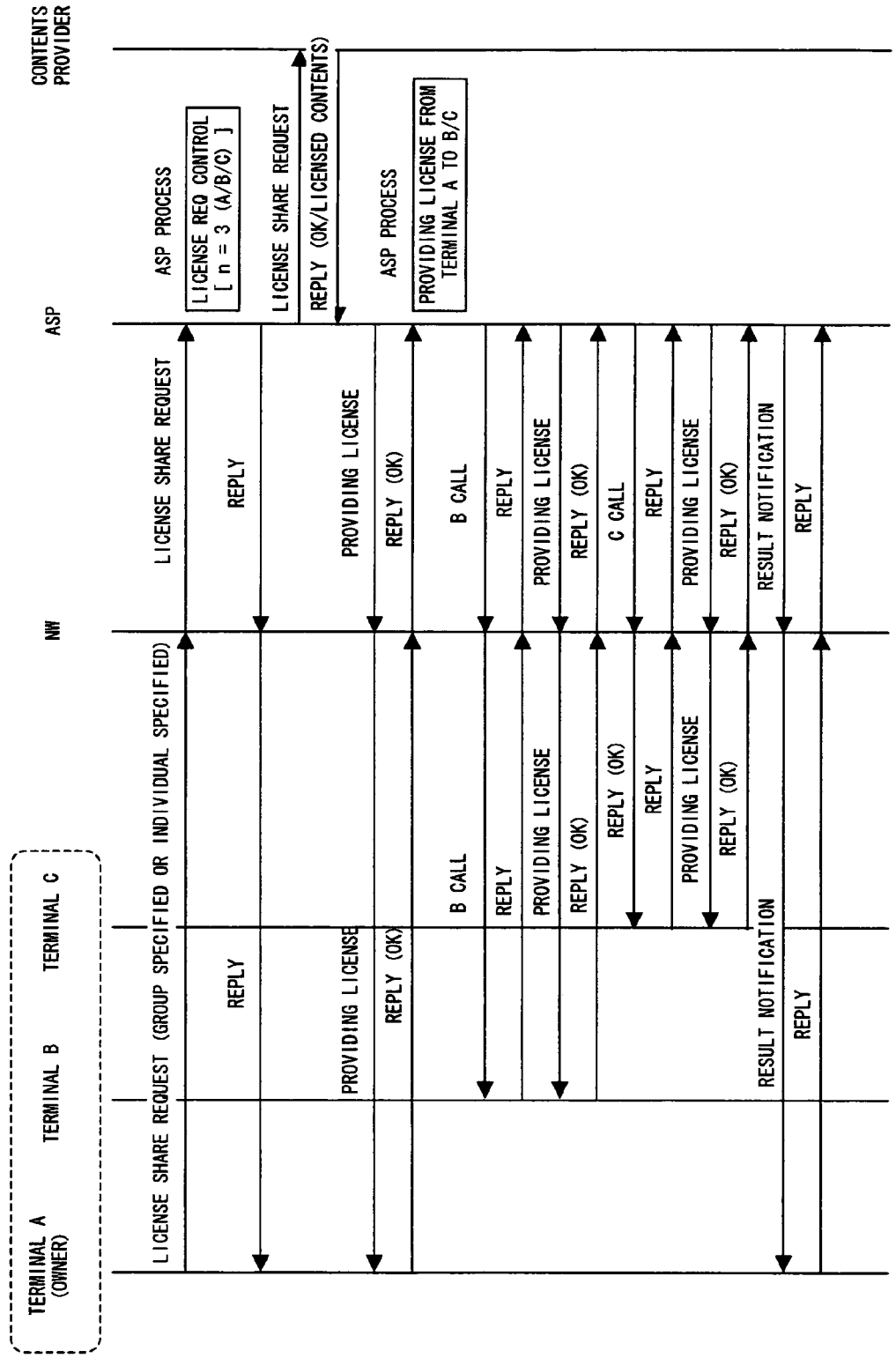
FIGS. 2A and 2B respectively show a control sequence (A) and a payment sequence (B) when a contents access license is shared.
Figure 2B:
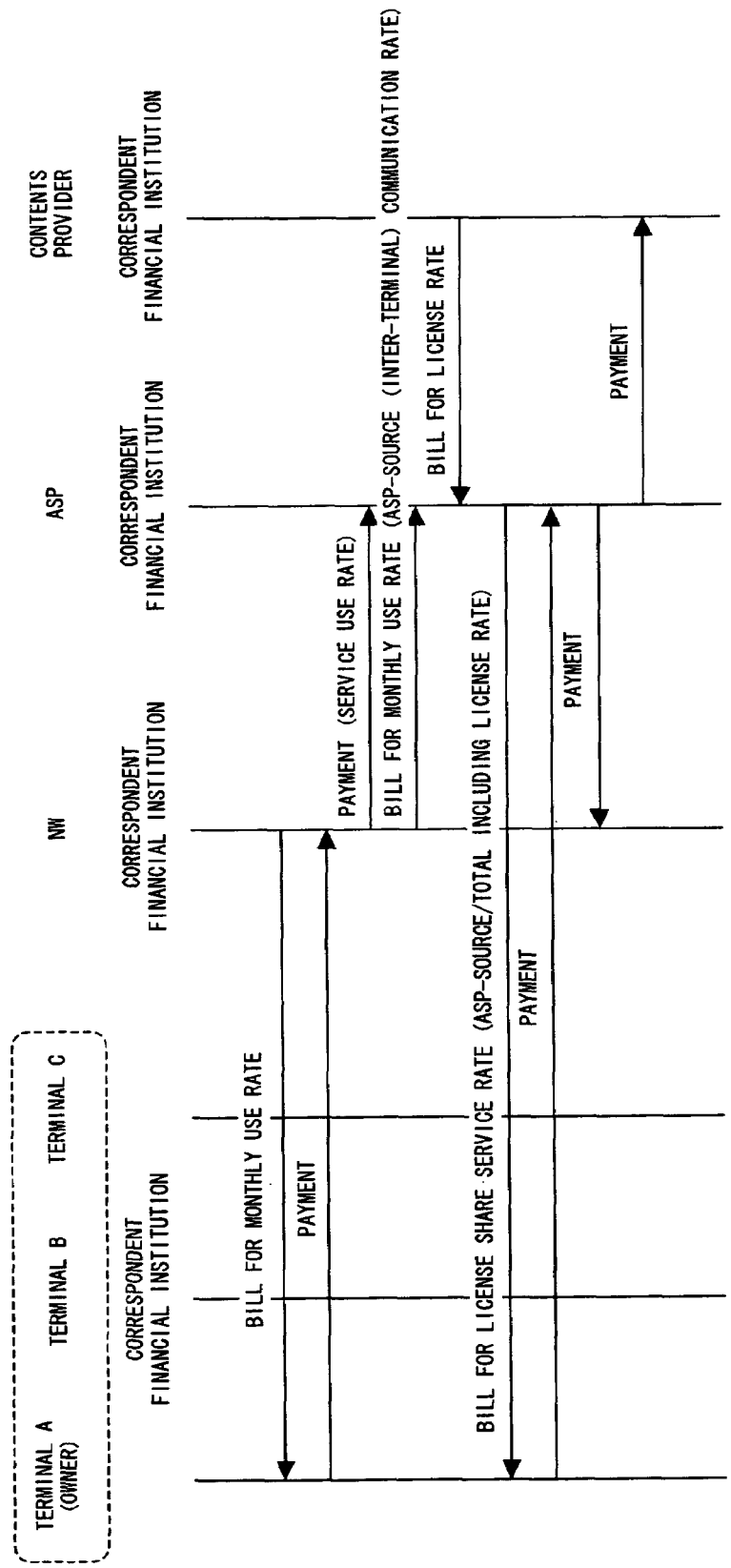

FIGS. 2A and 2B respectively show a control sequence (A) and a payment sequence (B) when a contents access license is shared.

In FIG. 2A, a service user registers in advance the contents access license of the information provider of a service user, issues a notice that it temporarily shares the license with the terminal configuring a group to the corresponding information provider, and the server system functions as a proxy agent for distributing information for the information provider.

Assume that a terminal A is an owner of a license, and terminals B and C share the license with the terminal A. When a request to share the license is transmitted by the terminal A with a group specified or an individual specified, it is announced to the ASP (application service provider) over a network. When the ASP answers the terminal A in response to the notification, the ASP transmits a contents provider a request to share the license among the terminals A, B, and C. If it is admitted, the contents provider transmits to the ASP a notification of the admitted sharing and licensed contents. The ASP provides a license for the terminal A, calls the terminals B and C and provides the license for them. When the license is successfully provided, a result notification is transmitted to the terminal A, thereby terminating the process.

When a payment is made based on the provided license, as shown in FIG. 2B, a correspondent financial institution of the network transmits a billing for monthly use rate to the terminal A. When the terminal A makes a payment, the correspondent financial institution of the network pays a use rate of the service to a correspondent financial institution of the ASP and a bill of ASP transmission communication rate, that is, monthly usage charge of inter-terminal communication rate is transmitted, a correspondent financial institution of the contents provider issues a bill for a license rate to the correspondent financial institution of the ASP. The correspondent financial institution of the ASP transmits a bill for a license sharing service rate to the terminal A. This is a total amount of billing including the ASP-originating and license rate. When the terminal A makes a payment, the correspondent financial institution of the ASP makes a payment to the correspondent financial institutions of the network and the contents provider.

The license sharing service rate includes the communication rate from the ASP to the terminals A through C, the license rate, and the commission (billing to owner) of the ASP. The communication rate from the ASP to the terminals A through C is the amount of billing from the network operator. The license rate is the amount of billing from the contents provider for the service used by the terminals B and C, FIGS. 3A and 3B respectively show a control sequence (A) and a payment sequence (B) when copyguard or transfer prohibition information is shared.

Figure 3A:
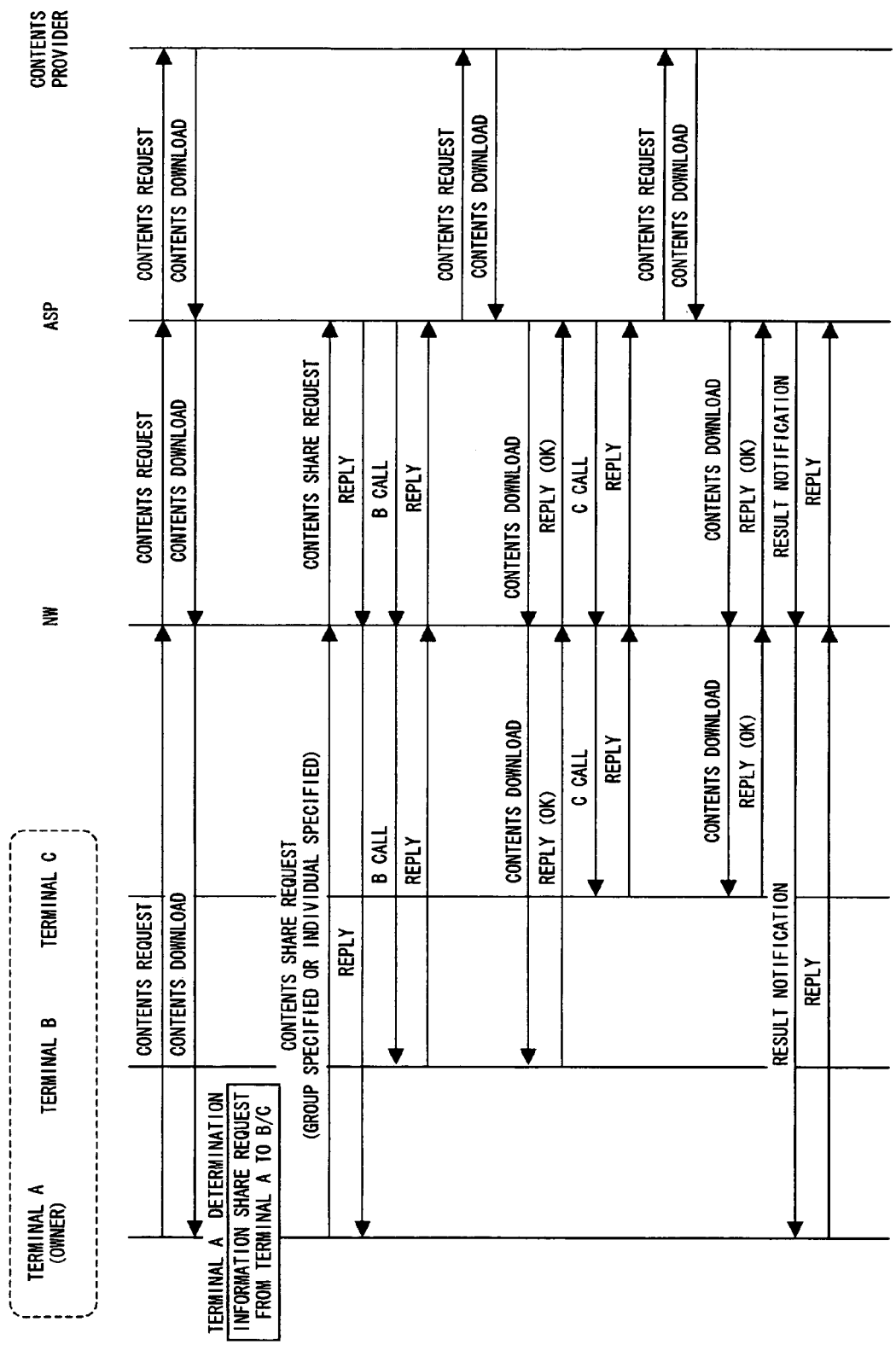
FIGS. 3A and 3B respectively show a control sequence (A) and a payment sequence (B) when copyguard or transfer prohibition information is shared.

In FIG. 3A, when the contents for which sharing of information is intended by the service user has the attribute of copyguard or transfer prohibited, the service user registers them in advance and distributes the contents to the terminal configuring a group. When the terminal A issues a request for the contents, it is transmitted to the contents provider, and the contents are downloaded from the contents provider to the terminal A. When the terminal A issues a request to share information with the terminals B and C, the request to share the contents is transmitted to the ASP. The ASP calls the terminals B and C for download of the contents. In this case, the contents are temporarily downloaded from the contents provider to the ASP, and the terminals B and C download the contents from the ASP. When the contents can be completely downloaded, a result notification is issued to the terminal A, thereby terminating the process.

Figure 3B:
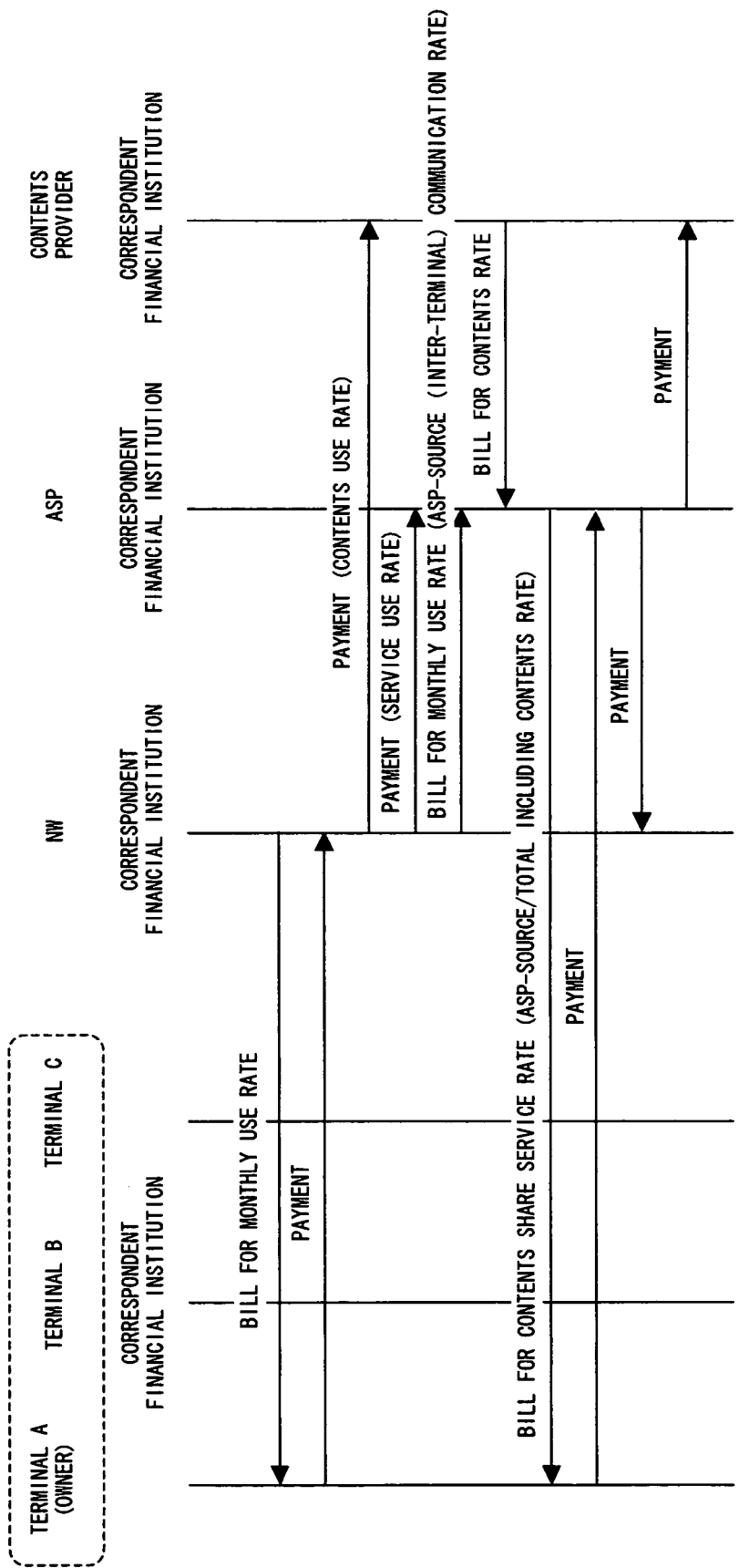

In the payment process shown in FIG. 3B, the correspondent financial institution of the network transmits a bill for a monthly use rate to the terminal A. When the payment is made, the correspondent financial institution of the network makes a payment of the contents use rate to the correspondent financial institution of the contents provider, and the service use rate is also paid to the correspondent financial institution of the ASP. The correspondent financial institution of the network issues a bill for the monthly use rate of the ASP-originating (among terminals) communication rate to the correspondent financial institution of the ASP. Then, the correspondent financial institution of the ASP issues a bill for the contents sharing service rate to the terminal A. When the payment is made from the terminal A to the correspondent financial institution of the ASP, the correspondent financial institution of the ASP makes a payment to the correspondent financial institutions of the network and the contents provider based on the preceding payment.

Figure 4A:
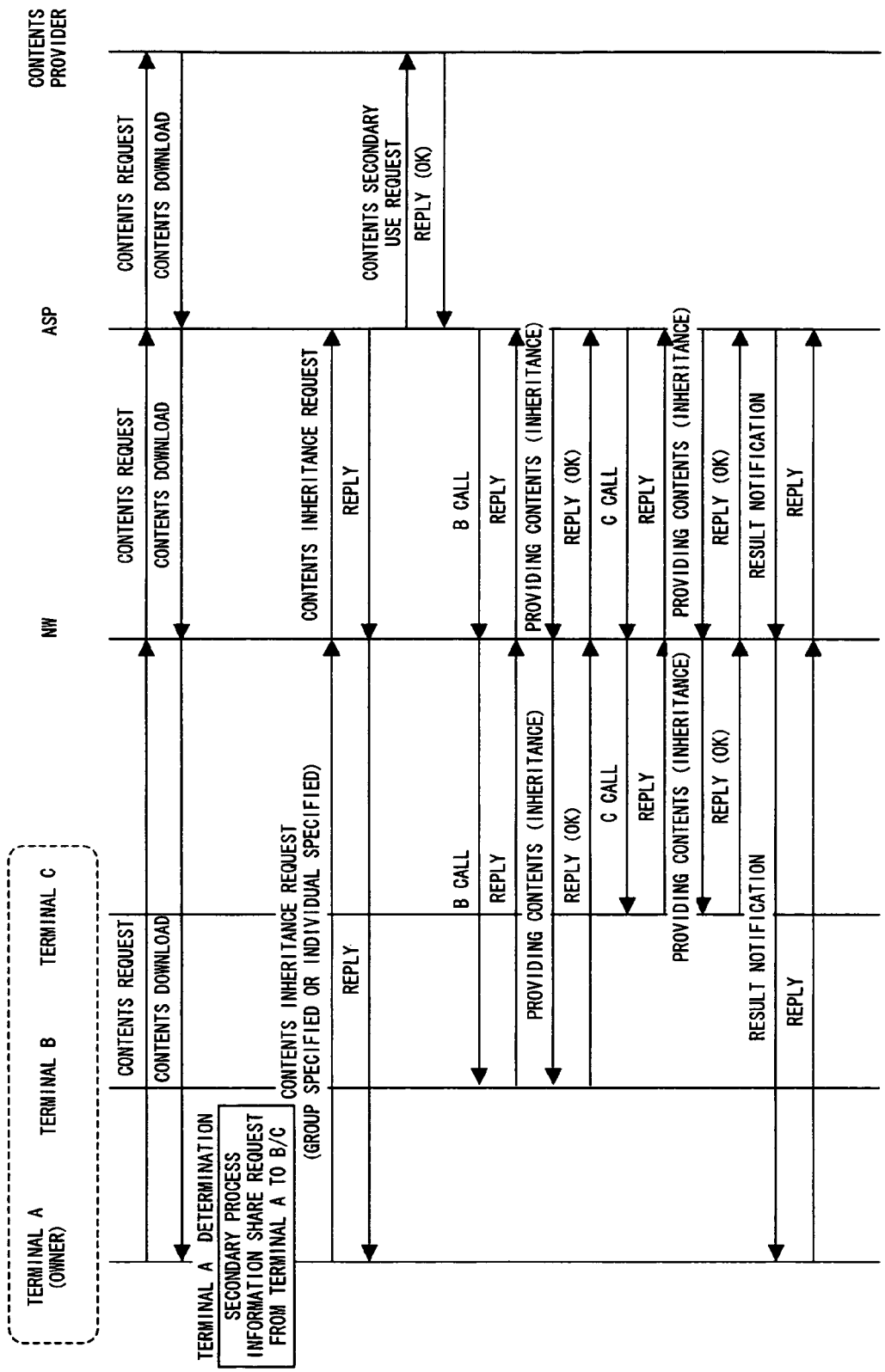
FIGS. 4A and 4B respectively show a control sequence (A) and a payment sequence (B) when a secondary use and processed contents information are inherited.
Figure 4B:
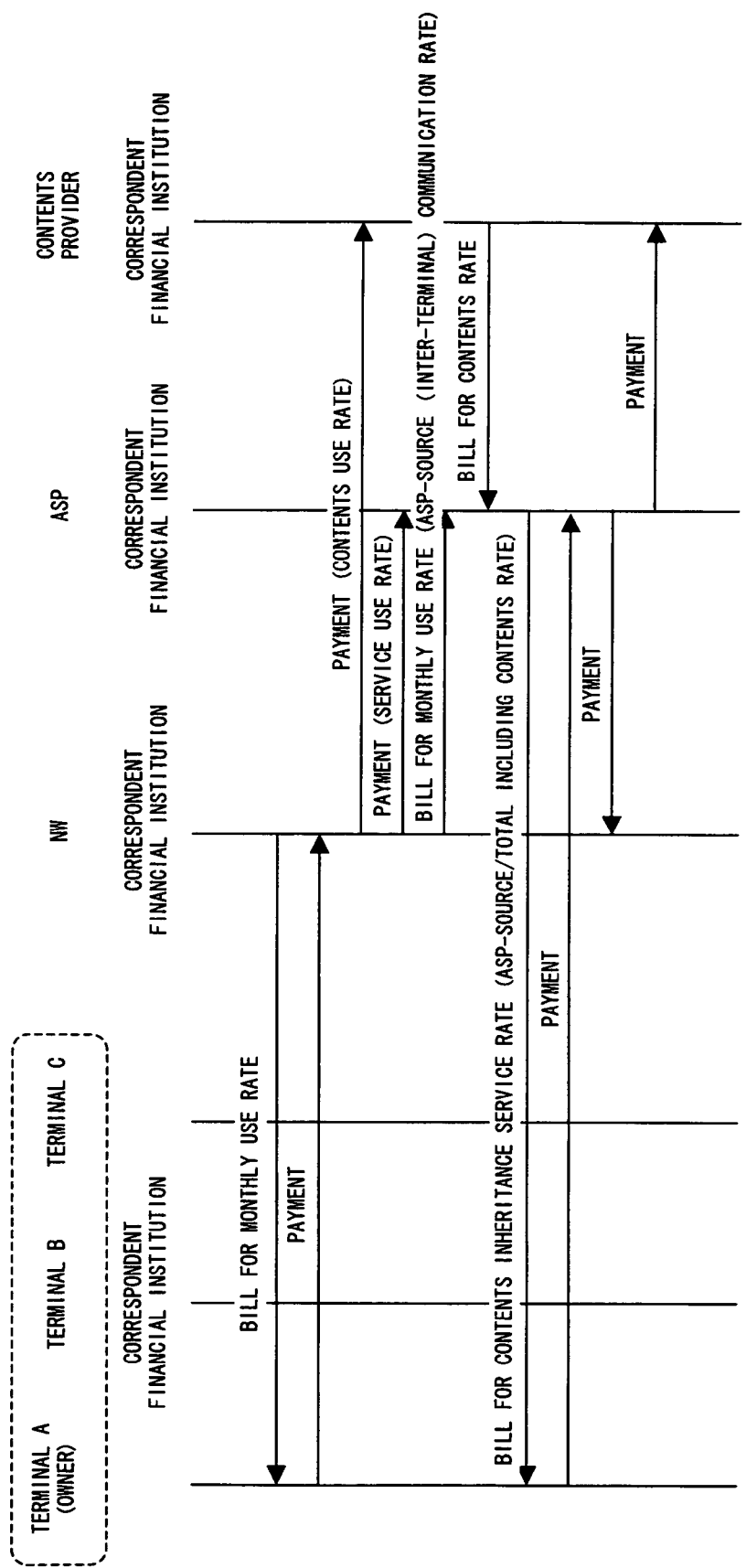

FIGS. 4A and 4B respectively show a control sequence (A) and a payment sequence (B) when a secondary use and processed contents information are inherited.

In FIG. 4A, to a part of the information being browsed by the service user, a secondary use such as the processing and the processed contents are registered by the service user in advance, and inherited to the terminal configuring a group. When the terminal A transmits a request for contents, the contents provider downloads the contents. To allow the terminals B and C to perform the secondary processing on the information, the terminal A transmits a request to inherit the contents to the ASP. Upon receipt of a reply, the ASP transmits a request for a secondary use of the contents to the contents provider. Upon receipt of permission from the contents provider, the ASP calls the terminals B and C, and provides the contents. When the contents can be normally provided, a result notification is transmitted to the terminal A, thereby terminating the process.

As shown in FIG. 4B, when a payment is made, the correspondent financial institution of the network issues a bill for a monthly use rate to the terminal A. When the payment is made, the correspondent financial institution of the network pays the contents use rate to the correspondent financial institution of the contents provider, and the service use rate to the correspondent financial institution of the ASP. The correspondent financial institution of the network issues a bill for the ASP-originating (among terminals) to the correspondent financial institution of the ASP. The correspondent financial institution of the contents provider transmits a bill for the contents rate to the correspondent financial institution of the ASP. The correspondent financial institution of the ASP issues a bill for the contents inheriting service rate to the terminal A. The contents inheriting service rate includes a communication rate from the ASP to the terminals A, B, and C, a contents rate, and a commission of the ASP. The contents rate is a secondary use rate for the contents of the terminals B and C. When a payment is made from the terminal A to the correspondent financial institution of the ASP, a payment is made to the correspondent financial institutions of the network and the contents provider.

Figure 5A:
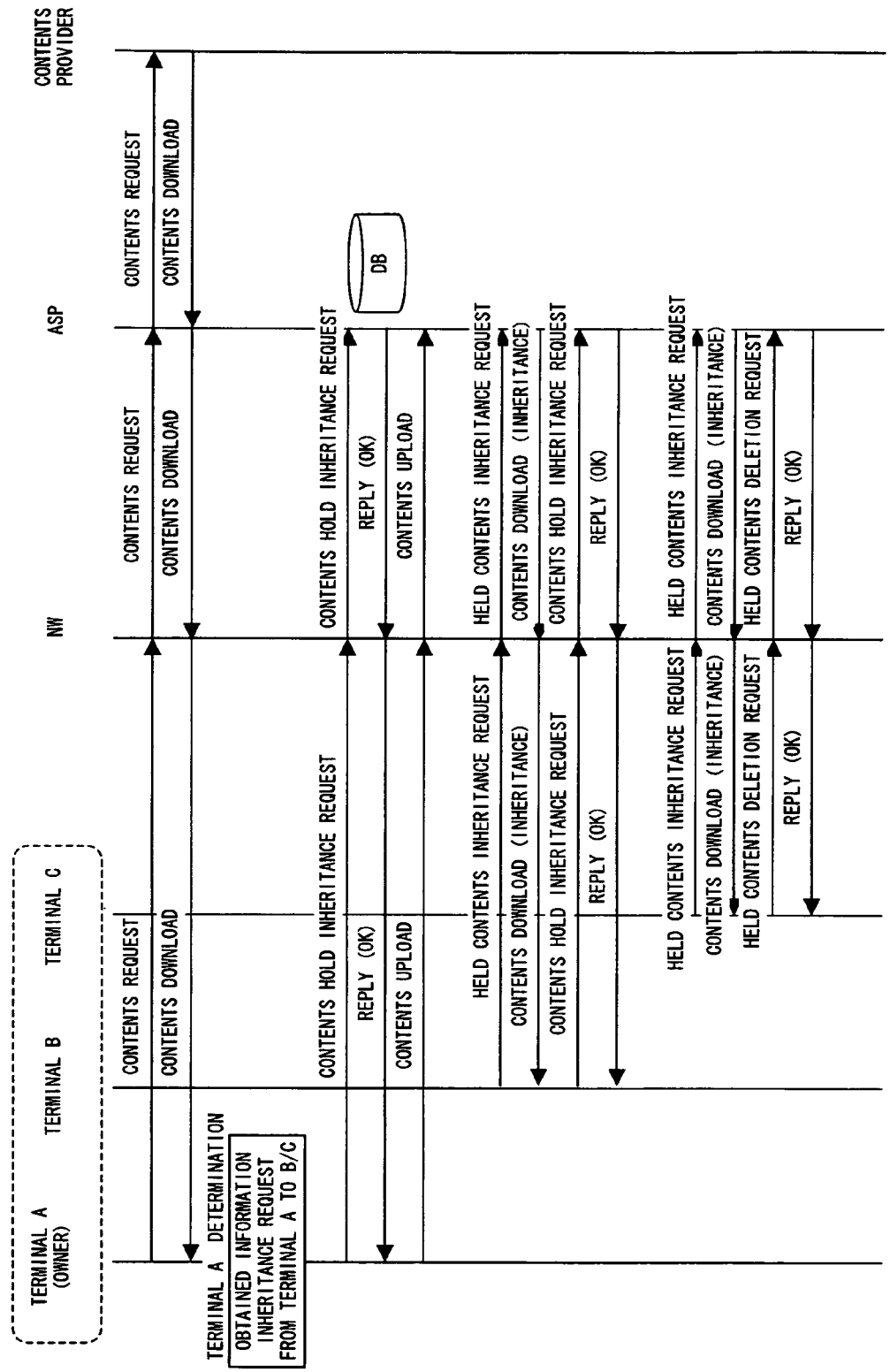

FIGS. 5A and 5B respectively show a control sequence (A) and a payment sequence (B) when downloaded and obtained contents are inherited between different terminals.

In FIG. 5A, by the service user registering in advance and the server system temporarily storing the information being browsed by the service user to inherit it among the terminals configuring a group, the information being browsed can be obtained through a different terminal. The terminal A downloads the contents from the contents provider. To allow the contents to be inherited by the terminals B and C, the terminal A transmits a request to hold and inherit the contents to the ASP. If the request is accepted, the terminal A uploads the contents to the ASP. When the terminals B and C request the ASP to inherit the held contents, they download the contents. The downloaded contents can be deleted from the terminal inheriting the held contents. In this case, the terminal B issues a request to hold the contents to the ASP, and the terminal C issues a request to delete the held contents from the ASP.

As shown in FIG. 5B, in this example, a bill for a monthly use rate is transmitted individually to each terminal from the correspondent financial institution of the network, and each terminal individually pays the service use rate to the correspondent financial institution of the ASP. The terminal A pays a contents use rate to the correspondent financial institution of the contents provider as an owner.

FIG. 6 shows a basic payment sequence followed when an ASP configuring a server system also functions as a network banker, and a service user opens an account in the network bank. When a user of the terminal A has a user account in the network bank of the ASP, transmitting and receiving processes can be omitted between the user account and the ASP account. In FIG. 6, the portion is encompassed by the dotted lines.

FIG. 7 shows a basic payment sequence followed when an ASP configuring a server system also functions as a network banker, and a service user and an information provider open an account in the network bank. When a user of the terminal A and the contents provider open an account in the network bank of the ASP, a bill for a payment, a payment process can be omitted among the user, the ASP, and the contents provider. In FIG. 7, the portion is encompassed by the dotted lines.

Figure 8:
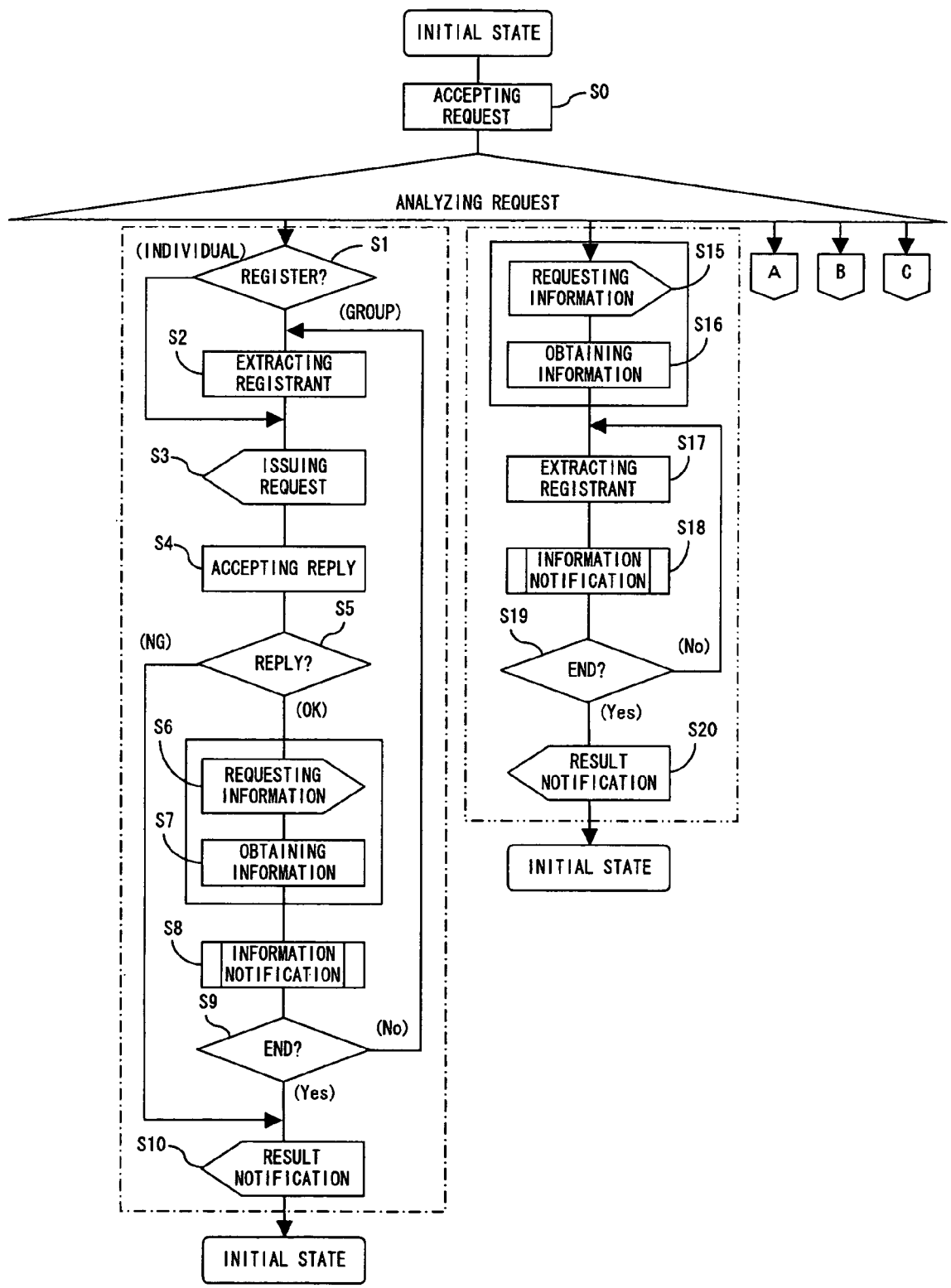
FIG. 8 is a flowchart (1) showing the basic process for sharing information according to an embodiment of the present invention.
Figure 9:
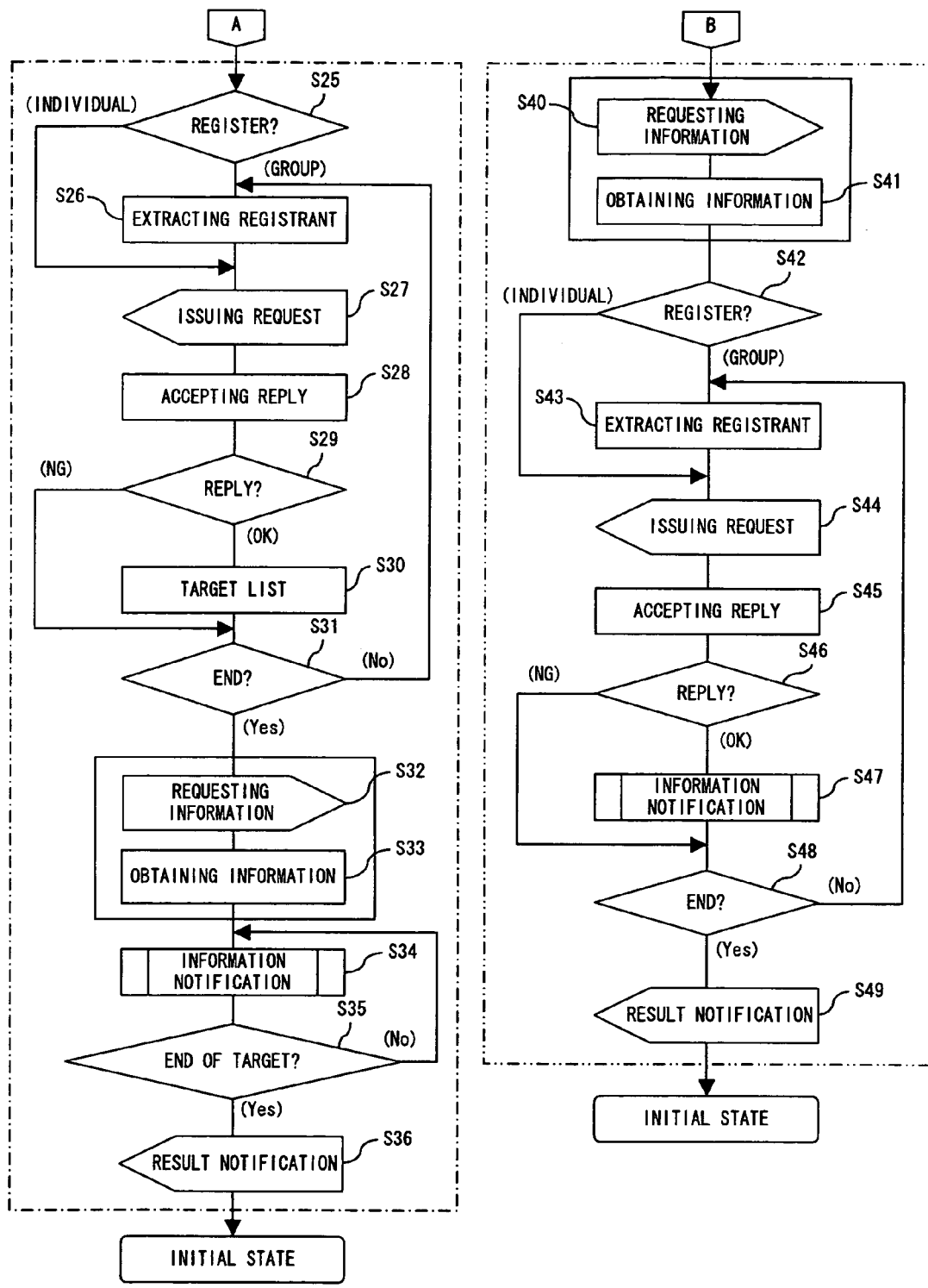
FIG. 9 is a flowchart (2) showing the basic process for sharing information according to an embodiment of the present invention.
Figure 10:
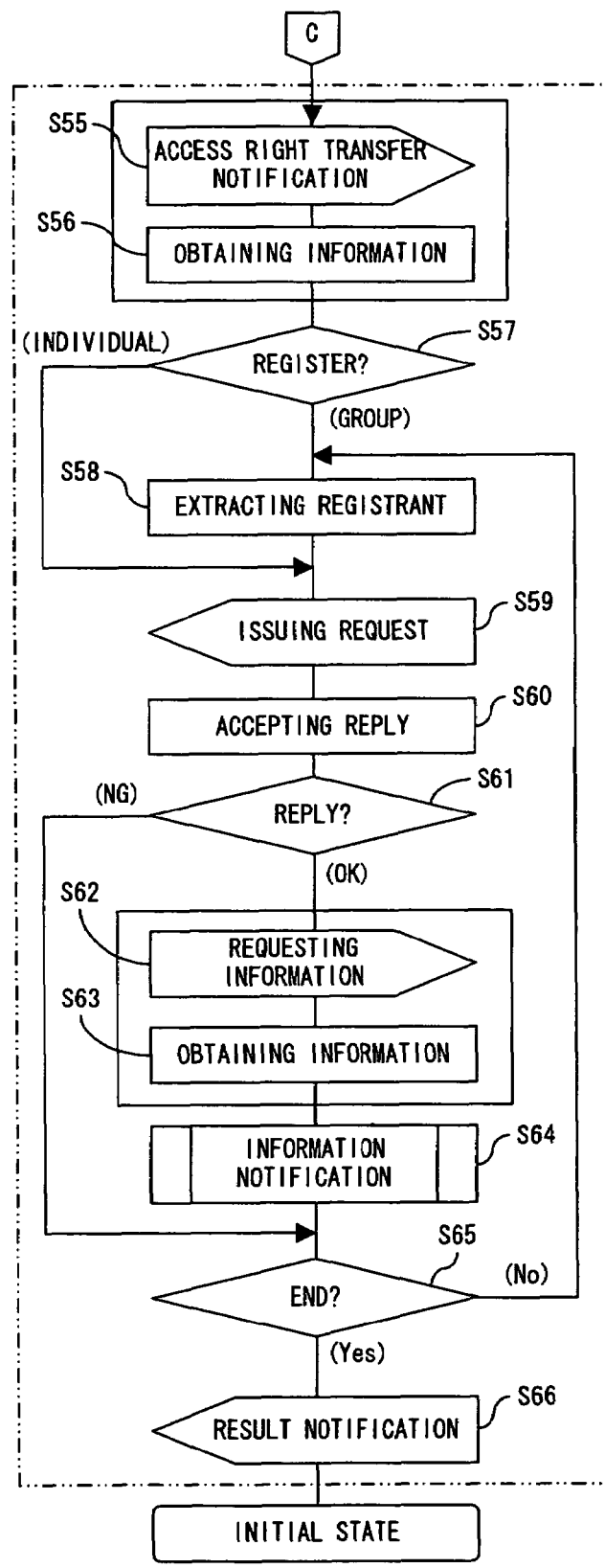
FIG. 10 is a flowchart (3) showing the basic process for sharing information according to an embodiment of the present invention.

FIGS. 8 through 10 are flowcharts showing the basic process for sharing information according to an embodiment of the present invention.

First in FIG. 8, in the initial state, a request from an owner of a license is accepted (step S0). A request is analyzed, and different processes are set depending on the contents of a request. In the left process shown in FIG. 8, according to the intension of each registrant, the information is obtained each time it is required, and the notification is issued to the registrant. In step S1, it is determined whether or not the partner to be provided with the contents is a registrant of the service. If it is registered as a group member, the registrant is extracted from the group in step S2. In step S3, a partner to be provided with the contents is requested to accept the provided contents. A reply is received in step S4. In step S5, the contents of the reply is determined. If the contents of the reply indicate the rejection of the contents, control is passed to step S10, the result is announced to the owner, and control is returned to the initial status. If the contents of the reply indicates the acceptance of the contents in step S5, a request for the information which are contents is issued to the contents provider in step S6. In step S7, the information which is the contents is obtained from the contents provider. In step S8, the information is transmitted to the registrant which has accepted receiving the contents. In step S9, it is determined whether or not a notification has been transmitted to all partners. If not, control is returned to step S2, and the processes are repeated. If yes, control is passed to step S10, a notification is issued to the owner, and control is returned to the initial state.

As a result of the request analysis, if a registrant is forcibly made to share the information (contents), control is passed to the flow in the center shown in FIG. 8. In step S15, a request for information is issued to the provider. In step S16, the information is obtained. In step S17, registrants to be provided with information are extracted, and the information is transmitted to them (step S18). It is determined in step S19 whether or not the notification is completed. If not, control is returned to step S17. If it is completed, a result notification is transmitted to the owner in step S20, thereby returning control to the initial step.

As a result of the request analysis, if the process requires the permission of a target person in advance, control is passed to the process A shown in FIG. 9. In step S25, it is determined whether or not a target person to be provided with information is a registrant. If the target person is registered as a group member, the registrant is extracted in step S26. In step S27, a request to share information is issued to the target person. In step S28, a reply is accepted. In step S29, the contents of the reply is checked. If a target person accepts sharing the information, the target person is entered in the target list in step S30. If the target rejects, control is passed to step S31. In step S31, it is determined whether or not all the targets are entered in the list. If not, control is returned to step S26, and the processes are repeated. If it is determined in step S31 that all targets have been entered in the list, the ASP issues a request for information to the provider in step S32. Then, in step S33, the information is obtained. In step S34, the information is transmitted to all targets in the target list. In step S35, it is determined whether or not all targets have been checked. If the determination in step S35 is NO, control is returned to step S34, and the notification of the information is continued. If the determination in step S35 is YES, a result notification is issued to the owner in step S36, and control is passed to the initial state.

As a result of a request analysis, if the acceptance of an information provider is required before sharing the information, control is passed to the flow B shown in FIG. 9. In steps S40 and S41, the ASP obtains the information from the provider. At this time, the permission of providing information is to be accepted from the provider, thereby obtaining the information. In steps S42 and S43, a provision target is extracted. In steps S44 and S45, a request to share information is issued to the provision target, and receives a reply. In step S46, if the reply refers to acceptance of providing information, then information is transmitted in step S47. When providing the information is rejected, control is passed to step S48. In step S48, it is determined whether or not providing information has been completed. If not, control is returned to step S43. When providing the information is completed, control is passed to step S49, a result is transmitted to the owner, thereby returning control to the initial state.

In flowcharts A and B, information can be obtained only once, and a notification of the information is repeatedly issued to the target, and the information is shared.

As a result of a request analysis, when information is to be shared by partly transferring an information access license, control is passed to the flow C shown in FIG. 10. In step S55, the ASP issues a transfer notification of an access right to the provider. In step S56, the information is obtained together with transfer permission. In steps S57 and S58, an information provision target is extracted. In steps S59 and S60, a request to share information is issued to the target, and a reply is received. In step S61, the contents of the reply is confirmed. In step S61, when sharing information is rejected, control is passed to step S65. In step S61, if sharing information is admitted, then the ASP issues a request to provide information to the provider in step S62. In step S63, the information is obtained. In step S64, the information is notified to the target. In step S65, it is determined whether or not the information has been notified to all targets. If not, control is returned to step S58. If it is determined in step S65 that all targets have been notified of the information, then, in step S66, the result is announced to the owner, and control is returned to the initial state.

In the process of C, the information limited to exclusive members, etc. can be shared by the owner partially transferring the access license of the shared information.

Figure 11:
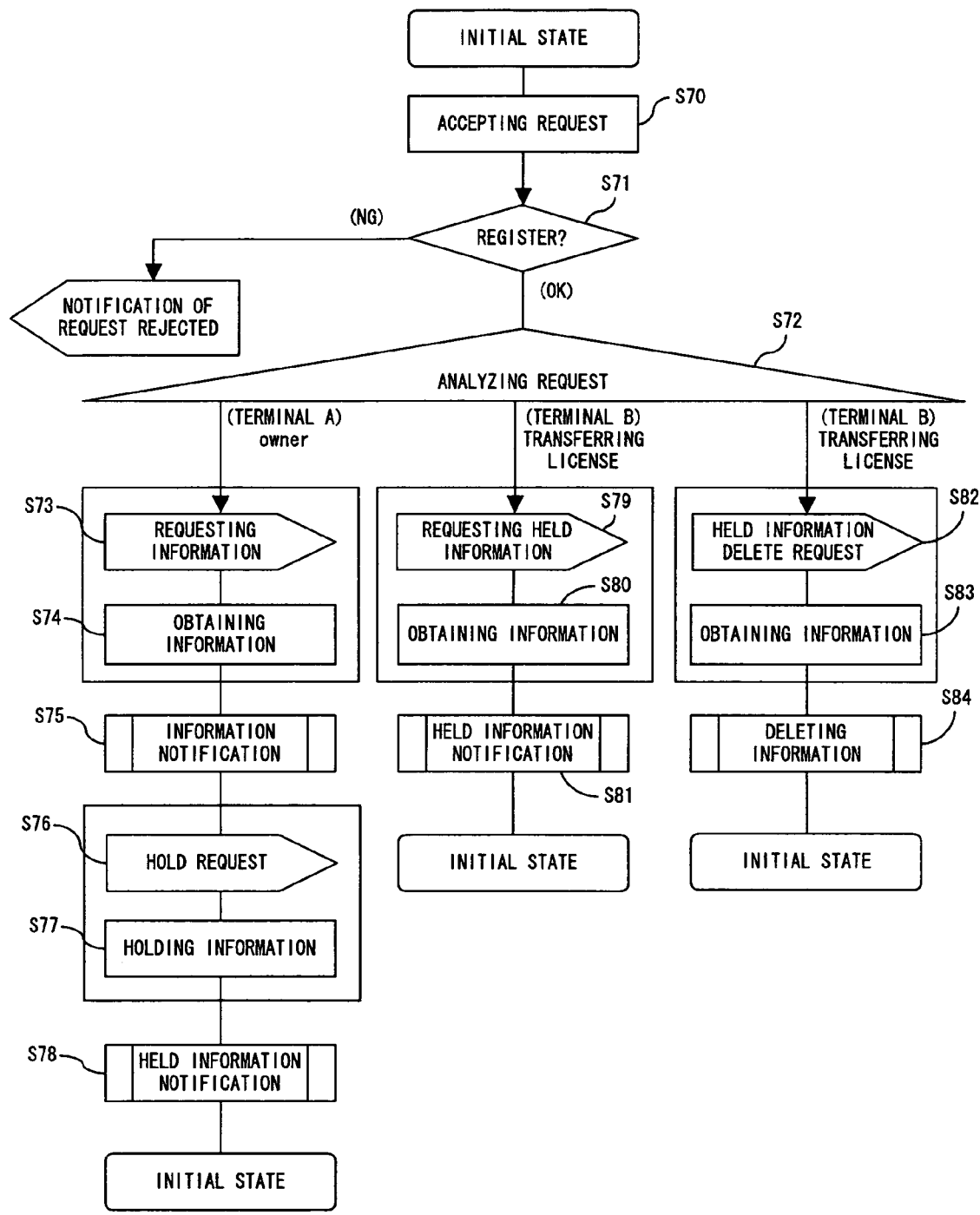
FIG. 11 shows a basic process of inheriting information according to an embodiment of the present invention.

FIG. 11 shows a basic process of inheriting information according to an embodiment of the present invention.

In step S70, requests from registrants for inheriting information including the owner are accepted. In step S71, it is determined whether or not a user is registered for an information inheriting service. If it is determined in step S71 that the user is not registered, a request rejection notification is issued. If a request is accepted in step S71, then a request analysis is performed in step S72. In the terminal A which is an owner, the information to be inherited is requested to an information provider in step S73, and the information is obtained in step S74. In step S75, the information is uploaded to the ASP, and a request to hold the information in the ASP is issued in step S76. In step S77, the information is held in the ASP. In step S78, the ASP notifies the terminal A of the held information, and the terminal A returns to the initial state.

The terminal B issues a request for held information to the ASP in step S79, and obtains information in step S80. In step S81, the ASP notifies the terminal B of the held information, and the terminal B returns to the initial state.

The terminal C notifies the ASP of a request to delete held information in step S82, and obtains information in step S83. In step S84, the ASP deletes information, and the terminal C terminates the process.

Figure 12:
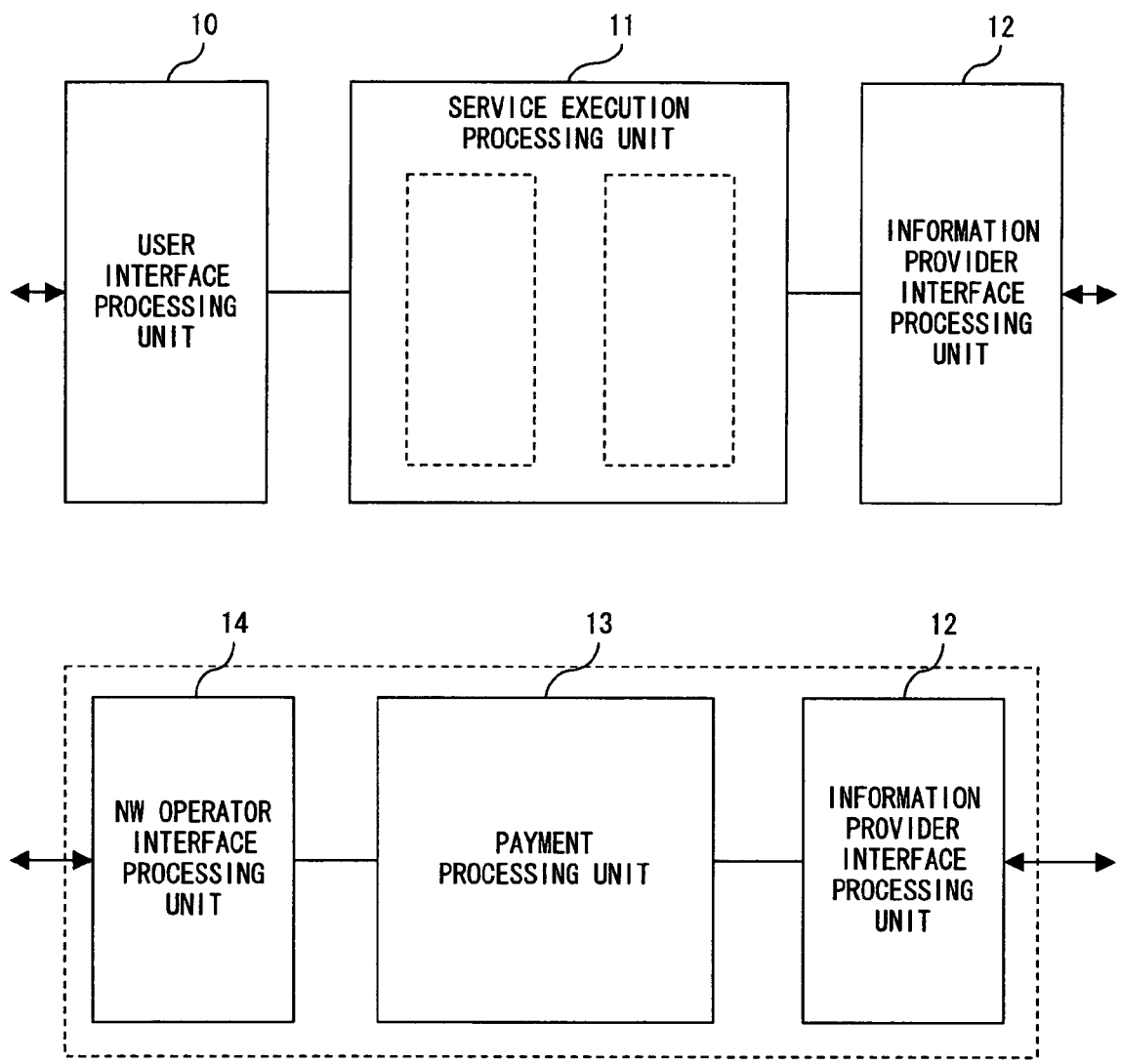
FIG. 12 shows the outline of the configuration of the process block according to an embodiment of the present invention.

FIG. 12 shows the outline of the configuration of the process block according to an embodiment of the present invention.

Figure 14:
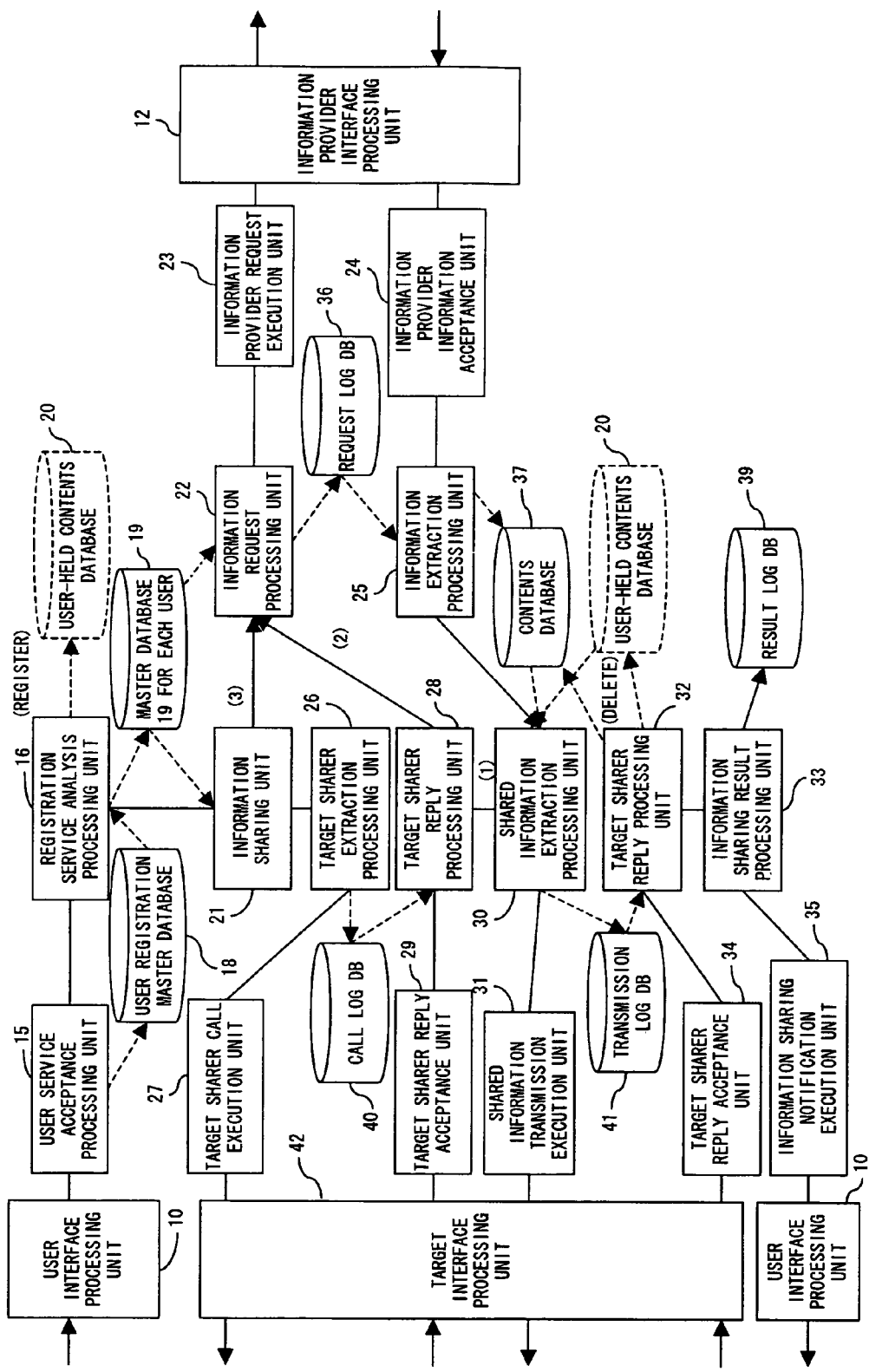
FIG. 14 is a block diagram of the process of sharing information at a request of a service user.
Figure 15:
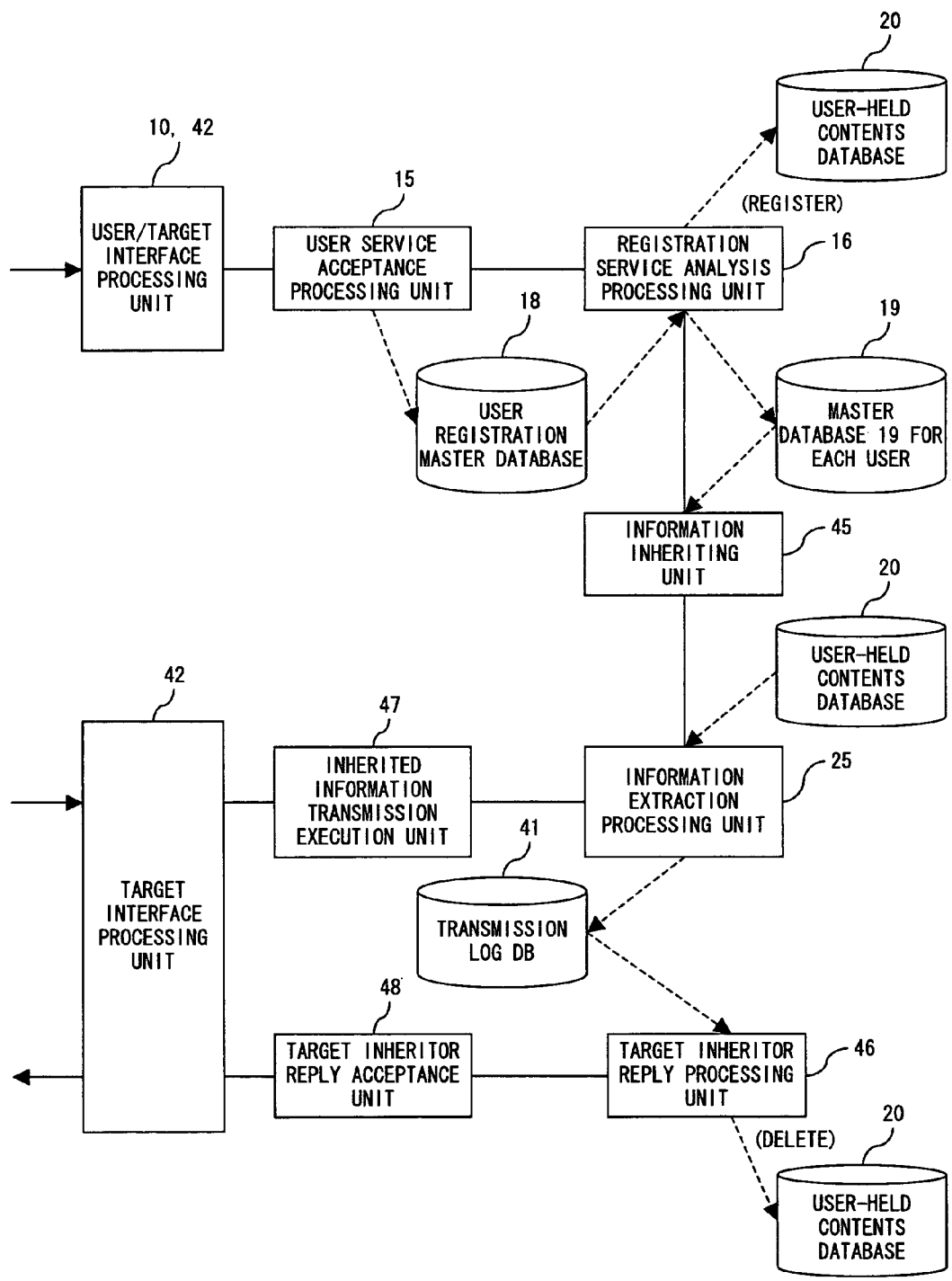
FIG. 15 is a block diagram of the process of inheriting information at a request of a service user.

The process block is configured by a user interface processing unit 10, an information provider interface processing unit 12, a network operator interface processing unit 14, a service execution processing unit 11 which realizes the function, and a payment processing unit 13. The two information provider interface processing units 12 are separately provided, but the same units can be used. The process block corresponding to the service execution processing unit 11 shown in FIG. 12 are shown in FIGS. 13 through 15, and the process block corresponding to the payment processing unit 13 is shown in FIGS. 21 through 29.

Figure 13:
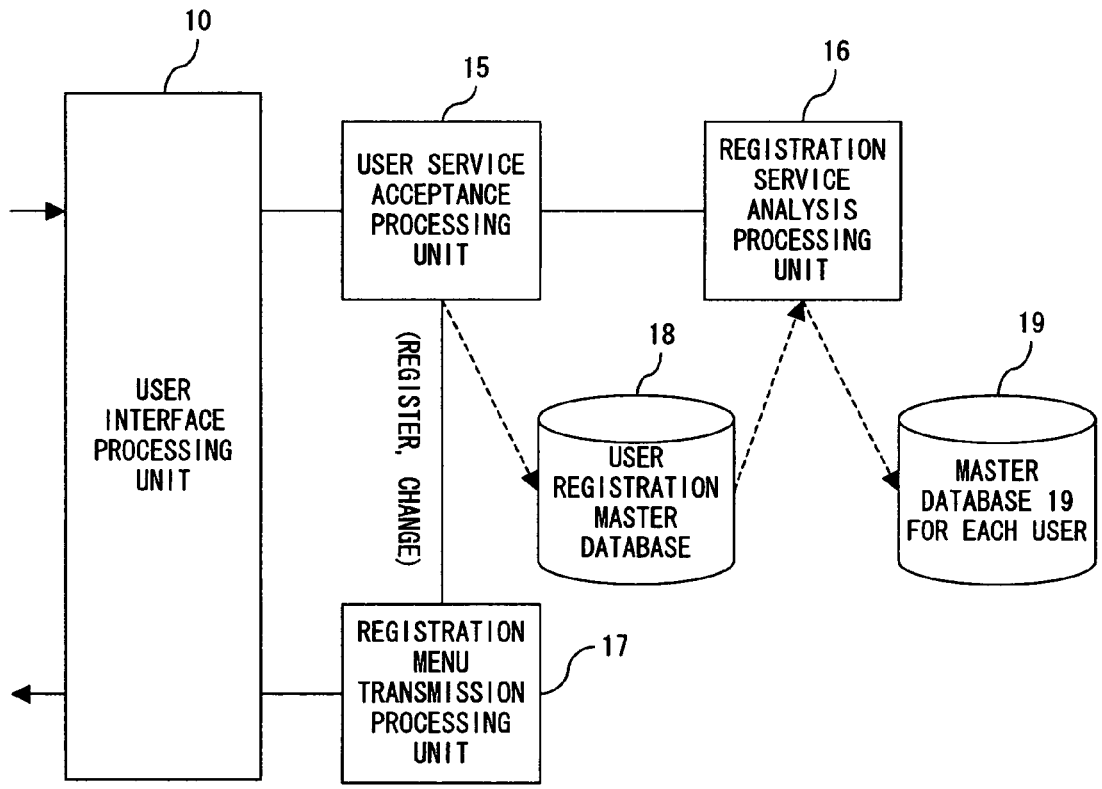
FIG. 13 is a block diagram of the process of accepting all procedures for a service user to use a service according to an embodiment of the present invention.

FIG. 13 is a block diagram of the process of a service user accepting all procedures for use of a service according to an embodiment of the present invention.

The ASP transmits and receives information with the portable mobile information terminal of a user through the user interface processing unit 10, and the contents of the received information are determined by a user service acceptance processing unit 15.

When a request from a user is new "registration" and "update" for using the service the user service acceptance processing unit 15 accepts a request to "register", "change", "stop", "release", and "start" a member (terminal) for use of the service by a service user, and the contents are stored in the user registration master database 18.

The user service acceptance processing unit 15 transmits the "registration menu" indicating the registered contents such as distribution request from a registration menu transmission processing unit 17 to the portable mobile information terminal of a user through the user interface processing unit 10.

The service user refers to the "registration menu" screen displayed on the screen of the portable mobile information terminal, inputs attribution information required for use of the service, and transmits the registered contents to the ASP, but the user service acceptance processing unit 15 stores the received registered contents in a user registration master database 18, and simultaneously a registration service analysis processing unit 16 analyzes the registered contents, and stores the registered contents for each user in master database 19 for each user.

The ASP accepts a request to "change" the registered contents, "start", "stop", and "release" a request in addition to "register" in the service use.

In each request, the user service acceptance processing unit 15 determines. When the registered contents from a user is to be changed, as with the service registration, the registration menu transmission processing unit 17 transmits the "registration menu" screen to the portable mobile information terminal of the user, receives the registered contents from user, and rewrites the user registration master database 18 and the master database 19 for each user.

When a service use "release" request from a service user is accepted, the user service acceptance processing unit 15 and the registration service analysis processing unit 16 deletes the information about the user of the user registration master database 18 and the master database 19 for each user.

When a service use "stop" request from a service user is accepted, the information about the user of the user registration master database 18 and the master database 19 for each user is inactivated.

When the service use "start" request from the service user is accepted, the information about the user of the user registration master database 18 and the master database 19 for each user is activated.

FIG. 14 is a block diagram of the process of sharing information at a request of a service user.

FIG. 14 is a block diagram of the process of sharing information at a request of a service user (requester), and (1) shown in FIG. 14 indicates a process block group in which the ASP temporarily stores the information browsed or owned by a service user for transmitting the information to information sharing target (hereinafter referred to as a target) specified by the service user.

In FIG. 14, (2) indicates a process block group in which the secondary use of the information held by a service user is permitted by an information provider holding the intellectual property rights for transmission of the contents held by a service user to a target.

In FIG. 14, (3) indicates a process block group in which the ASP checks the reply of the target at a request to share information from a service user, accesses the information provider having the information, and transmits the shared information to a target.

(1) When a service user commits the information to be shared with a target to the ASP When a service user intends to share information, and commits it to the ASP, the information committed to the ASP is stored in a user-held contents database 20 by the registration service analysis processing unit 16.

At a request (to share information) of a service user, an information sharing unit 21 and a target sharer extraction processing unit 26 extract a target from the master database 19 for each user, and simultaneously when it is recorded on a "call log DB 40", the target can be called through a target interface processing unit 42 by the target sharer call execution unit 27.

The reply from a target is accepted by a target sharer reply acceptance unit 29 through the target interface processing unit 42, and compared with the "call log DB 40" by a target sharer reply processing unit 28.

When a target sharer returns a reply that it accepts sharing information, a shared information extraction processing unit 30 extracts the information from the user-held contents database 20, records it in a "transmission log DB 41", and simultaneously transmits the information specified by a user for the target using a shared information transmission execution unit 31 through the target interface processing unit 42.

The reply about sharing information from the target sharer is accepted by a target sharer reply acceptance unit 34 through the target interface processing unit 42, compared with the reply contents for the "transmission log DB 41" by a target sharer reply processing unit 32. When a target information sharing has terminated, the information is deleted from the user-held contents database 20.

An information sharing result processing unit 33 processes the result of information sharing intended by a service user, records the result in a "result log DB 39", and simultaneously notifies the service user by an information sharing notification execution unit 35 through the user interface processing unit 10.

(2) When the ASP obtains the information to be shared with a target by a service user from the information provider as a proxy agent, The information sharing unit 21 and the target sharer extraction processing unit 26 extract a target from the master database 19 for each user at a request (information sharing) of a service user, record it in the "call log DB 40", and simultaneously calls the target by a target sharer call execution unit 27 through the target interface processing unit 42.

The reply from the target is accepted by the target sharer reply acceptance unit 29 through the target interface processing unit 42, and is compared with the "call log DB 40" by the target sharer reply processing unit 28.

When a target sharer issues a reply that it admits sharing information, an information request processing unit 22 extracts the request contents of the service user from the master database 19 for each user, records the information corresponding to the information provider in a "request log DB 36", and simultaneously requests the information provider by an information provider request execution unit 23 through the information provider interface processing unit 12.

The information from the information provider is accepted by an information provider information acceptance unit 24 through the information provider interface processing unit 12, compared with the contents of the "request log DB 36" by an information extraction processing unit 25, and the result (information from the information provider) is stored in a contents database 37.

The shared information extraction processing unit 30 extracts the information from the contents database 37, records it in the "transmission log DB 41", and simultaneously transmits the information specified by the user for the target using the shared information transmission execution unit 31 through the target interface processing unit 42.

The reply about sharing information from the target sharer is accepted by a target sharer reply acceptance unit 34 through the target interface processing unit 42, compared with the reply contents for the "transmission log DB 41" by a target sharer reply processing unit 32. When a target information sharing has terminated, the information is deleted from the contents database 37.

An information sharing result processing unit 33 processes the result of information sharing intended by a service user, records the result in a "result log DB 39", and simultaneously notifies the service user by an information sharing notification execution unit 35 through the user interface processing unit 10.

(3) When a service user commits the information to be shared with a target to the ASP (however, it is necessary to use the information only after obtaining permission of an information provider)

The information request processing unit 22 extracts request contents for permission of "secondary use", etc. of the information (stored in the user-held contents database 20) committed by the service user to the ASP from the master database 19 for each user, records the information corresponding to the information provider in the "request log DB 36", and simultaneously requests the information provider for the information by the information provider request execution unit 23 through the information provider interface processing unit 12.

The information from the information provider is accepted by the information provider information acceptance unit 24 through the information provider interface processing unit 12, and compared with the contents of the "request log DB 36" by the information extraction processing unit 25. When the information provider answers that the "secondary use" of the information is understood, the shared information extraction processing unit 30 extracts the information from the user-held contents database 20, records the information in the "transmission log DB 41", and simultaneously transmits the information specified by the service user for the target using the shared information transmission execution unit 31 through the target interface processing unit 42.

The following process is performed before or after, or concurrently with the above mentioned process.

At a request (sharing information) of a service user, the information sharing unit 21 and the target sharer call execution unit 26 extracts a target from the master database 19 for each user, records it in the "call log DB 40", and simultaneously the target sharer call executing unit 27 calls the target through the target interface processing unit 42.

The reply from the target is accepted by the target sharer reply acceptance unit 29 through the target interface processing unit 42 and compared with the "call log DB 40" by the target sharer reply processing unit 28.

When the target sharer answers that sharing information is accepted, the shared information extraction processing unit 30 extracts the information from the user-held contents database 20, records the information in the "transmission log DB 41", and simultaneously the shared information transmission execution unit 31 transmits the information specified by the service user to the target through the target interface processing unit 42.

The reply relating to sharing information from a target sharer is accepted by the target sharer reply acceptance unit 34 through the target interface processing unit 42, the target sharer reply processing unit 32 compares the reply contents with the "transmission log DB 41". When a target information sharing terminates, the information is removed from the user-held-contents database 20.

The information sharing result processing unit 33 processes the result of sharing information intended by a service user, records the result in the "result log DB 39", and simultaneously the information sharing notification execution unit 35 notifies the service user through the user interface processing unit 10.

FIG. 15 is a block diagram of the process for inheriting information at a request of a service user (requester).

In FIG. 15, the target inheritors specifying the information (for example, the information downloaded from the Web site in the Internet to a terminal) being used by a service user use the information by inheriting the information.

A request from a service user is analyzed by the registration service analysis processing unit 16, and the inheriting requested information specified by the service user is stored in the user-held contents database 20.

The user service acceptance processing unit 15 and the registration service analysis processing unit 16 perform a predetermined process on a request to inherit information from a target inheritor through the target interface processing unit 42. An information inheriting unit 45 validates it using the contents of the master database 19 for each user. When a request to inherit information from a target inheritor is valid, the information extraction processing unit 25 extracts the information from the user-held contents database 20, records the information in the "transmission log DB 41", and a inherited information transmission execution unit 47 simultaneously transmits the information to be inherited to the target inheritor through the target interface processing unit 42.

The reply relating to inheriting information from a target inheritor is accepted by a target inheritor reply acceptance unit 48 through the target interface processing unit 42, a target inheritor reply processing unit 46 compares the reply contents with the "transmission log DB 41", and removes the information from the user-held contents database 20 when the subsequent inheritance is not required.

Figure 16:
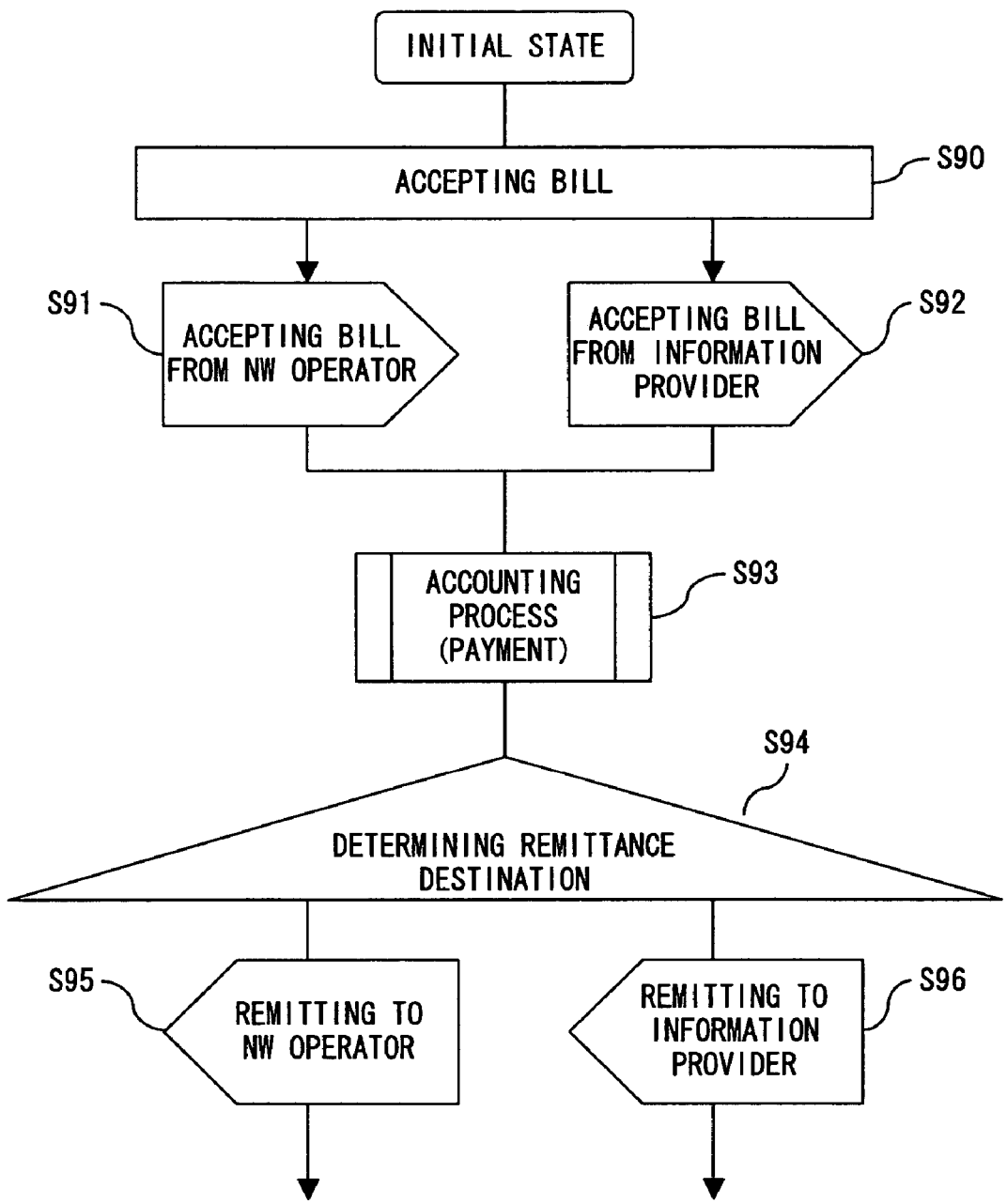
FIG. 16 shows the basic outline (1) of the payment process according to an embodiment of the present invention.
Figure 17A:
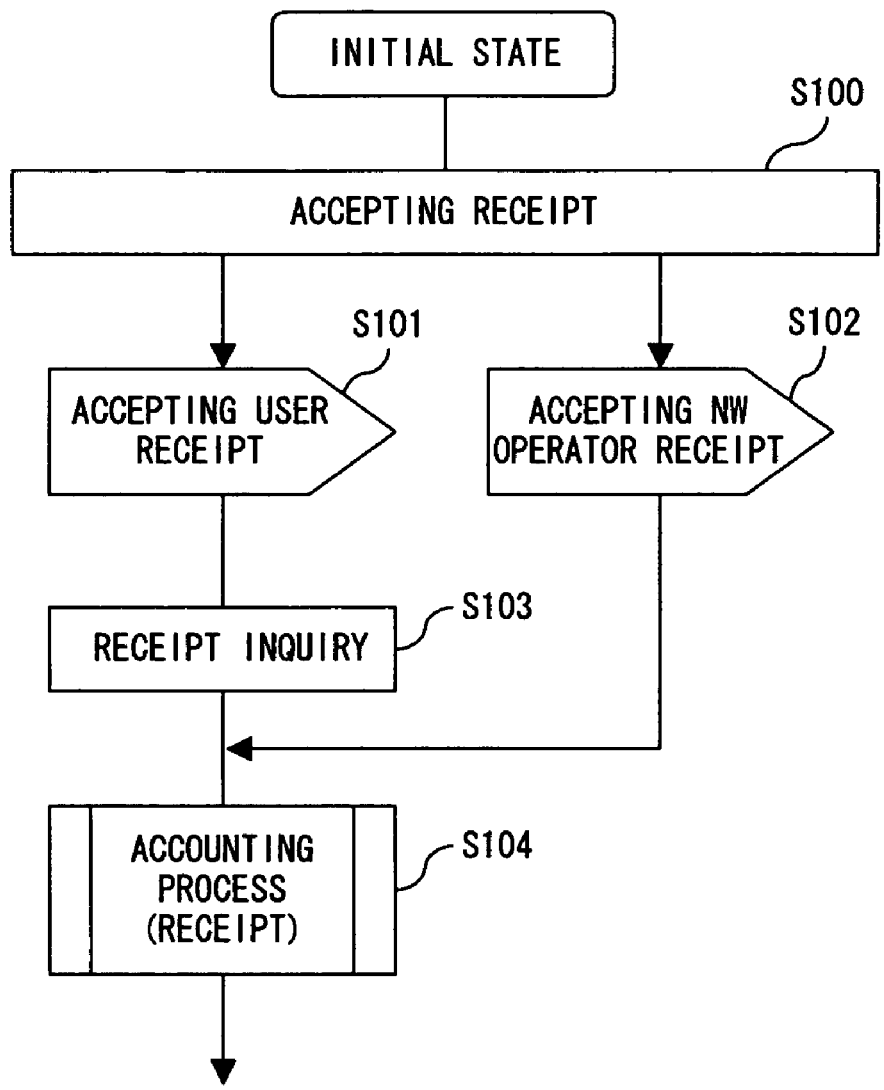
FIGS. 17A and 17B show the basic outline (2) of the payment process according to an embodiment of the present invention.
Figure 17B:
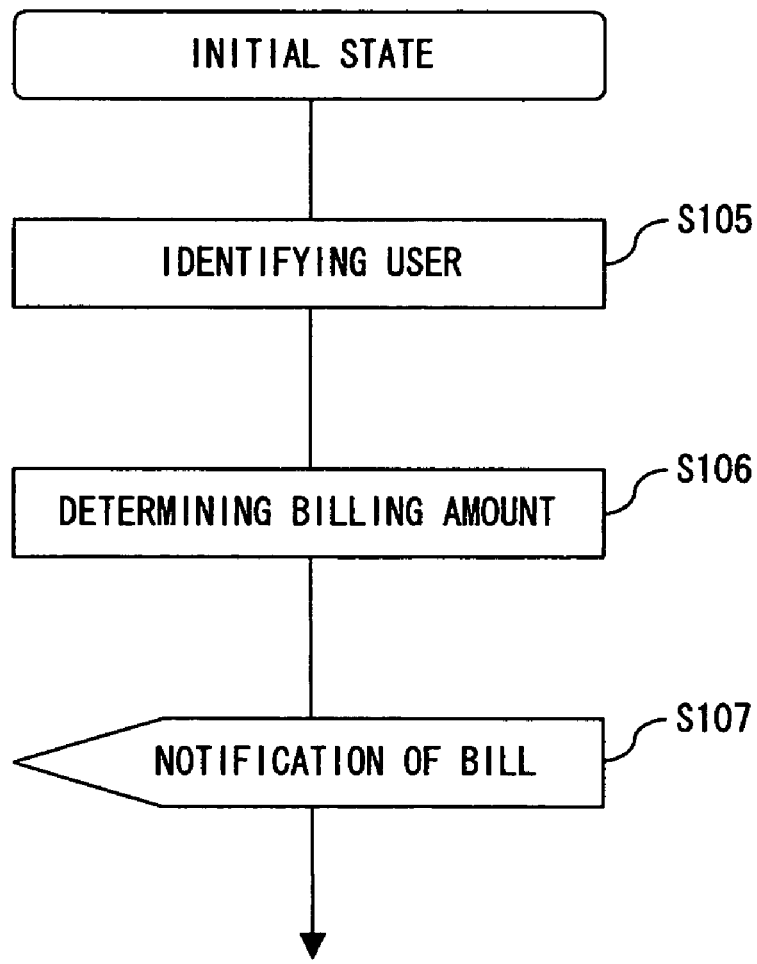

FIGS. 16, 17A, and 17B show the basic outline of the payment process according to an embodiment of the present invention.

FIG. 16 shows the billing from a network operator (for example, a mobile communications carrier) and an information provider, and the basic payment process based on the billing. FIG. 17 shows a payment from a network operator (for example, a mobile communications carrier) and a service user, and a basic payment process of billing a use rate to a service user.

In FIG. 16, in step S90, a bill is accepted. In step S91, a bill from a network operator is accepted. In step S92, a bill from an information provider is accepted. In step S93, an accounting process is performed. In step S94, a destination of a remittance is determined. In step S95, a remittance is performed to a network operator. In step S96, a remittance is performed to an information provider.

In FIG. 17A, a payment is accepted in step S100. In step S101, a payment from a user is accepted. In step S103, a payment inquiry is performed. In step S102, a payment from a network operator is accepted. In step S104, an accounting process is performed. In FIG. 17B, a user is identified in step S105. In step S106, a billing amount is determined. In step S107, a billing notification is transmitted to the user.

Figure 19:
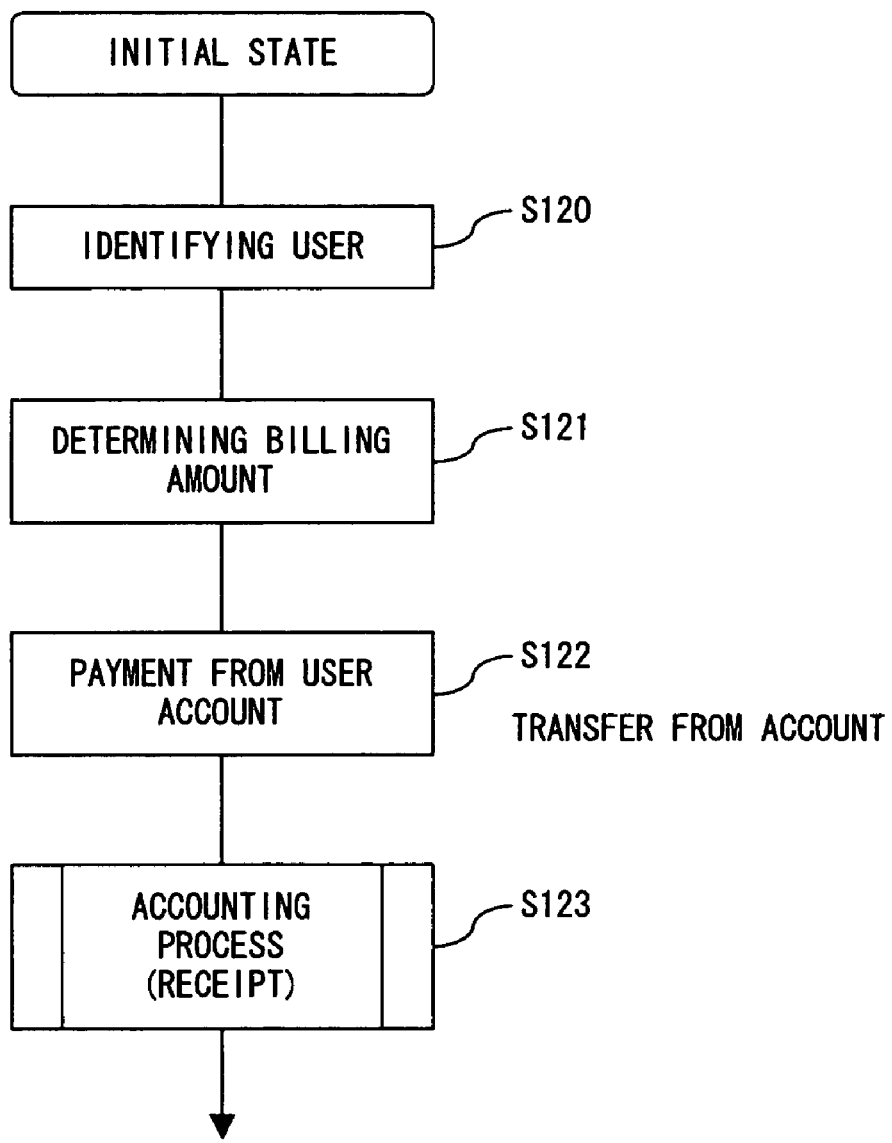
FIG. 19 shows a payment process (2) followed when an ASP configuring a server system also functions as a network banker, and a service user opens an account in the network bank.

FIGS. 18 and 19 show a payment process (1) followed when an ASP configuring a server system also functions as a network banker, and a service user opens an account in the network bank.

FIG. 18 shows the payment from the account at billing for a monthly rate from a network operator. FIG. 19 shows the basic payment process of payment from the account at billing from an ASP configuring a server system.

In FIG. 18, in step S110, a bill is accepted. In step S111, a bill from a network operator is accepted. In step S112, a user is identified. In step S113, a payment is made from a user account as a communication rate and a service rate (a commission of a network operator and a service providing rate of an ASP). In step S114, a payment category is determined. In step S115, a total of a communication rate to be paid to a network operator and a commission to be paid to a network operator is remitted. Instep S116, a service providing rate of an ASP is paid in an accounting process.

In FIG. 19, in step S120, a user is identified. In step S121, a billing amount is determined. In step S122, a payment is made through a user account. In step S123, a accounting process is performed.

Figure 20:
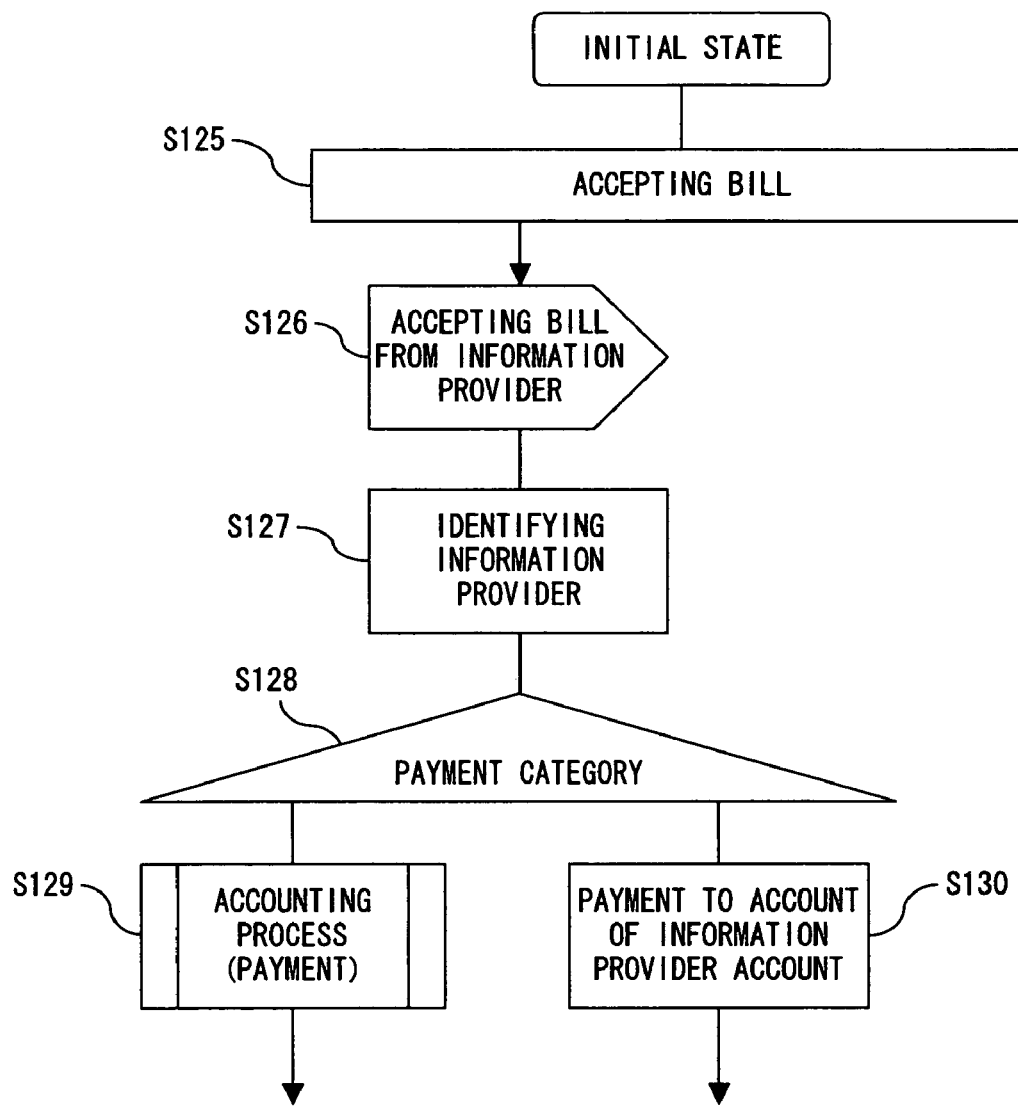
FIG. 20 shows a basic payment process followed when an ASP configuring a server system also functions as a network banker, and an information provider opens an account in the network bank.

FIG. 20 shows a basic payment process followed when an ASP configuring a server system also functions as a network banker, and an information provider opens an account in the network bank.

In step S125, a bill is accepted. In step S126, a bill from an information provider is accepted. In step S127, an information provider is identified. In step S128, a payment category is determined. In step S129, an accounting process is performed. In step S130, a payment is made to the account of an information provider.

Figure 21:
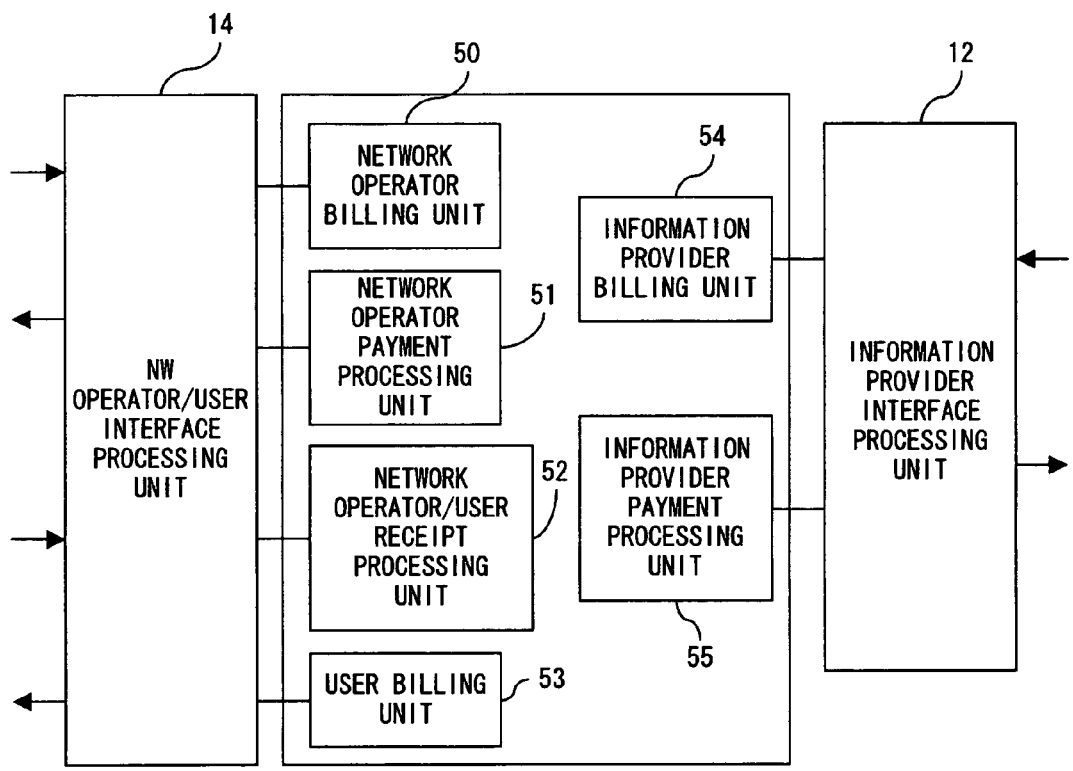
FIG. 21 shows the outline of the configuration of the payment process according to the present invention.

FIG. 21 shows the outline of the configuration of the payment process according to the present invention.

Fundamentally, the processes are formed by billing from the communication network operator (hereinafter referred to as an NW operator for short) and an information provider and the payment process for the billing and the payment (profit of the ASP, which are related to the realization of the present service)

The payment process of the service is described based on the payment of the service use rate by rate collection by a contract subscriber as a proxy agent.

Through the network operator interface processing unit 14, a network operator billing unit 50 accepts a bill from a network operator. A network operator payment processing unit 51 performs a payment process through the network operator interface processing unit 14. The payment of a network operator and a user is performed by a network operator/user receipt processing unit 52. A billing process to a user is performed by a user billing unit 53. A bill from the information provider is received by an information provider billing unit 54 through the information provider interface processing unit 12, and processed by a information provider payment processing unit 55.

Figure 22:
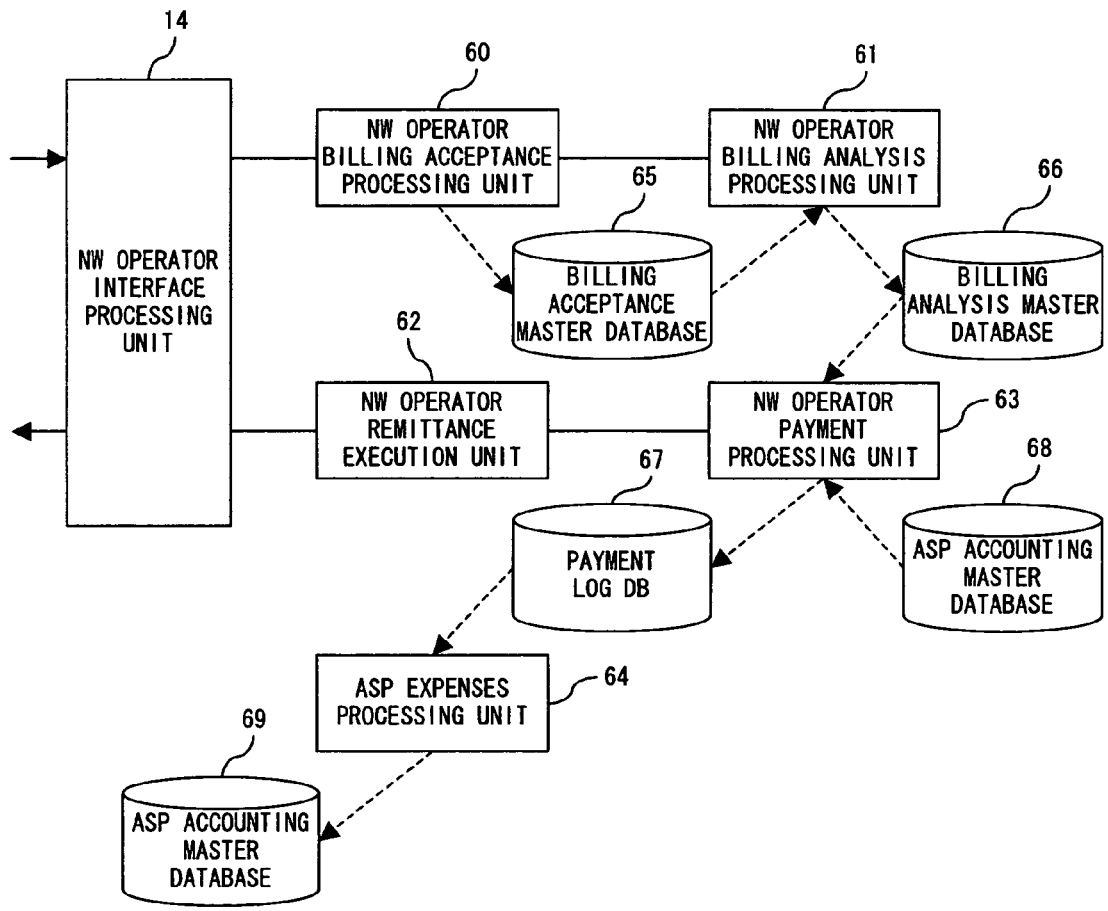
FIG. 22 is a block diagram of the process of making a payment by an ASP configuring a server system to a network operator upon receipt of a bill from the network operator.

FIG. 22 is a block diagram of the process of making a payment by an ASP configuring a server system to a network operator upon receipt of a bill from the network operator.

FIG. 22 shows the case in which an ASP pays a bill to an NW operator at billing from the NW operator.

A bill from an NW operator is accepted by an NW operator billing acceptance processing unit 60 through the NW operator interface processing unit 14, the contents of the bill is stored in a billing acceptance master database 65, an NW operator billing analysis processing unit 61 analyzes the validity of the contents of the bill, and the result is stored in a billing analysis master database 66.

An NW operator payment processing unit 63 performs a necessary payment process from the billing analysis master database 66 and an ASP accounting master database 68, and records the result in a "payment log DB 67", and simultaneously an NW operator remittance execution unit 62 performs a remittance process to the correspondent financial institution of the NW operator through the network operator interface processing unit 14.

An ASP expenses processing unit 64 performs a payment process in an accounting process from the "payment log DB 67", and the result is reflected by an ASP accounting master database 69.

Figure 23:
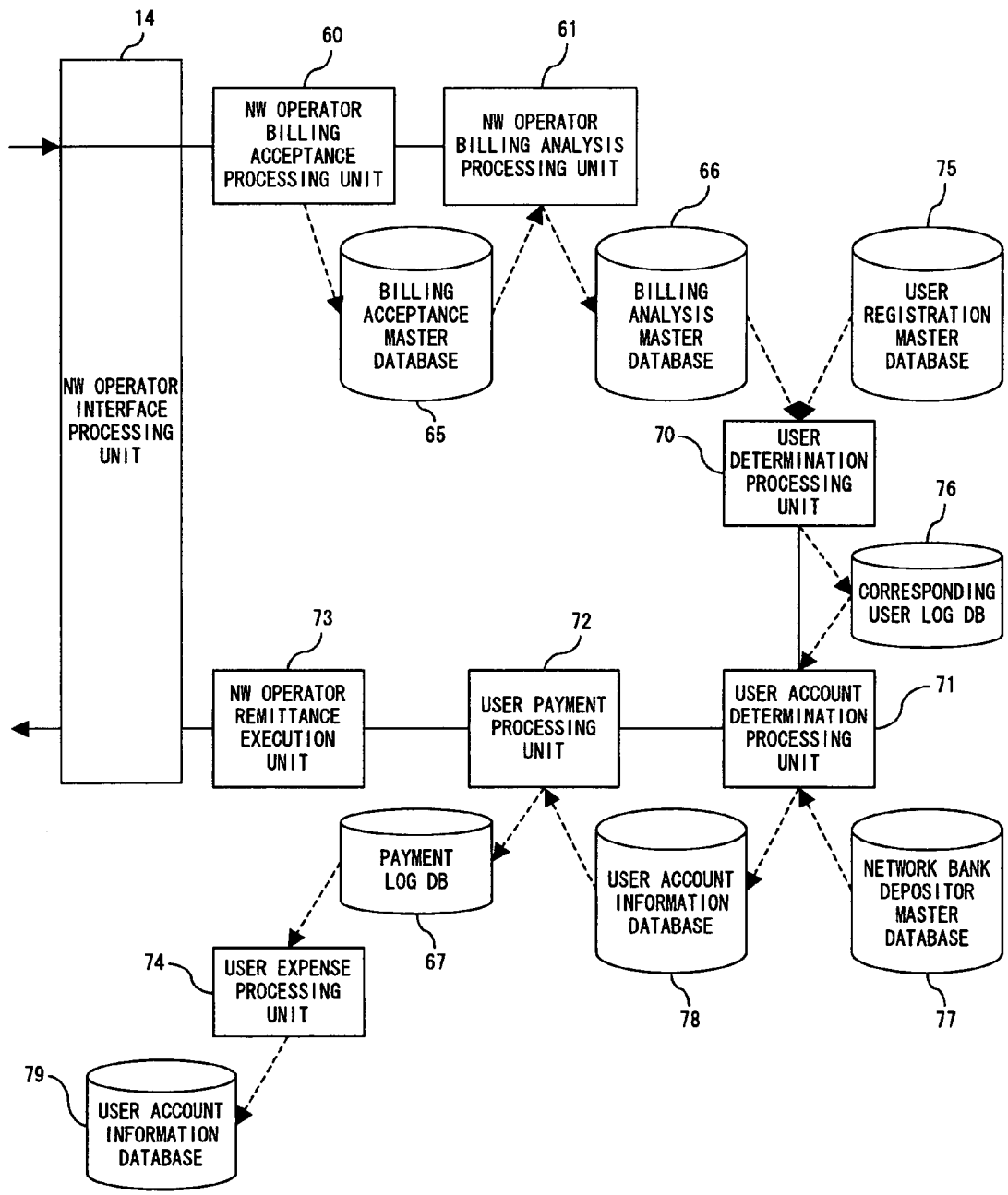
FIG. 23 is a block diagram of the process of making a payment of a monthly rate by a service user to a network operator upon receipt of a bill from the network operator when an ASP configuring a server system also functions as a network banker, and the service user opens an account in the network bank.

FIG. 23 is a block diagram of the process of making a payment of a monthly rate by a service user to a network operator upon receipt of a bill from the network operator when an ASP configuring a server system also functions as a network banker, and the service user opens an account in the network bank.

FIG. 23 shows the case where monthly charge of the service user is paid to the NW operator due to a bill from the NW operator when the ASP functions as a network bank and the service user has an account in the network bank.

A bill from an NW operator is accepted by the NW operator billing acceptance processing unit 60 through the NW operator interface processing unit 14, the contents of a bill are stored in the billing acceptance master database 65, the NW operator billing analysis processing unit 61 analyzes the validity of the contents of the bill, and the result is stored in the billing analysis master database 66.

As the analysis result, when the contents of the bill from an NW operator refer to a bill addressed to a service user which opens an account in a network bank operated by the ASP, a user determination processing unit 70 checks the corresponding service user from a user registration master database 75, and the result is stored in a "corresponding user log DB 76".

A user account determination processing unit 71 checks a corresponding service user from the "corresponding user log DB 76" and a network bank depositor master database 77 which is a depositor list of a network bank, and extracts a user account information database 78.

A user payment processing unit 72 processes a payment procedure of the bill from the NW operator based on the user account information database 78, and records the result in the "payment log DB 67", and an NW operator remittance execution unit 73 simultaneously performs a remitting process to a correspondent financial institution of the NW operator.

A user expense processing unit 74 performs a payment process from the account of the service user from the "payment log DB 67", and reflects the result by a user account information database 79.

Figure 24:
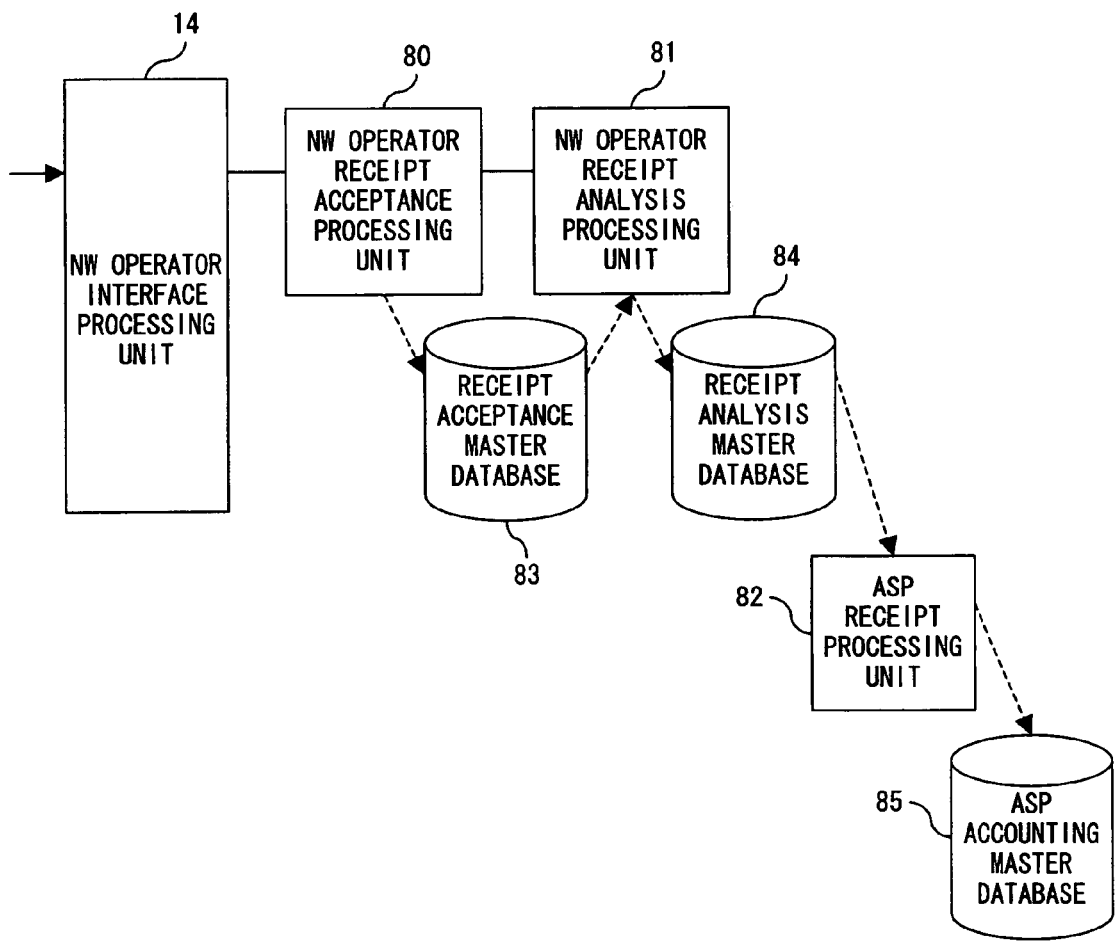
FIG. 24 is a block diagram of the process of making a payment to an ASP configuring a server system after subtracting a service commission of the network operator when the network operator is a proxy collector of a service use rate as in the current DoCoMo "i-mode" service.

FIG. 24 is a block diagram of the process of making a payment to an ASP configuring a server system after subtracting a service commission of the network operator when the network operator is a proxy collector of a service use rate as in the current DoCoMo "i-mode" service.

FIG. 24 shows the case in which the amount excluding the commission of the NW operator is paid to the ASP when the NW operator collects a service use rate as a proxy agent. (income=receipt for the ASP)

An NW operator receipt acceptance processing unit 80 accepts the receipt information from the NW operator through the NW operator interface processing unit 14, a receipt acceptance master database 83 stores the contents of the receipt (payment for the NW operator), and an NW operator receipt analysis processing unit 81 analyzes the receipt contents, and a receipt analysis master database 84 stores the result.

An ASP receipt processing unit 82 performs a receiving process in accounting based on the receipt analysis master database 84, and reflects the result on an ASP accounting master database 85.

Figure 25:
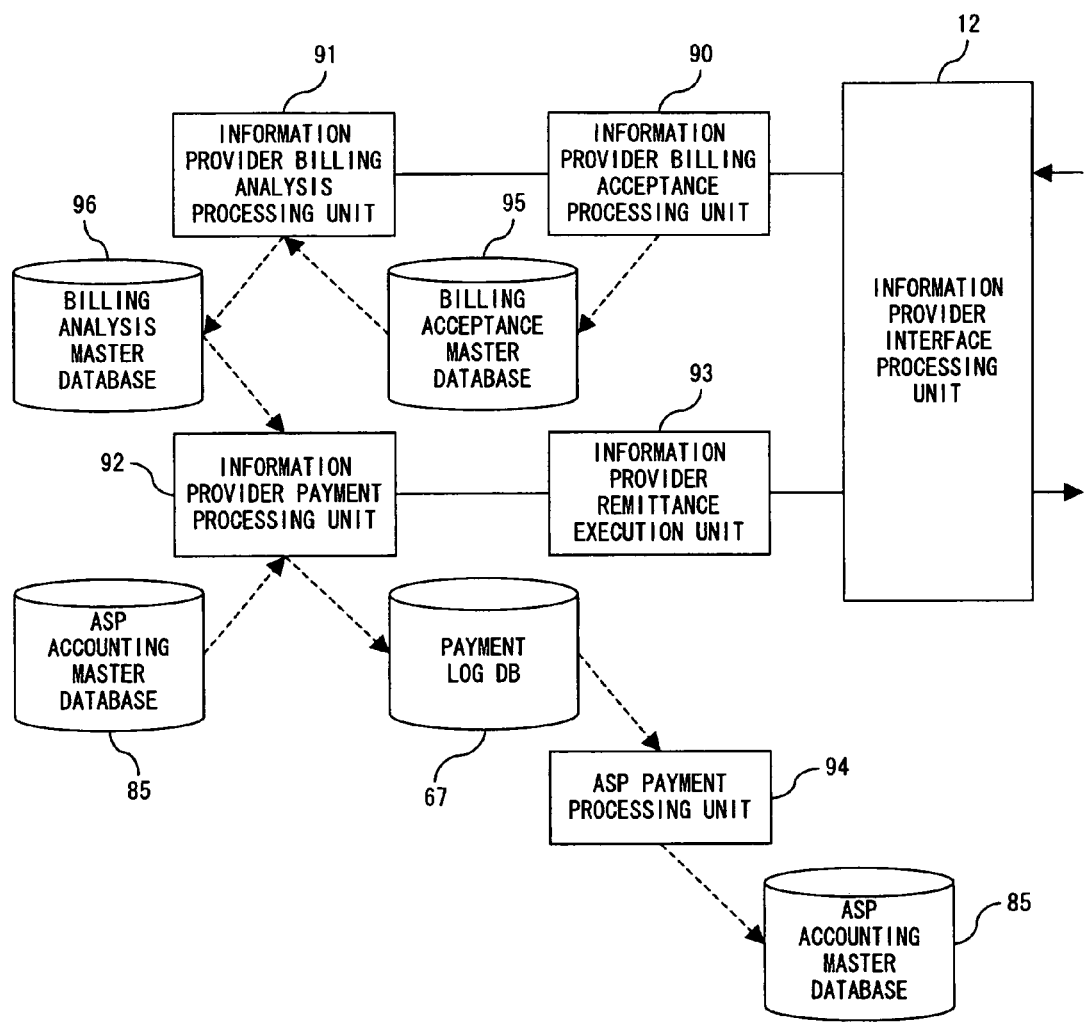
FIG. 25 is a block diagram of the process of making a payment by an ASP configuring a server system to an information provider upon receipt of a bill from the information provider.

FIG. 25 is a block diagram of the process of making a payment by an ASP configuring a server system to an information provider upon receipt of a bill from the information provider.

FIG. 25 shows the case in which the ASP pays the bill to the information provider based on the billing from the information provider.

An information provider billing acceptance processing unit 90 accepts the bill from the information provider through the information provider interface processing unit 12, a billing acceptance master database 95 stores the contents of the bill, an information provider billing analysis processing unit 91 analyzes the validity of the contents of the bill, and a billing analysis master database 96 stores the result.

An information provider payment processing unit 92 performs a necessary payment process using billing analysis master database 96 and the ASP accounting master database 85, and records the result in the "payment log DB 67", and simultaneously an information provider remittance execution unit 93 makes a remittance to a corresponding correspondent financial institution of the information provider through the information provider interface processing unit 12.

An ASP payment processing unit 94 makes a payment using the "payment log DB 67", and the result is reflected by the ASP accounting master database 85.

Figure 26:
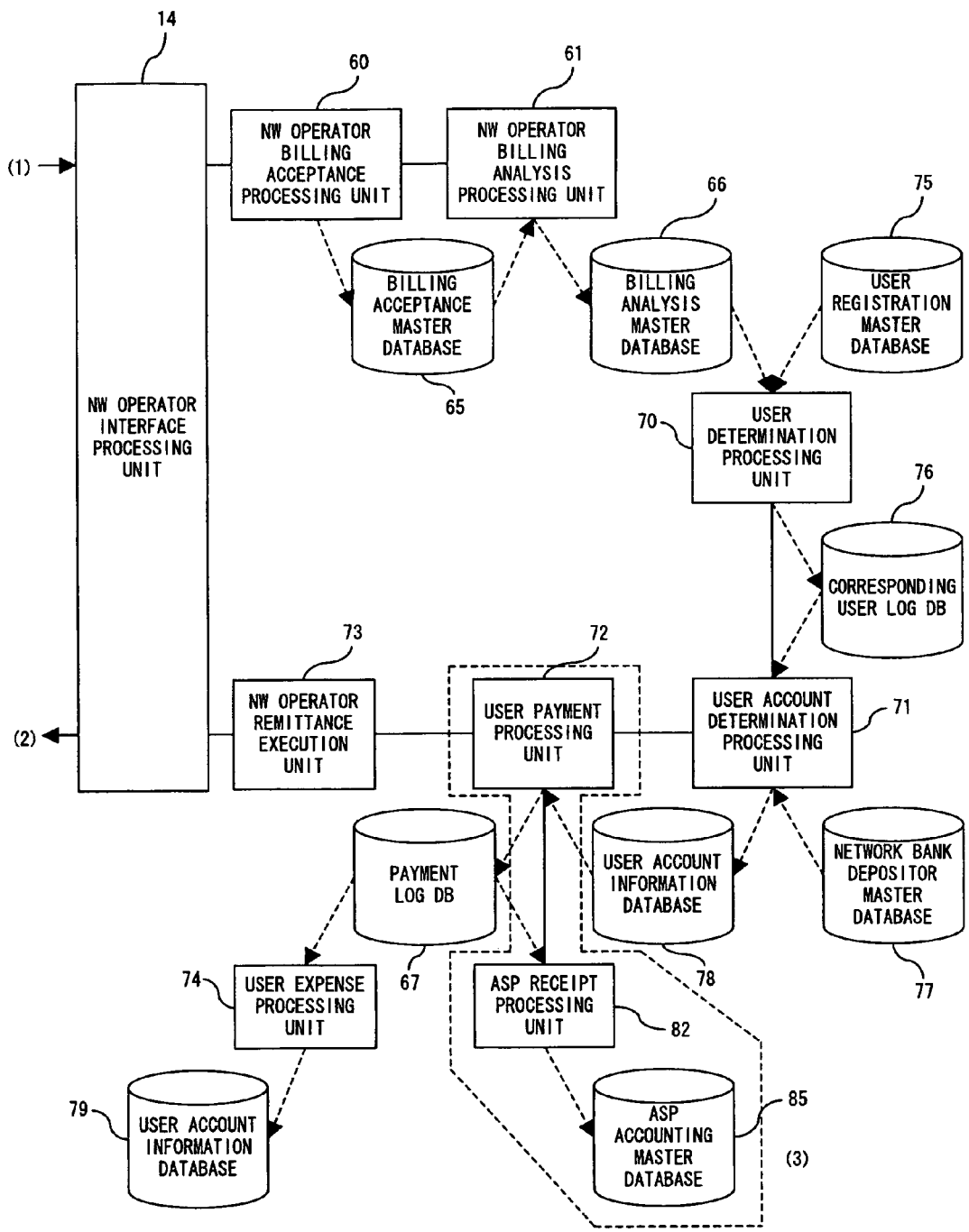
FIG. 26 is a block diagram of the process of payment between network operators when a service user opens an account in a network bank.
Figure 27:
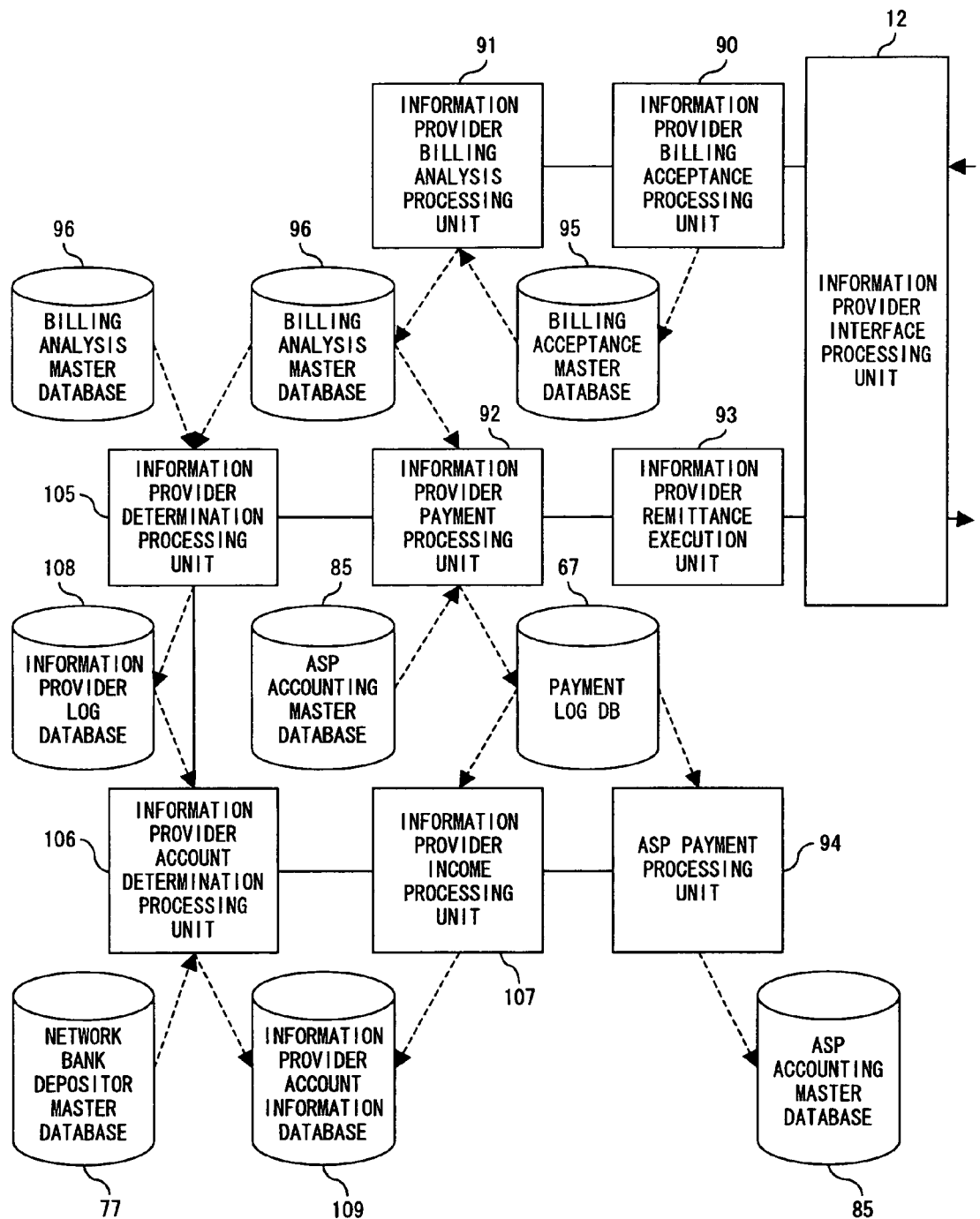
FIG. 27 is a block diagram of the process of payment between information providers when an information provider opens an account in a network bank.

FIGS. 26 and 27 show the ASP configuring a server system also functioning as a network banker. FIG. 26 shows the process block of the payment process among network operators when a service user opens an account in the network bank. FIG. 27 shows the process block of the payment process among the information providers when the information provider opens an account in the network bank.

FIG. 26 is a block diagram of the process of payment between network operators when the ASP also functions as a network banker and a service user opens an account in the network bank.

In FIG. 26, (1), (2), and (3) show the flow of money, wherein:

(1) indicates the bill from the NW operator=a communication rate+service rate where the service rate=a commission of the NW operator+a service providing rate of the ASP;

(2) indicates the payment to the NW operator=a communication rate+a commission of the NW operator; and (3) indicates the income of the ASP=a service providing rate of the ASP.

In FIG. 26, the block having the same function as shown in FIGS. 21 through 25 are assigned the same reference numbers. The block in FIG. 26 is configured by the same block as those shown in FIGS. 21 through 25. Since the explanation of FIG. 26 overlaps those of FIGS. 21 through 25, the explanation of FIG. 26 is omitted here.

FIG. 27 is a block diagram of the process of payment between information providers when the ASP also functions as a network banker and information provider opens an account in the network bank.

In the block diagram shown in FIG. 27, the same block as the block shown in FIGS. 21 through 25 is assigned the same numeral number and the explanation is omitted. In FIG. 27, an information provider determination processing unit 105, an information provider account determination processing unit 106, an information provider income processing unit 107, an information provider log database 108, and an information provider account information database 109 are newly added. The information provider determination processing unit 105 analyzes the bill from the information provider, and enters the result in the information provider log database 108. The information provider account determination processing unit 106 identifies an information provider using the information provider log database 108. The information provider income processing unit 107 identifies the account of the information provider using the information provider account information database 109, and receiving process from the information provider.

Figure 28:
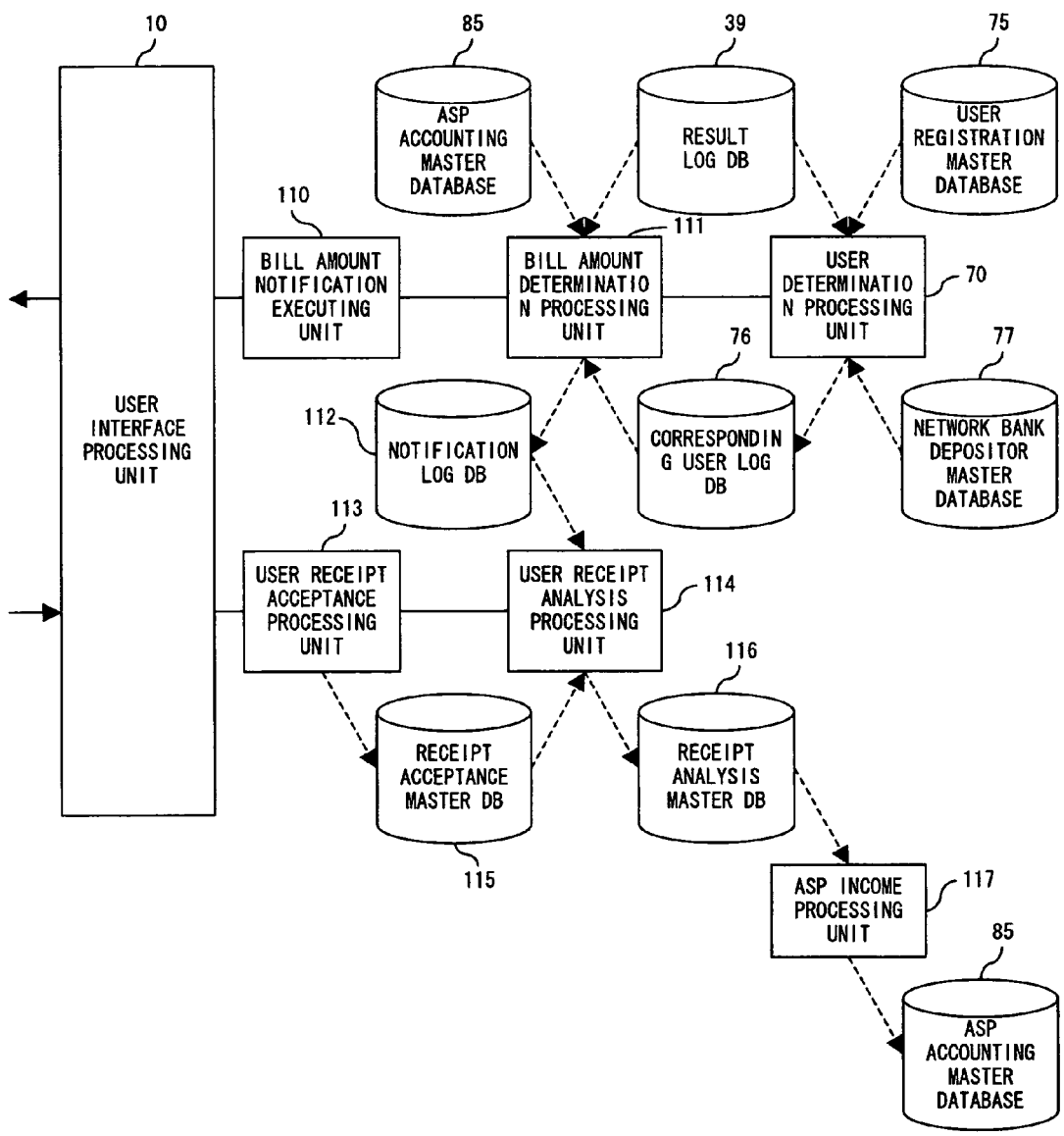
FIG. 28 is a block diagram of the process of a service user making a payment to a server system upon receipt of a bill from the server system to the service user.

FIG. 28 is a block diagram of the process of a service user making a payment (receipt) to a server system upon receipt of a bill from the server system to the service user.

FIG. 28 shows the case in which a service user pays the bill (income=receipt for the ASP) based on the billing from the ASP to the service user.

The user determination processing unit 70 determines a service user to pay the use rate based on the user registration master database 75 and the "result log DB 39" recording the service use situation of the service user, the result is stored in the "corresponding user log DB 76", a bill amount determination processing unit 111 calculates the bill for the service user based on the ASP accounting master database 85 and the "corresponding user log DB 76", the result is recorded in the "result log DB 39", and simultaneously a bill amount notification executing unit 110 notifies the correspondent financial institution of the service user through the user interface processing unit 10.

A user receipt acceptance processing unit 113 accepts a payment (receipt for the ASP) from the service user through the user interface processing unit 10, a receipt acceptance master DB 115 stores the contents of the payment (receipt), a user receipt analysis processing unit 114 analyzes the validity of the contents of the payment, and the result is stored in a receipt analysis master DB 116.

An ASP income processing unit 117 performs a payment process in accounting using the receipt analysis master DB 116, and the ASP accounting master database 85 reflects the result.

Figure 29:
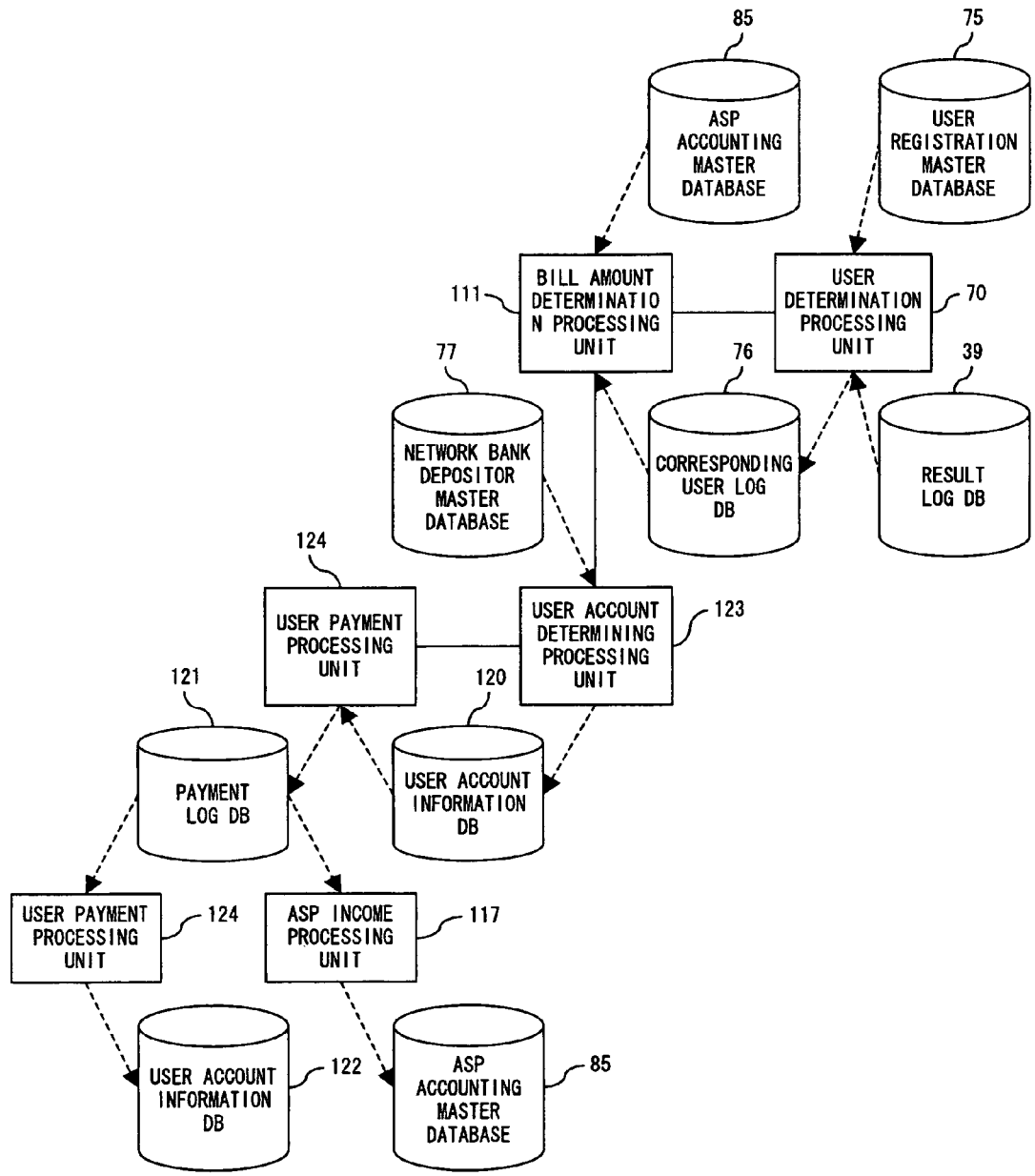
FIG. 29 is a block diagram of the process between service users when an ASP configuring a server system also functions as a network banker, and a service user opens an account in a network bank.

FIG. 29 is a block diagram of the process between service users when an ASP configuring a server system also functions as a network banker, and a service user opens an account in the network bank.

FIG. 29 shows a payment process block between service users when the ASP also functions as a network banker, and the service user opens an accoung in the network bank. The block corresponding to that shown in FIG. 28 is assigned the same reference numeral, and the explanation is omitted here. A user account determining processing unit 123 identifies an account of the user based on the corresponding user log DB 76 and the network bank depositor master database 77. A user payment processing unit 124 performs a payment process from a user account. The result is stored in a "payment log DB 121" When the payment is made, the user payment processing unit 124 stores the data in a user account information DB 122.

Figure 30:
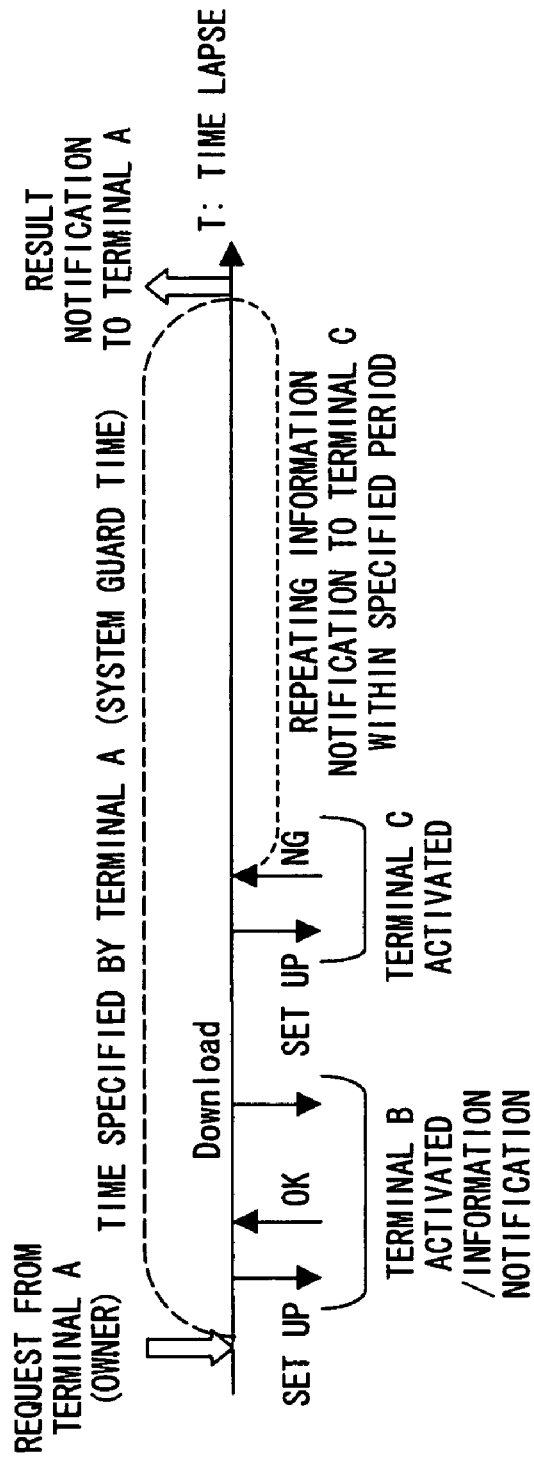
FIG. 30 shows the concept (1) of the common process performed when a condition specified by a service user for information distribution such as sharing and inheriting information, etc. is only "time" according to an embodiment of the present invention.
Figure 31:
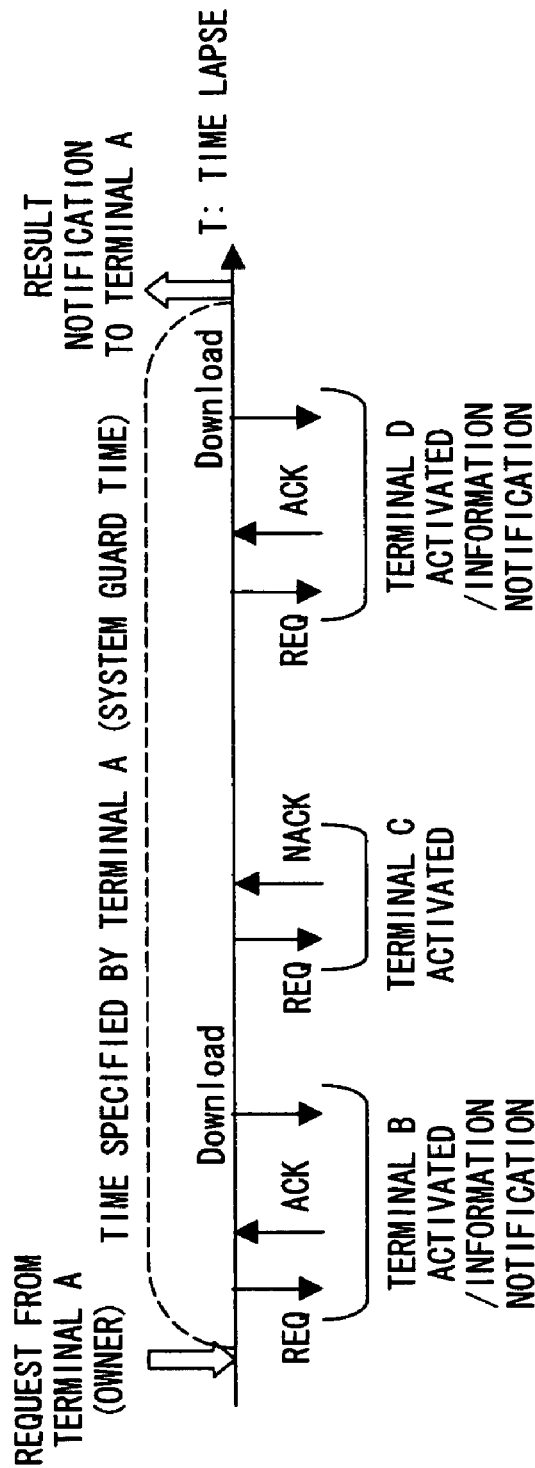
FIG. 31 shows the concept (2) of the common process performed when a condition specified by a service user for information distribution such as sharing and inheriting information, etc. is only "time" according to an embodiment of the present invention.
Figure 32:
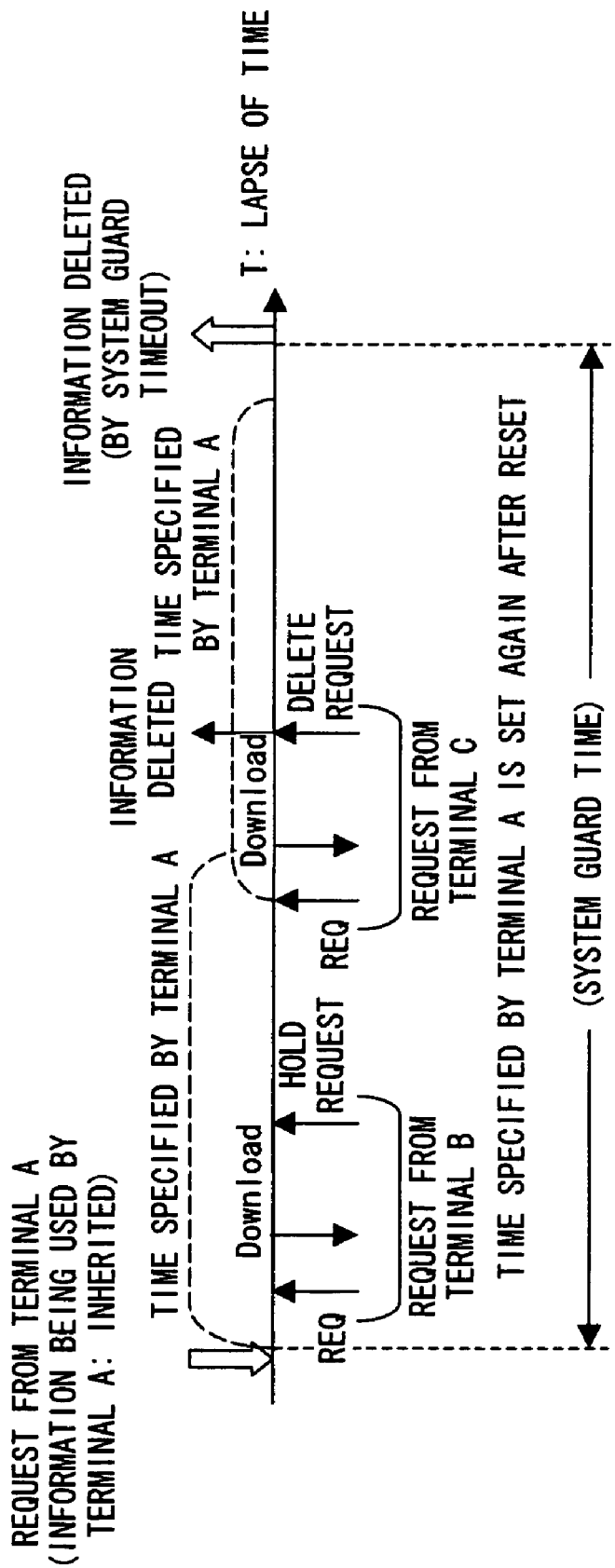
FIG. 32 shows the concept (3) of the common process performed when a condition specified by a service user for information distribution such as sharing and inheriting information, etc. is only "time" according to an embodiment of the present invention.

FIGS. 30 through 32 show the concept of the general process performed when a condition specified by a service user for information distribution such as sharing and inheriting information, etc. is only "time" according to an embodiment of the present invention.

FIG. 30 shows the case in which the information forcibly specified by the terminal A is announced to a person/group members registered by the terminal A (owner). When a request to share information is issued by a request from the terminal A, other terminals B and C download information within a predetermined time (system guard time). In FIG. 30, the terminal B has succeeded in downloading, but the terminal C has failed. In this case, in the range of the system guard time, the process of downloading the information to the terminal C is repeated. If the system guard time has passed, a result is reported to the terminal A.

FIG. 31 shows the case in which the information specified by the terminal A (owner) is reported by the intention of a registered person/group members. When the terminal A specifies the system guard time and requests the announcement of the information, a request to download the information within a specified time is issued to the terminals B, C, and D, and only when the user of each terminal accepts, the information is announced. If the system guard time has passed, a result is reported to the terminal A.

FIG. 32 shows the case in which the terminal A (owner) inherits the information being used to another terminal. When a request to inherit the information being used is issued with the time specified, and when a request to inherit the information is issued from another terminal within a time specified by the terminal A, the time specified by the terminal A is reset, and then set again. That is, until the information is deleted, the same condition (time) is maintained for inheritance. As shown in FIG. 32, when a request to delete the information is received from the terminal C, the information is deleted. There is a device provided for forcibly deleting the information by the system guard timeout sufficiently reserved for protection against the pressure on the storage capacity of the ASP by the retention of the information with a view to inheriting the information.

Figure 33:
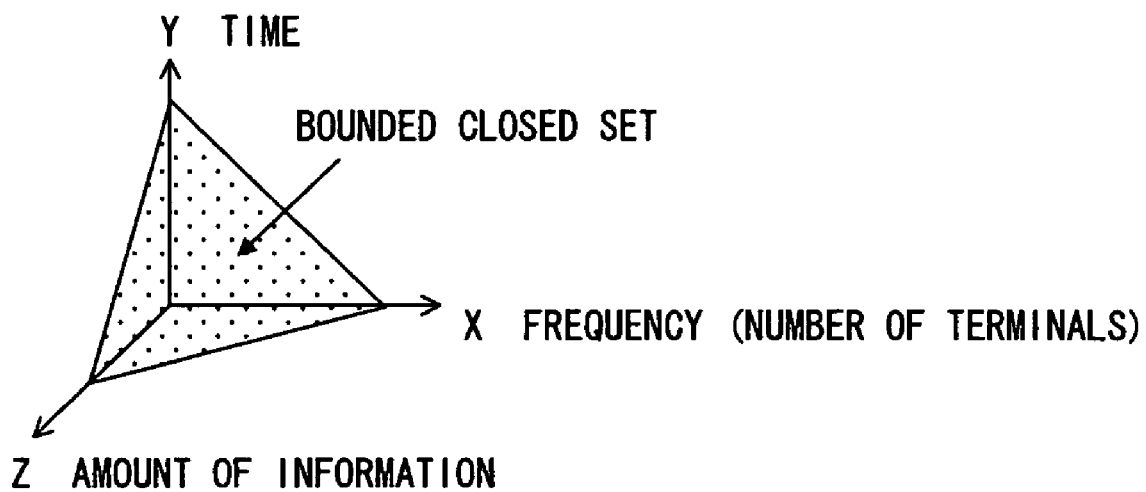
FIG. 33 shows the concept of the process in which a plurality of conditions (values) specified when a service user specifies a plurality of conditions for information distribution such as sharing and inheriting information, etc. according to the present invention are a bounded closed set.

FIG. 33 shows the concept of the process in which a plurality of conditions (values) specified by a service user are defined as a bounded closed set when a plurality of conditions are specified for the information distribution such as sharing and inheriting information according to the present invention.

FIG. 33 shows the concept of simplifying the specification of conditions in control when a plurality of conditions are specified by a service user sharing and inheriting information.

In FIG. 33, as a plurality of conditions, it is assumed that the "frequency" (quantity), the "amount of information" (volume), and the "period" (time) for sharing and inheriting information are specified.

By defining the area encompassed by specified condition values (the area indicated by the hatches shown in FIG. 33) as a bounded closed set, the extremum (maximum value) in the area can be obtained by applying the Lagrange's method of undetermined multipliers. The value can be processed as the upper limit value, that is, the unique value, in sharing and inheriting information, thereby simplifying (a plurality of conditions can be integrated as a single condition) the control management.

When a plurality of conditions (C1, C2, C3, . . . , Cn) are specified, the value indicated by each condition can be used as an element of determination of a process, but it is not practical with the process efficiency taken into account.

Furthermore, although it is also possible to regard each condition as the concept of "the union of sets" such as C1 v C2 v C3 v . . . v Cn, etc. to determine the condition (value) of the processing area based on the result, there arises the problem of validity depending on the combination of "numbers", "attributes", etc.

Generally, the value obtained with the concept of "the union of sets" is larger than each condition value. In the actual process, there arises the problem in efficiency.

There also can be a number of problems in considering the conditions having different attributes with the concept of "the union of sets".

Figure 34B:
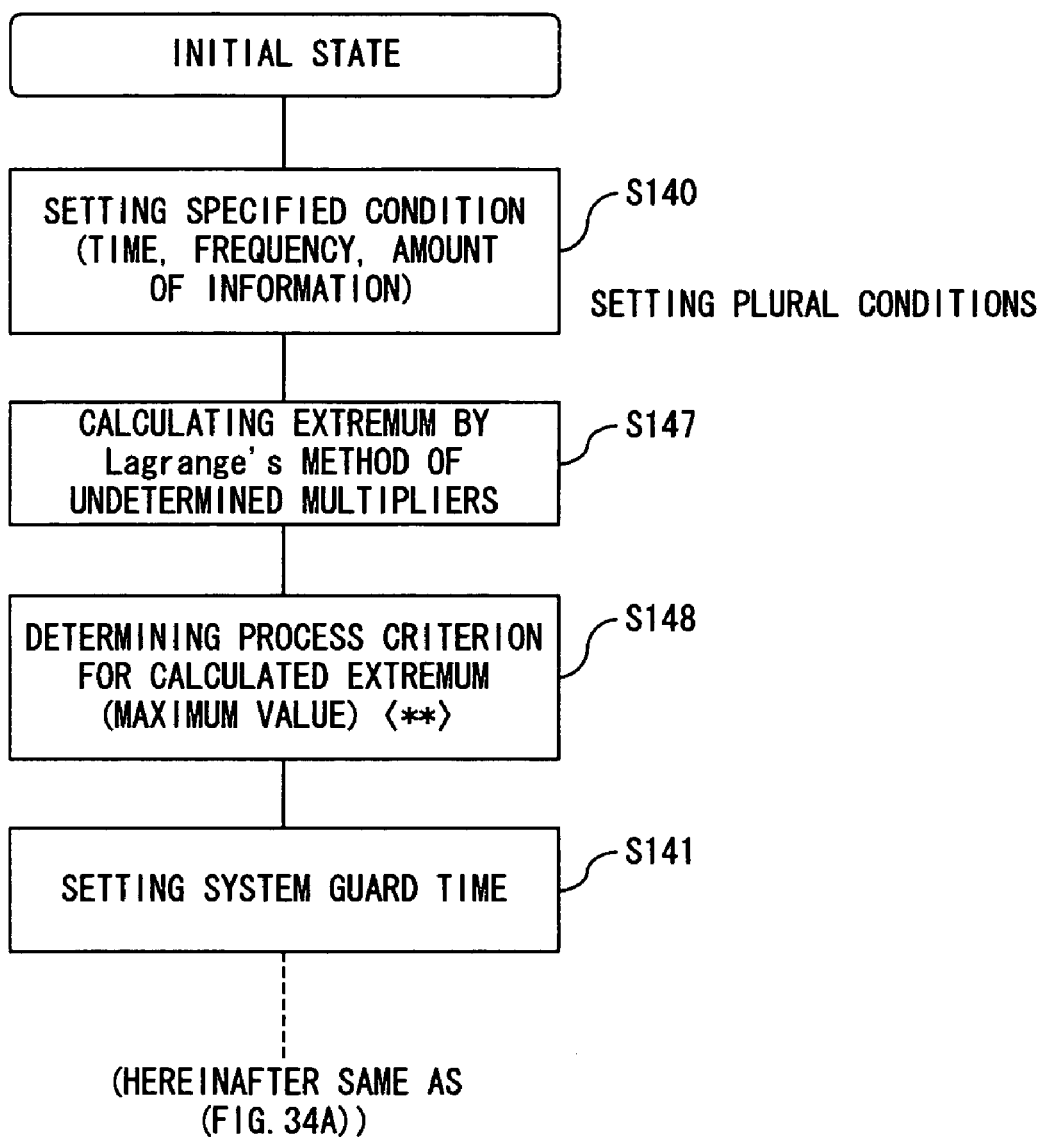

FIGS. 34A and 34B show the process for the condition specified by a service user for information distribution such as sharing and inheriting information, etc. according to the present invention. FIG. 34A shows the process with a unique specification, and FIG. 34B shows the process with a plurality of specifications.

FIG. 34A shows the basic process when a service user specifies sharing and inheriting information with a single condition.

The system guard time shown in FIG. 34A is uniquely determined to protect an invalid abeyance in a memory space of the information held for providing the service by the ASP.

The <*> shown in FIG. 34A indicates that a practical processing method depends on the attribute of the specified conditions.

For example, assuming that the "time (T)" is specified as a condition with the elapsed time (P) in executing the present service, the process is repeated until $T \leq P$. When "frequency (N)=number of targets" is specified, and the number of terminals which have performed the services is n, the process is performed until $N=n$. When the "amount of information (V)" is specified and the amount of information per terminal (target) is v, the process is performed until $V \leq n \times v$ (n indicates the number of terminal for the services) by performing the subtracting process of the condition (value).

First, in step S140, the specification condition (time, frequency, amount of information, etc. for inheritance) is set. In this example, a simple condition is set. In step S141, the system guard time is set. In step S142, the information sharing or inheriting is set. In step S143, the system guard time is measured. When a timeout occurs, control is passed to step S146. When a timeout does not occur, the subtraction of a specification condition is performed each time inheritance is carried out. In step S145, it is determined whether or not a specification condition has been satisfied. If it is determined in the determination in step S145 that the condition is not satisfied, control is returned to step S142. If it is determined in the determination in step S145 that the condition is satisfied, control is passed to step S146. In step S146, a notification of a result is transmitted to the owner, and control is passed to the initial state.

In FIG. 34B, only the difference from FIG. 34A is described.

The <**> in FIG. 34B determines the criterion in the actual process for the extremum (maximum value) obtained in the Lagrange's method of undetermined multipliers from the specified plural conditions.

For example, when the three conditions, that is, time, frequency, and amount of information, are specified as a plurality of conditions, one of the three conditions is determined for the extremum (maximum value) obtained in the Lagrange's method of undetermined multipliers.

That is, by assuming the obtained extremum as the "time" condition, the plurality of conditions can be integrated into one, thereby realizing simple control of the entire system.

After setting the specification condition in step S140, an extremum is obtained in the Lagrange's method of undetermined multipliers in step S147, the criterion to the process for the calculation of an extremum is determined in step S148, and control is passed to step S141.

Figure 35:
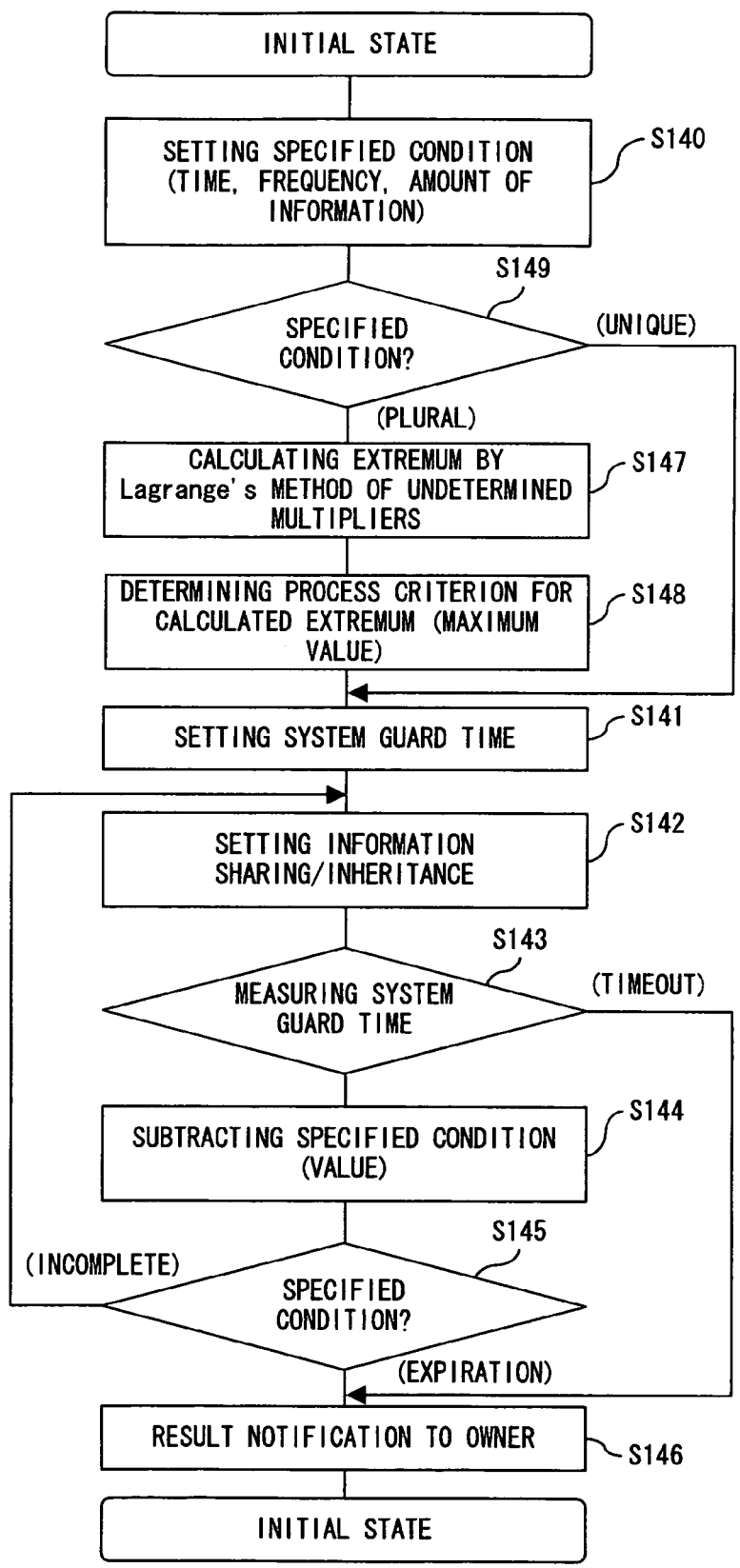
FIG. 35 shows the process integrated regardless of the number of conditions specified by a service user for information distribution such as sharing and inheriting information, etc. according to the present invention.

FIG. 35 shows the process integrated regardless of the number of conditions specified by a service user for information distribution such as sharing and inheriting information, etc. according to the present invention.

In FIG. 35, the same step as in FIG. 34 is assigned the same step number, and the explanation is omitted here. FIG. 35 is a combination of FIGS. 34A and 34B. Since each step is the same with each other, and the explanation is omitted here. Depending on whether of not the specification condition is single, it is clear whether or not the Lagrange's method of undetermined multipliers is used. If it is single, the process in the Lagrange's method of undetermined multipliers is skipped, control is passed to step S141, and the process information 34A is performed.

FIGS. 36 through 42 show an example of an application according to an embodiment of the present invention.

Figure 36:
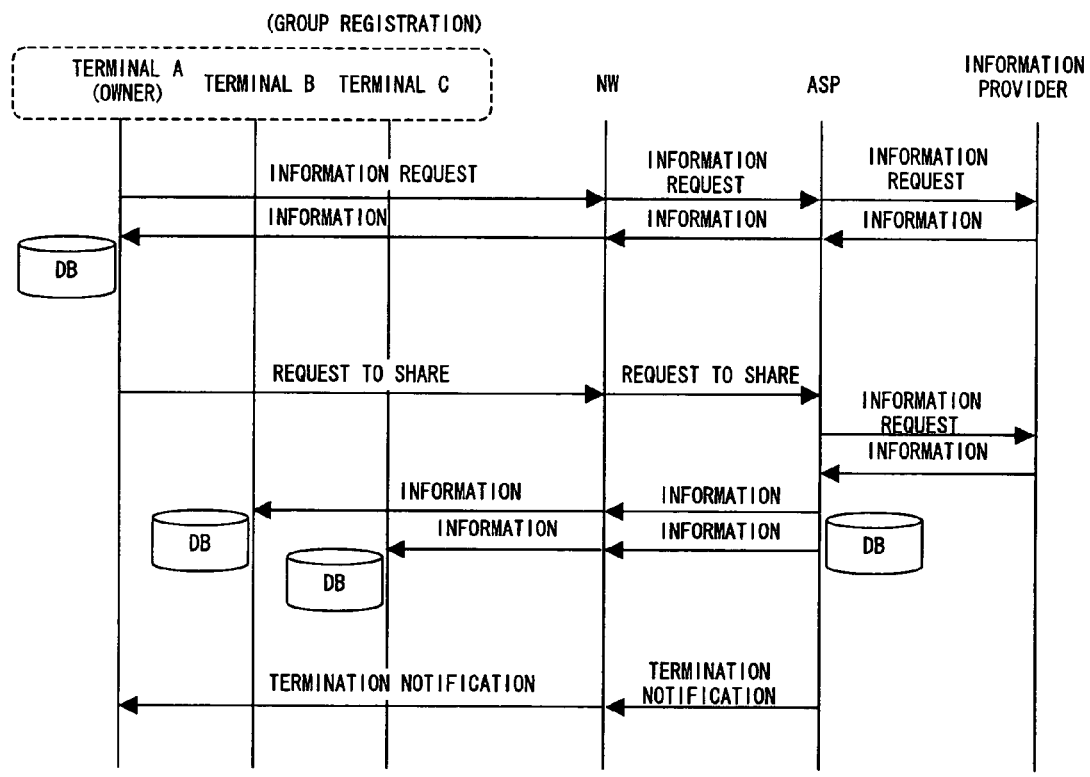
FIG. 36 shows an example (1) of an application according to an embodiment of the present invention.

FIG. 36 shows the distribution of the information for sharing to the terminal (member) registered in advance by the service user forcibly by the intention of the service user only.

FIG. 36 shows the case in which the service user requests to forcibly share the obtained information requested to the information provider with a terminal (member) registered in advance.

A service user (user (owner) of the terminal A) notifies the ASP of the notification information about "request to share". The ASP follows the request, requests the information provider for the information specified by the service user, obtains it, and temporarily stores it until sharing with the registered member terminates. When the ASP requests the information provider for the information, and when the information requires a payment, the ASP also notifies of the use including the registered members, and acquires admission from the information provider. The ASP calls a registered member, and forcibly distributes the stored information to the member.

According to the present embodiment, common information can be shared mainly with mobile workers, but the embodiment can be applied to various groups, for example, from the university to students for the information about class schedules, etc.

Figure 37:
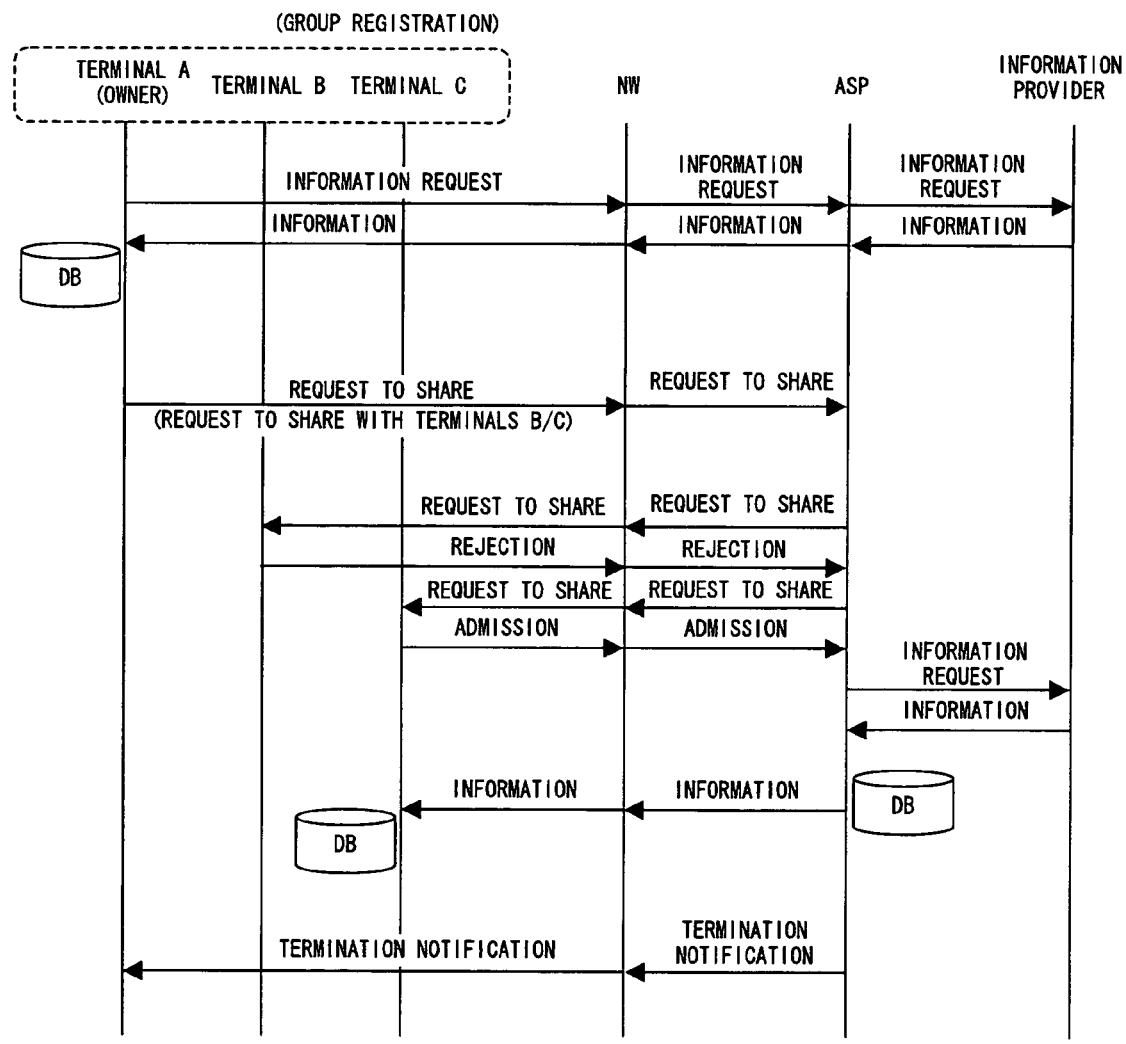
FIG. 37 shows an example (2) of an application according to an embodiment of the present invention.

FIG. 37 shows shared information with the intention of a terminal registered by a service user highly estimated.

A service user (represented as an owner in FIG. 37) requests the information provider to be allowed to share the obtained information with a terminal (member) registered in advance with the intention of the member estimated.

The service user issues a notification "request to share" to the ASP to share information with the terminals B and C. The ASP accepts the request, and issues a notification "request to share" to the terminals B and C. In FIG. 37, the terminal B returns a reply to reject sharing, and the terminal C returns an acceptance. Depending on the acceptance status, the ASP requests the information provider for the information specified by the service user, obtains it, and temporarily stores it until sharing the information with the registered member terminates. When the ASP requests the information provider for the information, and if it requires a payment, then the ASP also notifies that the registered member which accepts sharing the information also uses or receives distribution, and the acceptance is to be received from the information provider. The ASP calls the accepted registered member (terminal C in FIG. 37), and forcibly distributes the stored information.

The application example of the present embodiment can also be applied to the example shown in FIG. 36, but it is the case in which the intention of a registered member is highly estimated.

Figure 38:
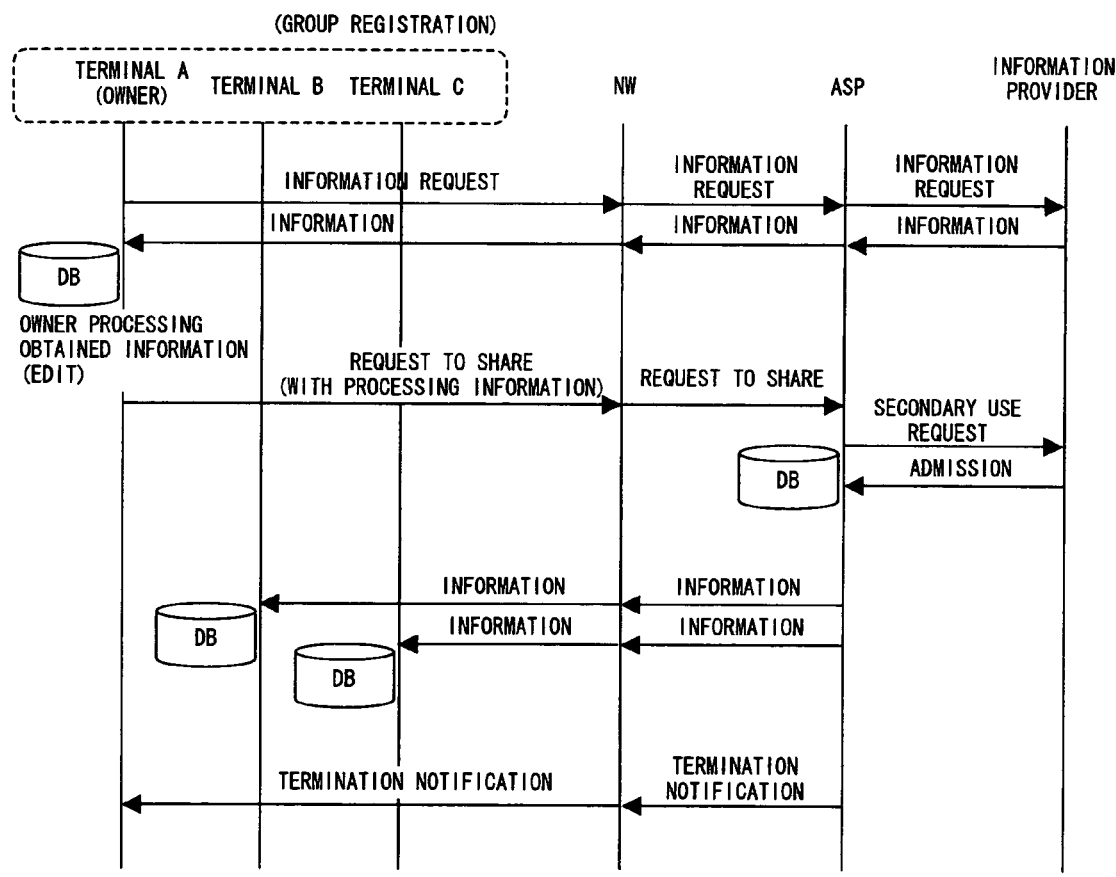
FIG. 38 shows an example (3) of an application according to an embodiment of the present invention.

FIGS. 38 and 39 show sharing information processed by a service user.

FIG. 38 shows the case in which a service user (represented as an owner in FIG. 38) requests the information provider, performs any process on the obtained information, and also forcibly shares the processed information with the registered terminal (member).

A service user notifies the ASP of the notification "request to share (with processing information", and the ASP temporarily stores the processed information by the service user until the sharing information with the registered member. As necessary, the ASP follows the request, and notifies the information provider of the secondary information processed by the service user about the "secondary use request", and the acceptance is obtained from the information provider. The ASP calls a registered member, and forcibly distributes the stored information. This includes the case in which a service user writes a meeting time and other information to the obtained information (for example, map information), and the entire information is transmitted to the registered members.

Since there is the case in which the information obtained by a service user cannot be edited or processed, an information provider has to check as necessary whether or not the secondary use of the information can be allowed.

FIG. 39 shows the case in which a service user (represented as an owner in FIG. 39) requests an information provider to process the obtained information, and shares the processed information with members of registered terminals with the intention of the members highly estimated.

The service user notifies the ASP of the notification "request to share (with processing information)", and the ASP temporarily stores the processed information by the service user until the sharing information with the registered members terminates. As necessary, the ASP notifies the information provider at the request of the secondary use "secondary use request" of the information processed by the service user, and obtains acceptance from the information provider. The ASP requests the information provider for the information specified by the service user, obtains the information, and temporarily stores the information until sharing with the registered members that accepted sharing the information terminates. The ASP calls the registered members (terminal B in FIG. 39) that accepted sharing, and distributes the stored information.

Figure 40:
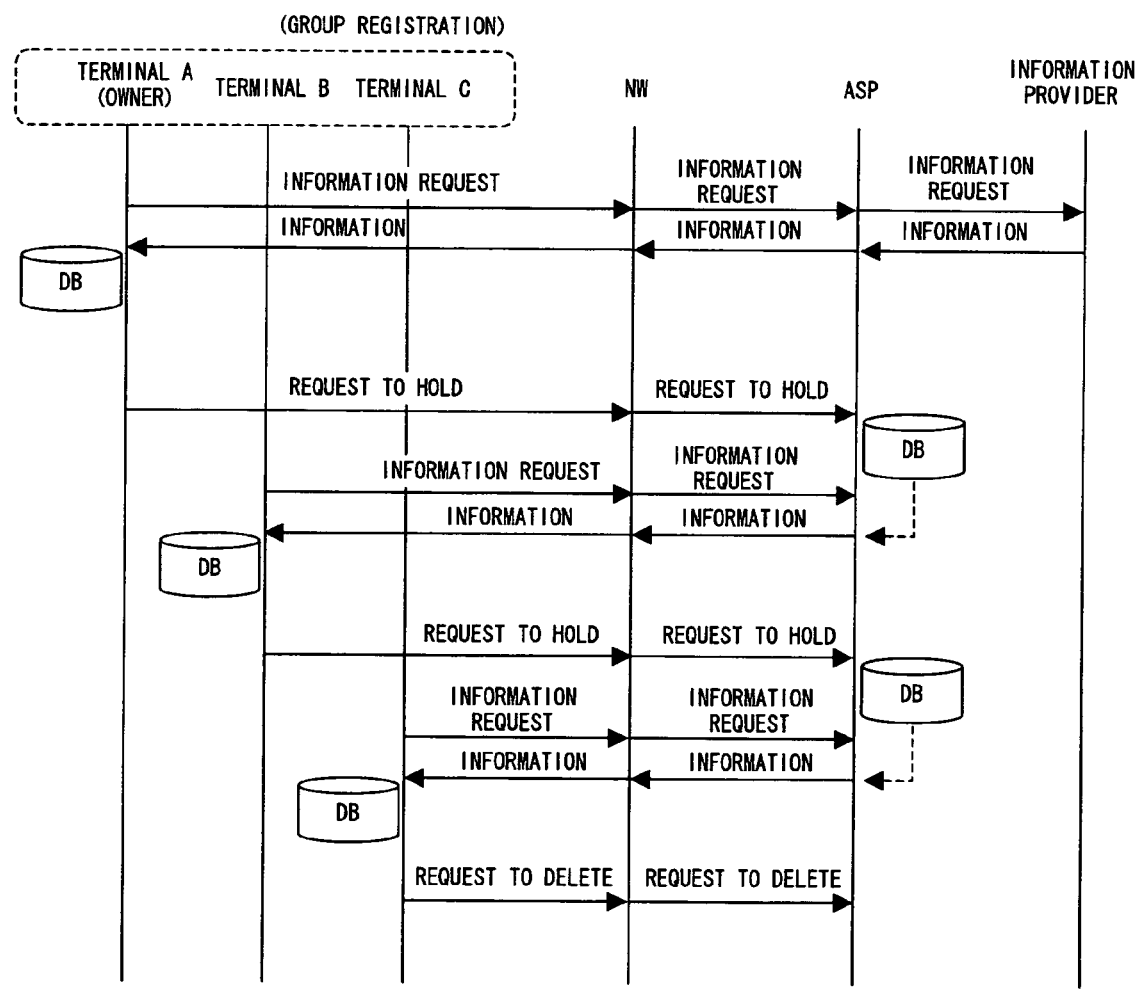
FIG. 40 shows an example (5) of an application according to an embodiment of the present invention.

FIG. 40 shows the case in which a service user registers in advance once obtained information, and inherits the information among terminals.

A service user (represented as an owner in FIG. 40) requests an information provider, holds obtained information as is as being browsed, and inherits the use of the information among the registered terminals (members).

The service user notifies the ASP of the "request to hold" so that the information being used is to be held, the ASP stores the information requested to be held from a service user. The ASP stores the information requested to hold from the service user. Upon receipt of the "information request" which is a distribution request for the information from a member, the ASP distributes the stored information to a specified member. When it is not necessary to store the information among the members, the ASP deletes the information at "request to delete".

The present application example refers to a use when a user holds a plurality of portable information terminals. For example, when a user gets out of the vehicle loaded with a car navigation system storing downloaded map information, the map information can be inherited by a mobile telephone.

FIG. 41 shows the case in which a service user transfers a license to an information provider to share the information for which only the service user has an access license with a terminal (member) registered in advance.

The service user (represented as an owner in FIG. 41) requests an information provider, and shares, with the intention of a member highly estimated, the obtained information with a terminal (member) registered in advance although an access restriction such as "for members only", etc. is placed.

A service user notifies an ASP of a notification "request to share (transfer of access right)" that information is to be shared with the terminals B and C. At the request, the ASP notifies the terminals B and C of the notification "request to share" (in FIG. 41, the sequence of the terminal C is omitted). Simultaneously, the ASP notifies the information provider of the notification "access right transfer notification" that the access right is temporarily transferred from the terminal A (access right holder) to the terminal B, and acceptance is obtained from the information provider (the information provider regards plural times of access from the terminal A having the access right, and a required rate is added to the terminal A).

By the terminal B answering that a request to share information from the ASP is accepted, the ASP requests for the information permitted by the information provider to be accessed only by the terminal A, obtains the information, and distributes it to the terminal B.

In the present application example, there is a restriction on browsing and transfer of information by "only all members", etc., but an information provider permits a member to allow an apparently non-member to use the information. In this case, there is a merit of, for example, no member registration for a non-member or no use rate charged, etc.

Figure 42:
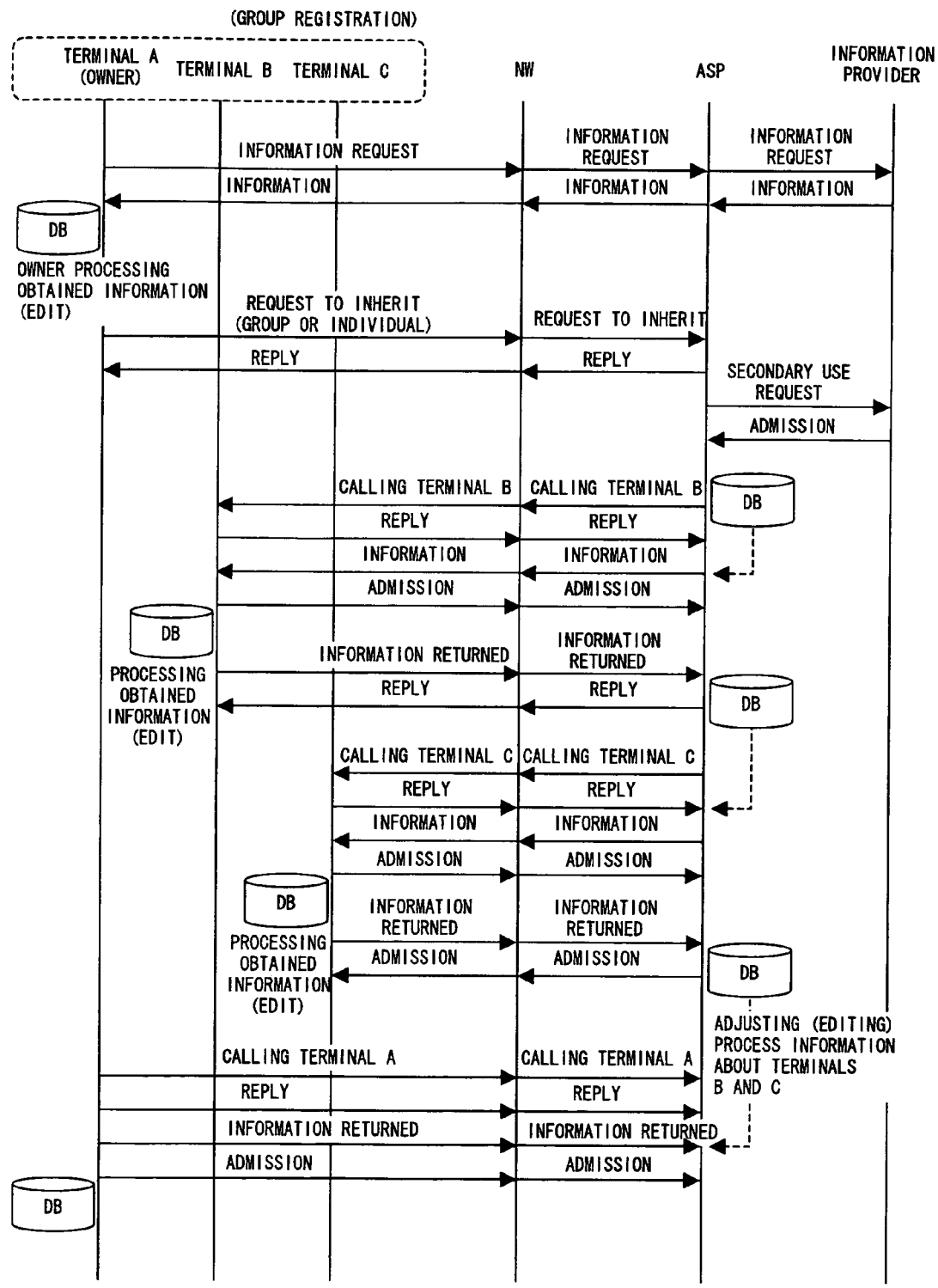
FIG. 42 shows an example (7) of an application according to an embodiment of the present invention.

FIG. 42 shows the case in which a service user shares predetermined information with terminals (members) registered in advance while processing the information.

A service user (represented as an owner in FIG. 42) requests an information provider, and inherits and shares the obtained information with terminals (members) registered in advance while editing and processing the information.

A service user (owner of the terminal A) obtains information from an information provider through an ASP. At this time, permission to perform secondary processing is obtained from the information provider. The obtained information is processed by the owner, and a request to inherit the information to other terminals B and C is transmitted to the ASP. The ASP issues a secondary use request to the information provider, obtains permission of the information provider, calls the terminal B, and transmits the information to the terminal B. When the terminal B processes the information and returns it to the ASP, the terminal C is called, the information is transmitted to the terminal C for processing. The processed information is transmitted to the ASP. Thus, the information processed by the terminals B and C is returned to the owner of the terminal A.

The present application example is utilized when a service user sequentially transmits minutes of proceedings, etc. to members, each member inherits and shares them for addition and amendment, and when the service user adds an opinion to obtained information (for example, a literary work such as poetry, etc.), and the contents are shared among members.

Figure 43:
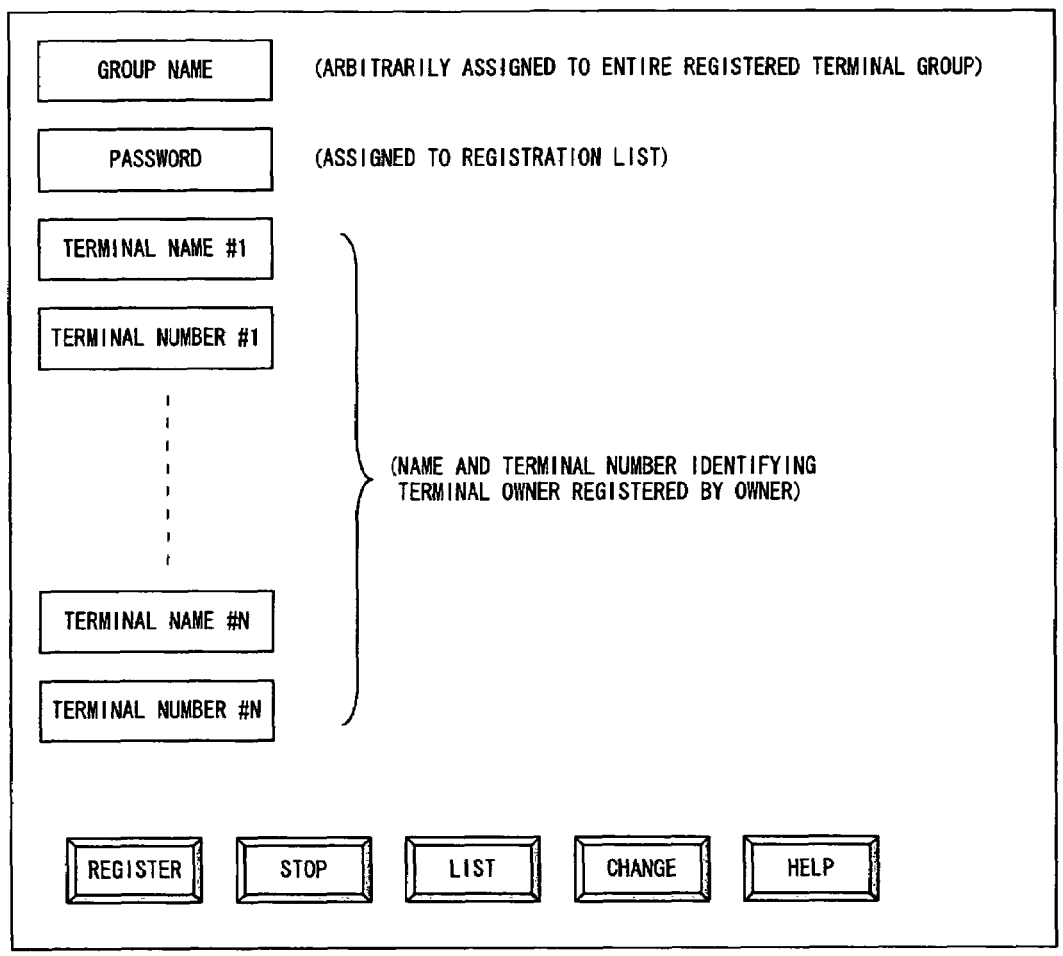
FIG. 43 shows the outline (1) of a terminal display of a service user.

FIGS. 43 and 44 show the outline of the terminal display of a service user.

FIG. 43 shows a terminal screen image for registration of the service by a service user. FIG. 44 shows a terminal screen image when the information is distributed to a terminal registered in advance by a service user.

In FIG. 43, a member to share information with a terminal as an owner, and a terminal to inherit information are registered. Then, members specified as a group can be specified by pressing a button with a group name. A password is assigned to a registration list. A terminal name and a terminal number of a registered terminal owner are specified by a button. At a lower portion on the screen, a button for registration of a new member, a process stop button, a list display button, a conversion button, and a help button are provided.

In FIG. 44, on the screen (1), the information owned by the owner is displayed. On the information screen, the directory name of information, a file name, etc. are displayed. If a member has been registered, and when a request to share or inherit information is issued, then as displayed on the screen (2), a destination group name and a password are prompted. If a member has not been registered, the screen (3) for specification of a terminal is individually displayed to share or inherit information.

What is claimed is:

1. A shared information system for sharing and inheriting information among information terminals, comprising:
a device having an interface for communicating various types of information with an information provider, receiving contents specified by the information provider through the interface and information about use of the contents, and storing the contents and the information;
a device having an interface for communicating various types of information about an information terminal of a service requester (owner) and an information terminal to be registered for the service requester sharing and inheriting information, receiving a service request, etc. of the service requester through the interface, and storing the information and the service request;
a device receiving and storing information specified by the service requester and a condition of information distribution, etc., and a device calculating simplification of a condition of information distribution; and
a device receiving and storing information required to make a payment among the information provider, the service requester, and a network operator, performing a settlement between entrepreneurs process, and a device notifying the information provider, the service requester, and the network operator of a payment result.

2. The system according to claim 1, further comprising a device accepting and storing information specified by the service requester for information distribution and a secondary use request for the information, notifying a registrant (member) registered by the service requester for information distribution of the specified information, receiving and storing information processed and edited by the service requester based on permission for secondary use by information provider of the information, notifying the registrant of the information, and billing and making a payment for a cost of a series of information distribution to the service requester.

3. The system according to claim 1, further comprising
a device receiving and storing a request to store information specified by the service requester, accepting a request to distribute the information from the registrant, distributing the information to the registrant requesting the information and billing a cost of a series of information distribution to the service requester, and making a payment.

4. The system according to claim 1, further comprising
a device accepting a request for information distribution to a registrant of information for which only the service requester has an access license, receiving and storing the information for which only the service requester has an access license based on permission of information provider of die information for a temporary transfer (sharing) of an access license to the registrant, notifying the registrant of the information, and billing and making a payment of a cost about a series of infonnation distribution to the service requester.

5. The system according to claim 4, wherein
the condition includes settings of a plurality of conditions, it is determined using evaluation whether or not the plurality of conditions are satisfied in a Lagrange's method of undetermined multipliers.

6. The system according to claim 4, wherein
a payment request for a shared service of the electronic contents is issued to the owner and other users that have downloaded the electronic contents.

7. The system according to claim 1, further comprising
a device allowing specification of a plurality of conditions about information distribution from the service requester, defining the plurality of specified conditions as a bounded closed set, performing a calculation in a Lagrange's method of undetermined multipliers, and defining an extremum as a quantitative condition of information distribution.

8. The system according to claim 1, wherein
the service requester selects one of a forcible device without permission of the registrant as a condition of information distribtttion and a device highly estimating an intention of the registrant.

9. The system according to claim 1, wherein
a cost share bill about sharing and inheriting the information is performed on the service requester only.

10. The system according to claim 1, wherein shared license is forcibly assigned regardless of an intention of other users.

11. The system according to claim 1, wherein a shared license is assigned only when other users accept assignment of a shared license.

12. The system according to claim 1, further comprising:
a storage device receiving and storing electronic contents from a terminal of the owner, wherein
by downloading the electronic contents from the storage device using a terminal by other users in a range satisfying a condition specified by the owner, the owner realizes sharing the electronic contents with the other users.

13. The system according to claim 1, wherein
a shared license includes a license of performing secondary processing on the electronic contents.

14. The system according to claim 1, wherein
a payment request for a shared service of the electronic contents is issued only to the owner.

15. A shared information method for sharing and inheriting information among information terminals, comprising:
communicating various types of information with information provider, receiving contents specified by the information provider and information about use of the contents, and storing the contents and the information;
communicating various types of information about an information terminal of a service requester (owner) and an information terminal to be registered for the service requester sharing and inheriting information, receiving a service request, etc. of the service requester, and storing the information and the service request;
receiving and storing information specified by the service requester and a condition of information distribation, etc., and calculating simplification of a condition of information distribution; and
receiving and storing information required to mnake a payment among the information provider, the service requester, and a network operator, performing a settlement between entrepreneurs process, and notifying the information provider, the service requester, and the network operator of a payment result.

* * * * *